US009266611B2

(12) United States Patent
Rambo

(10) Patent No.: US 9,266,611 B2
(45) Date of Patent: Feb. 23, 2016

(54) FLIGHT PATH DEVELOPMENT FOR REMOTE SENSING VEHICLES IN A MOVING REFERENCE FRAME

(71) Applicant: UNIVERSITY OF FLORIDA RESEARCH FOUNDATION, INC., Gainesville, FL (US)

(72) Inventor: Thomas Jeffrey Rambo, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 103 days.

(21) Appl. No.: 14/310,809

(22) Filed: Jun. 20, 2014

(65) Prior Publication Data

US 2015/0226575 A1      Aug. 13, 2015

Related U.S. Application Data

(60) Provisional application No. 61/837,620, filed on Jun. 20, 2013.

(51) Int. Cl.
| | |
|---|---|
| B64C 39/02 | (2006.01) |
| G01C 11/00 | (2006.01) |
| G01C 21/20 | (2006.01) |
| G05D 1/10 | (2006.01) |

(52) U.S. Cl.
CPC .............. *B64C 39/024* (2013.01); *G01C 11/00* (2013.01); *G01C 21/20* (2013.01); *G05D 1/101* (2013.01); *B64C 2201/141* (2013.01)

(58) Field of Classification Search
CPC ........... B64C 39/024; B64C 2201/141; G05D 1/101; G01C 21/10; G01C 21/20; G01C 11/00; G01C 23/005
See application file for complete search history.

(56) References Cited

U.S. PATENT DOCUMENTS

| | | | | | |
|---|---|---|---|---|---|
| 5,548,515 | A | * | 8/1996 | Pilley ..................... | G01C 23/00 340/961 |
| 5,867,804 | A | * | 2/1999 | Pilley ..................... | G01C 23/00 340/961 |
| 6,006,158 | A | * | 12/1999 | Pilley ..................... | G01C 23/00 340/953 |
| 6,195,609 | B1 | * | 2/2001 | Pilley ..................... | G01C 23/00 342/36 |

(Continued)

OTHER PUBLICATIONS

"Applicants proposed amendments"; authored by: James S. Parker.*

(Continued)

*Primary Examiner* — James Trammell
*Assistant Examiner* — James E Stroud
(74) *Attorney, Agent, or Firm* — Saliwanchik, Lloyd & Eisenschenk

(57) ABSTRACT

Embodiments of the invention relate to a method and apparatus to produce a flightplan for a sUAS. Embodiments can produce such a flightplan for a variety of environmental and/or geographical parameters. A specific embodiment produces an optimal flightplan based on one or more metrics and/or one or more assumptions or boundary conditions. Embodiments take in vehicle parameters and/or the properties of the sensor systems used for imaging, and compute a partial, or complete, flightplan. Such a flightplan can include altitude, airspeeds, flight paths encompassing the target area, and/or the direction and/or path to turn in-between flightlines. Embodiments can improve the flight planning procedure compared to a manual process, which can be completely dependent on the operator, to implement a partially, or totally, automated process. Specific embodiments can produce a flightplan that results in the optimal data collection path.

48 Claims, 39 Drawing Sheets

(56) References Cited

U.S. PATENT DOCUMENTS

| | | | | |
|---|---|---|---|---|
| 2003/0132878 A1* | 7/2003 | Devereux | ............... | G01C 21/00 342/357.29 |
| 2010/0092079 A1* | 4/2010 | Aller | ................... | G06K 9/3216 382/165 |
| 2014/0180565 A1* | 6/2014 | Shiogai | .................. | B60L 11/18 701/123 |

OTHER PUBLICATIONS

Choset, H., "Coverage for robotics—A survey of recent results," *Annals of Mathematics and Artificial Intelligence*, vol. 31, 2001, pp. 113-126.

Choset, H., et al., "Coverage Path Planning: The boustrophedon cellular decomposition," International Conference on Field and Service Robotics, 1997.

Foley, J., et al. *Computer Graphics Principles and Practice*, Addison-Westley Publishing Company, 1996.

Huang, W. H., "Optimal Line-sweep-based Decompositions for Coverage Algorithms," *IEEE International Conference on Robotics and Automation*, 2001.

Jin, J., et al., "Optimal Coverage Path Planning for Arable Farming on 2D Surfaces," *American Society of Agricultural and Biological Engineers*, vol. 53, No. 1, 2001, pp. 283-295.

Jones, G. P., "The Feasibility of Using Small Unmanned Aerial Vehicles for Wildlife Research," Master's Thesis, University of Florida, 2003.

Li, Y., et al., "Coverage path planning for UAVs based on enhanced exact cellular decomposition method," *Mechatronics*, vol. 21, 2011, pp. 876-885.

McConnel, J., *Computer Graphics Theory to Practice*, Jones and Barlett Publishers, Inc., Sudbury, MA, 2006.

McGee, T., et al., "Optimal path planning in a constant wind with a bounded turning rate," *AIAA Guidance, Navigation, and Control Conference and Exhibit*, San Francisco, 2005, pp. 1-11.

Oksanen, T., et al., "Path Planning Algorithms for Agricultural Machines," *Agricultural Engineering International: the CIGR Ejournal*, 2007, vol. 4, No. 7.

Osborne, J., et al., "Waypoint Guidance for Small UAVs in Wind," *Proceedings of the AIAA Infotech@Aerospace Conference*, 2005.

Owen, P., "When the Ravens Met the Sandhill Cranes," *Unmanned Systems*, Jun. 2011.

Perry, J. H., "A Synthesized Directly Georeferenced Remote Sensing Technique for Small Unmanned Aerial Vehicles," Master's Thesis, University of Florida, 2009.

Piezdeh, H., *Computational Geometry with the Rotating Calipers*, McGill University, School of Computer Science, UMI, Ann Arbor, MI, 1999.

Rambo, T.J., "Flight Path Development for Remote Sensing Vehicles in a Moving Reference Frame," Master's Thesis, University of Florida, 2012.

Toussaint, G. "Solving Geometric Problems with the Rotating Calipers," *IEEE MELECON'83*, Athens, 1983.

\* cited by examiner

| RESOLUTION (CM) | | | | ALTITUDE (M) | 8 | 9 | 10 | 11 | 12 | 13 | 14 | 15 | 16 | 17 | 18 | 19 | 20 | 21 | 22 | 23 | 24 | 25 | 26 |
|---|---|---|---|---|---|---|---|---|---|---|---|---|---|---|---|---|---|---|---|---|---|---|---|---|
| 7.5 | 41 | 82 | 123 | 164 | 400 | 93% | 92% | 92% | 91% | 90% | 89% | 88% | 87% | 87% | 86% | 85% | 84% | 83% | 82% | 82% | 81% | 80% | 79% | 78% |
| 7 | 39 | 77 | 116 | 154 | 375 | 93% | 92% | 91% | 90% | 89% | 88% | 87% | 87% | 86% | 85% | 84% | 83% | 82% | 81% | 80% | 79% | 79% | 78% | 77% |
| 6.6 | 36 | 72 | 108 | 144 | 350 | 92% | 91% | 90% | 89% | 89% | 88% | 87% | 86% | 85% | 84% | 83% | 82% | 81% | 80% | 79% | 78% | 77% | 76% | 75% |
| 6.1 | 33 | 67 | 100 | 134 | 325 | 92% | 91% | 90% | 89% | 88% | 87% | 86% | 85% | 85% | 83% | 82% | 81% | 80% | 78% | 77% | 76% | 75% | 74% | 73% |
| 5.6 | 31 | 62 | 93 | 123 | 300 | 91% | 90% | 89% | 88% | 87% | 85% | 84% | 83% | 83% | 82% | 81% | 80% | 79% | 78% | 77% | 76% | 75% | 74% | 73% | 71% |
| 5.2 | 28 | 57 | 85 | 113 | 275 | 90% | 89% | 88% | 87% | 85% | 84% | 83% | 82% | 81% | 80% | 79% | 78% | 77% | 76% | 74% | 73% | 72% | 71% | 70% | 68% |
| 4.7 | 26 | 51 | 77 | 103 | 250 | 89% | 88% | 87% | 85% | 84% | 83% | 81% | 80% | 79% | 77% | 76% | 75% | 73% | 72% | 70% | 69% | 68% | 66% | 65% |
| 4.2 | 23 | 46 | 69 | 93 | 225 | 88% | 87% | 85% | 84% | 82% | 81% | 79% | 78% | 76% | 75% | 73% | 72% | 70% | 69% | 67% | 66% | 64% | 63% | 61% |
| 3.8 | 21 | 41 | 62 | 82 | 200 | 87% | 85% | 83% | 82% | 80% | 78% | 77% | 75% | 73% | 72% | 70% | 68% | 66% | 65% | 63% | 61% | 60% | 58% | 56% |
| 3.3 | 18 | 36 | 54 | 72 | 175 | 85% | 83% | 81% | 79% | 77% | 75% | 73% | 71% | 69% | 67% | 66% | 64% | 62% | 60% | 58% | 56% | 54% | 52% | 50% |
| 2.8 | 15 | 31 | 46 | 62 | 150 | 82% | 80% | 78% | 75% | 73% | 71% | 69% | 66% | 64% | 62% | 60% | 58% | 55% | 53% | 51% | 49% | 46% | 44% | 42% |
| 2.3 | 13 | 26 | 39 | 51 | 125 | 79% | 76% | 73% | 70% | 68% | 65% | 62% | 60% | 57% | 54% | 52% | 49% | 46% | 44% | 41% | 38% | 36% | 33% | 30% |
| 1.9 | 10 | 21 | 31 | 41 | 100 | 73% | 70% | 66% | 63% | 60% | 56% | 53% | 50% | 46% | 43% | 40% | 36% | 33% | 30% | 26% | 23% | 20% | 16% | 13% |
| 1.4 | 8 | 15 | 23 | 31 | 75 | 64% | 60% | 55% | 51% | 46% | 42% | 37% | 33% | 28% | 24% | 20% | 15% | 11% | 6% | 2% | -3% | -7% | -12% | -16% |
| 0.9 | 5 | 10 | 15 | 21 | 50 | 46% | 40% | 33% | 26% | 20% | 13% | 6% | -1% | -7% | -14% | -21% | -27% | -34% | -41% | -48% | -54% | -61% | -68% | -74% |
| 0.5 | 3 | 5 | 8 | 10 | 25 | -7% | -21% | -34% | -48% | -61% | -74% | -88% | -101% | -115% | -128% | -141% | -155% | -168% | -182% | -195% | -208% | -222% | -235% | -249% |
| | 50% | 60% | 40% | 10% | | | | | | | | | | | | | | | | | | | | |
| | SIDELAP% | | | | | | | | | | | | | | GROUNDSPEED (M/S) | | | | | | | | | |

FIG. 6

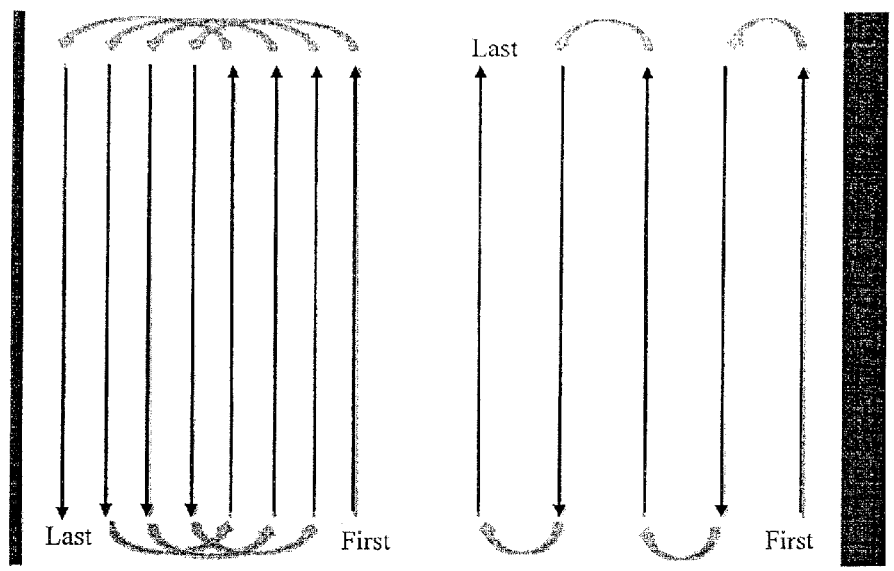
FIG. 18
 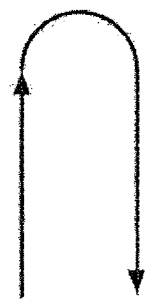
FIG. 19A    FIG. 19B
 
FIG. 19C    FIG. 19D (a)

FLIGHT PATH DEVELOPMENT FOR REMOTE SENSING VEHICLES IN A MOVING REFERENCE FRAME

CROSS-REFERENCE TO RELATED APPLICATION

The present application claims the benefit of U.S. Provisional Application Ser. No. 61/837,620, filed Jun. 20, 2013, which is hereby incorporated by reference herein in its entirety, including any figures, tables, or drawings.

BACKGROUND OF INVENTION

Remote sensing by aerial vehicles is a practice that has been around for several decades. Recent advancements in small Unmanned Aerial Systems (sUAS), paralleled with miniaturization of high quality cameras systems, has led to the development of a new platform for aerial photography and data collection. The unique flight profile of sUAS and their novelty leaves much work to be done in the area of controls research known as coverage planning. Currently the flight planning is manual and entirely dependent on an operator. Often the optimal path is counter-intuitive, either by selecting a direction for flight that is not obvious or by turning to the adjacent flightline by first turning away from it.

Precision maps acquired using aerial photography are a truly cross-industry product that is ubiquitous with the Internet age. The geospatial industry has been around in its modern form for nearly two decades, and now products like Google Maps™ and Bing™ Maps bring geospatial data to the masses in a manner never before seen. Advances in optics and sensors have increased the quality of the data product. However, the methods of acquisition have remained largely the same.

Satellites now provide frequent large scale imaging, but their timing and position are largely pre-determined. Furthermore the capital cost of developing, launching, and maintaining a satellite precludes rapid evolution of satellite-based imagery. Therefore, aerial platforms have been the method of choice for on-demand data. Small to midsized aircraft are outfitted with large cameras and sensing equipment, and are available for scheduled flights nearly world-wide [25].

Recently, a new technology has matured to the point of wide-scale adoption for this same purpose. Small Unmanned Aerial Systems (sUAS) have become reliable and robust enough to now be considered for routine use in aerial photography missions [17]. These sUAS in fact are an ideal candidate platform for small scale (sub 1000 acre) surveys because of their low operational cost, ease of deployment, and flight profile.

Emerging civilian data collection projects are utilizing military sUAS for a role they were not designed to fill. Military sUAS are designed to fill an operational gap in real time intelligence, surveillance, and reconnaissance (ISR) at the squad level. These vehicles trade robustness and ease of operations for performance, endurance, and stability. Fixed or gimbaled cameras stream live video back to a single operator, who flies the vehicle much like a video game through the forward looking camera. The first forays into using sUAS for remote sensing focused on these types of surplus military systems [24].

When military sUAS are adapted to civilian mapping missions, the design tradeoffs of the military sUAS severely limit the performance of the systems. One prominent case is the acquisition of dozens of Raven systems by the (United States Geological Service) USGS in support of their sUAS program [16]. Ravens were designed by AeroVironment in 2002 for the U.S. Army's SUAV program to complete ISR missions. These systems employ both full color and near infrared cameras, operating at 480×600 lines of (National Television System Committee) NTSC resolution. While these imaging systems may be adequate for locating a man-sized object on the move from 300 m, they are less effective at geospatial data collection.

While it is possible to collect geospatial data from real time video, it is sub-optimal [18]. Video-photography and still-photography are essentially a trade off between resolution and frame rate. Moreover, progressive scan cameras add further image loss as compared to stills. A still camera operates at very high resolution and low frame rate, while a video camera operates at a low resolution and high-frame rate. While more "pictures" will guarantee coverage, the use of real time video results in the need for extra processing and larger logistical footprint in exchange for the extra coverage. Video generates large amounts of data that can be cost prohibitive to store on board the aircraft, and, therefore, the data is typically sent back to the ground via a line-of-sight radio modem. Any break in the link between the aircraft and the recording station on the ground results in lost coverage. Furthermore, the processing of excessive image overlap is more time consuming than processing the data acquired from stills that have less image overlap.

An early UAS vehicle, the Tadpole, led to the NOVA series of aircraft. By the mid 2000s, miniaturization of all components for UAS allowed full navigation and guidance, such as in the Procerus® Kestrel™ autopilot. A still camera of sufficient resolution was placed on the aircraft to use direct-geo-referencing techniques. Furthermore, batteries could power an aircraft for enough time to collect a statistically relevant sample of imagery. The NOVA 1 [23] aircraft incorporated such a still camera, batteries, and full navigation and guidance.

The NOVA 2 incorporated improved navigation and control technology in the form of a Kestrel™ v2 system, the accompanying ground station software Virtual Cockpit™ v4.0, and Ground Control Station (GCS) hardware. Wilkinson's work on the system architecture highlighted the need for proper flight planning, and this was the first system where flight planning was injected into the workflow as a critical process [24].

When discussing the motion of vehicle UAV in the air, "flightlines" are typically defined as the path, commonly linear, from one waypoint to the next. Curved flightlines can also be used. Two or more flightlines form a flight path, or the total intended path of the aircraft. The "target area" is defined as the area on the ground of interest for data collecting, such as photography, and the flight path is generally centered above the target area.

The NOVA 2 [24] had a limited flight envelope of 22 m/s for safe slow-flight. Additionally, the early payloads were only capable of taking an image every 2.5 seconds. A typical wind speed of ~4 m/s downwind at this image rate resulted in an Airbase (B), or the distance between the centroid of pictures, of 65 m. For many missions the required B based on the desired resolution was on the order of ~50 m, thus limiting flights to flying against the wind (upwind), lowering the B to 45 m. Therefore, wind effects led to flightplans where the target acquisition flew "upwind" only, resulting in the pattern shown in FIG. 1, which is known as a "dipole."

These first flightplans were effective but highly inefficient. No inflight adjustments were made, and, therefore, the plans were created to account for the worst wind conditions. The vehicle traveled downwind outside of the target area, and there were no constraints on maneuvering to the next flightline.

The NOVA 2.1 is the current iteration of the NOVA series of aircraft, and like its predecessors incorporates the latest in guidance and navigation. The NOVA 2.1 features a Kestrel™ v2.23 and Virtual Cockpit™ v6.0. For the first time in the NOVA series, this system had custom software written for automated pre-flight procedures and very rudimentary flight planning. Based on the dipole patterns developed for the NOVA 2, a flightplan could be generated with simple inputs of flightline width, number of lines, length of lines, and direction. This is in no way optimal, but decreased the Concept of Operations (CONOPS) of flight planning from 45 minutes down to 10.

The performance envelope of the NOVA 2.1 also improved over the NOVA 2 platform, with the minimum safe working speed decreased from 22 m/s down to 15 m/s, and the flight time from ~50 minutes to ~90 minutes at an optimum 17 m/s. Furthermore, improvements in the payload brought acquisition time from 2.5 seconds down to 2.3 seconds. At an optimal flight speed, even with a 4 m/s tailwind the B is under the typical requirement of 50 m.

The NOVA series of aircraft are "all electric", meaning an electric motor is used for propulsion. This has direct coverage planning implications because the mass of the vehicle does not decrease as the flight continues, with traditional combustion propulsion. Therefore, traditional range and efficiency calculations are invalid and speed-to-fly theory as used by Evers becomes applicable [5]. In his study, Evers concludes that modifying the airspeed of an aircraft in the presence of wind, either by increasing ground coverage and speeding up into the wind, or slowing to optimal cruise and "floating" downwind, results in an increased range of the aircraft.

The NOVA 2.1 was the first successfully deployed version of the NOVA aircraft series, and was routinely deployed to South Florida in the summer of 2010. Even with the increased efficiency of creating flightplans, it became quickly apparent that there was much to improve on the CONOPS. The improved dynamics of the vehicle, along with payload improvements, removed the constraints behind the inefficient "dipole" pattern. More traditional flightplans could now be pursued.

The Kestrel™ 2.23, when fully tuned, is capable of following a linear path with error on the same magnitude of that of lateral GPS (around 5 meters) [20]. Kestrel™ autopilots are capable of completely autonomous navigation and control, but flight planning is completely dependent on pilot-on-the-loop involvement. In other words, the aircraft is capable of flying itself with operator oversight. An extensive preflight procedure has been developed for the NOVA series of aircraft as part of the CONOPS, and part of that procedure is carefully determining where the aircraft will go in-flight to ensure coverage. The Kestrel™ series is not designed for coverage planning, but, instead, is designed for ISR missions, and, therefore, loose waypoint following.

The flight-planning portion of the Kestrel™ series utilizes only the ground station software, Virtual Cockpit™. The hardware has no capabilities to determine the aircraft's path. Seemingly autonomous functions, such as return-to-home failsafes, are simply a pre-loaded set of commands that are executed with no on board intelligence. Virtual Cockpit™ is further limited by the fact that vehicle dynamics are not considered, and only linear flight paths are allowed. This means that the operator can command a flight path that the dynamics of the vehicle will not execute on. Such a case is examined in FIG. 2, where a turn with too tight of a radius is commanded. The vehicle overshoots waypoint 3 and has trouble intercepting the flightline back to waypoint 4.

This scenario is described for farming equipment by Jin, where the local curvature between farm lines is too great for the field equipment to follow. As a result, some area in the field lines will not be covered (Jin & Tang, 2010). Analogous to this case, when the commanded local curvature is beyond what the vehicle is capable of, some area in the target area will be missed. This behavior is quickly recognized by even novice pilots, and in real world deployments, this limitation is typically accounted for by the operator attempting to compensate with a "best-guess" approach, armed with a general knowledge of vehicle dynamics, or by just observing the actual flight path of the vehicle. FIG. 3 shows the same desired flight path, but with operator compensation in the form of a "turning waypoint" labeled here as 3. With this waypoint, the vehicle reintercepts the flightline from waypoint 4 to 5 successfully. This approach is non optimal, and completely dependent on, and of, the operator.

An additional problem is in the way the Kestrel™ series executes the navigation algorithm. Waypoints have a singularly defined "radius", that when entered, triggers the next command in the navigation script. The autopilot continuously calculates the absolute difference between its current latitude and longitude, and the latitude and longitude of the desired waypoint [20]. When that distance, or error, becomes less than the radius, it is considered to be at that waypoint.

Osborne and Rysdyk highlight the problem with this type of navigation [15]. FIG. 4A shows a tracking pattern with zero radius, where the vehicle passes 2 before turning; FIG. 4B shows an optimized radius, where the vehicle starts to turn before 2 and overshoots the next path line before aligning with the next path line; and FIG. 4C shows too much of a radius, where the vehicle starts to turn well before 2 and slowly aligns with the next path line. The Kestrel™ autopilot systems allow the operator to tune this value. However, this value is the same for all waypoints, all inbound orientations, and all wind magnitudes. Osborne suggested a correction for this by using a lookup table and variable waypoint radii based on the wind speed, magnitude, and incoming flight angle [15]. Osborne's suggestions did improve ground tracking. However, the fundamental problem still exists for paths that exceed vehicle dynamics, as is the case with the NOVA 2.1 aircraft.

The radius is optimally tuned for orthogonal turns. However, the incoming angle to the i+1 flightline makes a significant difference in the tracking performance of the aircraft as shown in FIGS. 5A-5C. Among obtuse, right, and acute incoming angles, the obtuse angle has the best performance, the right angle has some slight overshoot, and the acute angle has severe re-intercept problems. It should be noted that photogrammetric flightplans most commonly use acute and right angles, and rarely use obtuse angles.

Accordingly, there is a need in the art for a method and system to produce a flight path for sUAS's.

BRIEF SUMMARY

Embodiments of the invention relate to a method and apparatus to produce a flightplan for a sUAS. Embodiments can produce such a flightplan for a variety of environmental and/or geographical parameters. A specific embodiment produces an optimal flightplan based on one or more metrics and/or one or more assumptions or boundary conditions. Embodiments take in vehicle parameters and/or the properties of the sensor systems used for imaging, and compute a partial, or complete, flightplan. Such a flightplan can include altitude, airspeeds, flight paths encompassing the target area, and/or the direction and/or path to turn in-between flightlines. Embodiments can improve the flight planning procedure compared to a manual process, which can be completely dependent on the operator, to implement a partially, or totally, automated process. Specific embodiments can produce a flightplan that results in the optimal data collection path.

BRIEF DESCRIPTION OF DRAWINGS

FIG. 6 shows photogrammetric flight planning for CONOPS.

FIG. 18 shows parallel paths with a dipole path on the left, and a boustrophedon path on the right.

FIGS. 19A-19D show possible flight path orders near to far (FIG. 19A), far to near (FIG. 19B), far to near inverted (FIG. 19C), and near to far inverted (FIG. 19D), where the house represents the home position, or the location of the GCS.

FIGS. 26A-26C shows Dubins turn types (FIG. 26A) RLR, (FIG. 26B) LRL, and (FIG. 26C) RSR.

DETAILED DISCLOSURE

Figure 1:
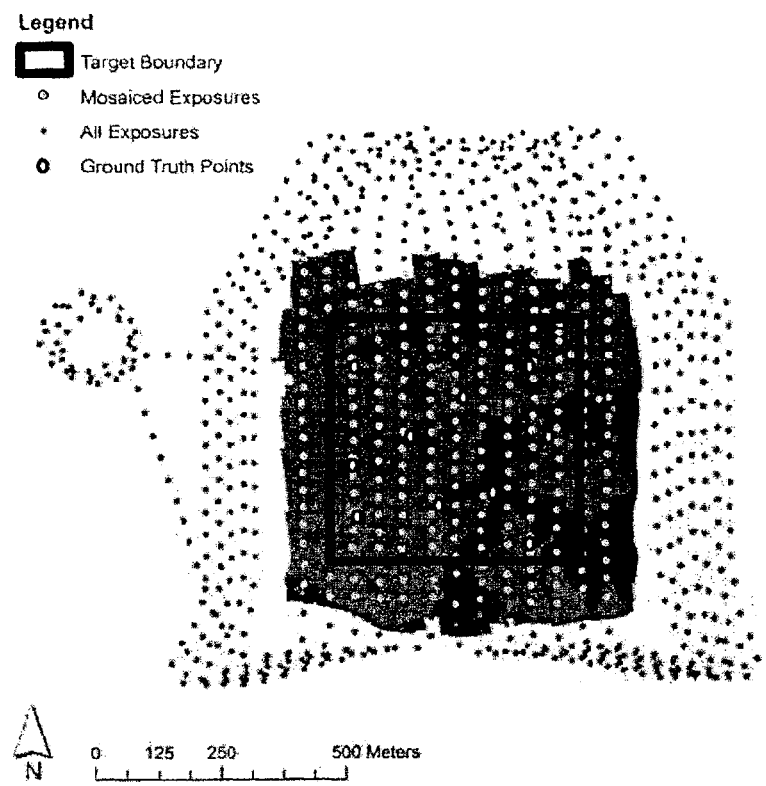
FIG. 1 shows a dipole flight path from NOVA 2 missions.
Figure 2:
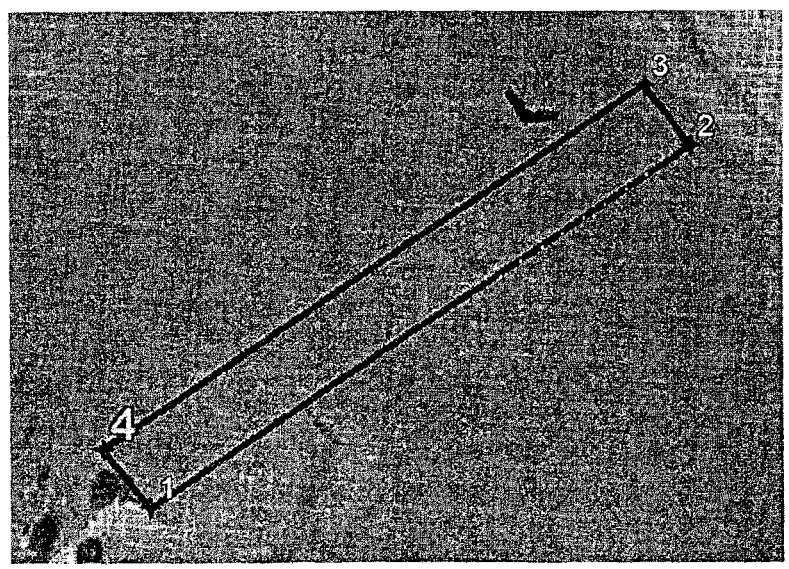
FIG. 2 shows two flightlines without a turning waypoint, where the vehicle has poor tracking.
Figure 3:
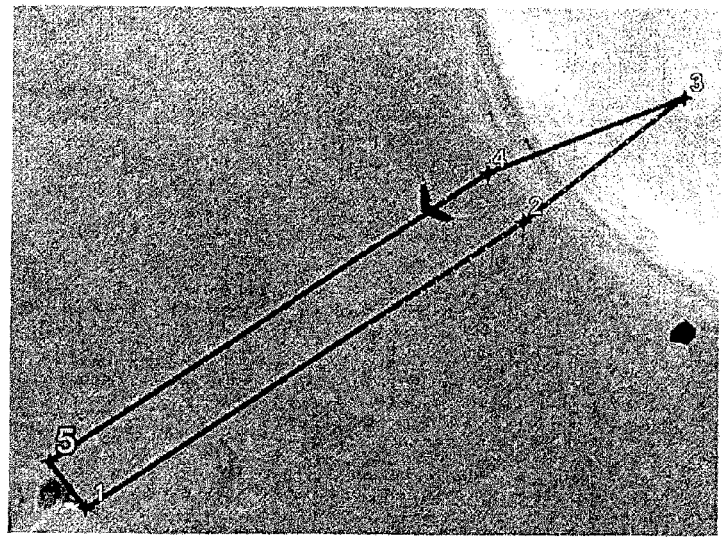
FIG. 3 shows two flightlines with a "turning waypoint," where the vehicle tracks as desired.
Figure 4A:
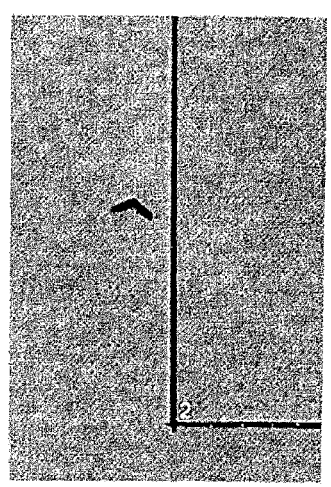
FIGS. 4A-4C show flightlines for varying waypoint radii (FIG. 4A) 0 m (FIG. 4B) 50 m (FIG. 4C) 100 m.
Figure 4B:
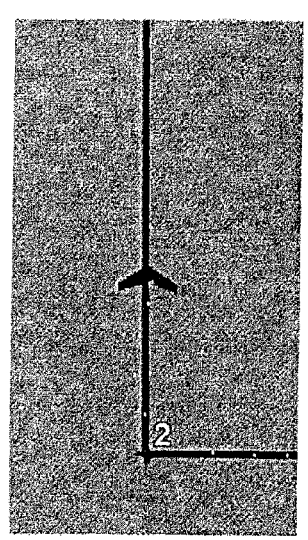
Figure 4C:
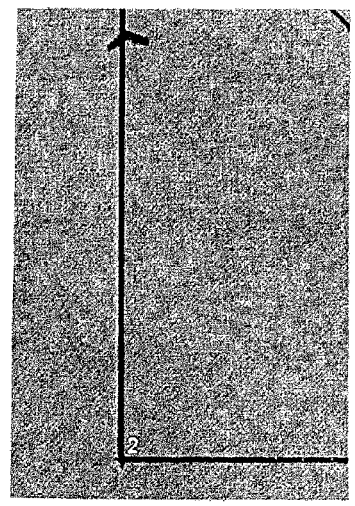
Figure 5A:
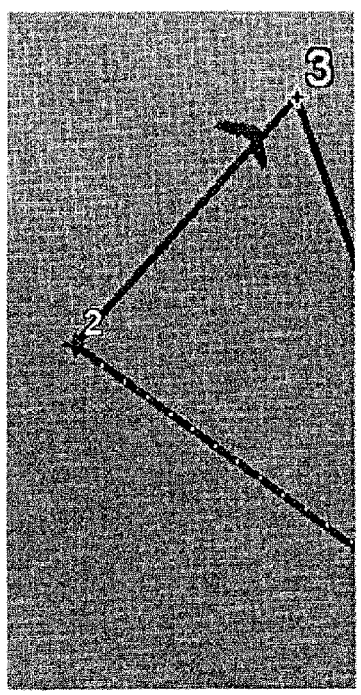
FIGS. 5A-5C show waypoint tracking with (FIG. 5A) Right angle, (FIG. 5B) Obtuse angle, and (FIG. 5C) Acute angle.
Figure 5B:
Figure 5C:
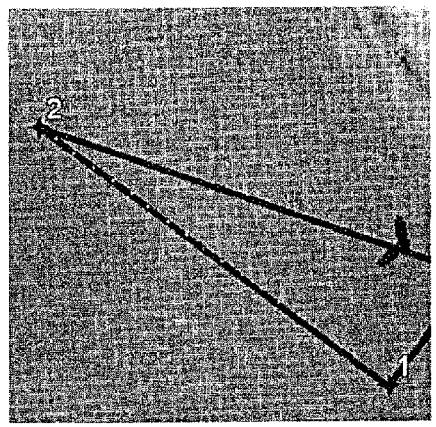

Embodiments of the invention relate to a method and apparatus to produce a flightplan for a sUAS. Embodiments can produce such a flightplan for a variety of environmental and/or geographical parameters. A specific embodiment produces an optimal flightplan based on one or more metrics and/or one or more assumptions or boundary conditions. Embodiments take in vehicle parameters and/or the properties of the sensor systems used for imaging, and compute a partial, or complete, flightplan. Such a flightplan can include altitude, airspeeds, flight paths encompassing the target area, and/or the direction and/or path to turn in-between flightlines. Embodiments can improve the flight planning procedure compared to a manual process, which can be completely dependent on the operator, to implement a partially, or totally, automated process. Specific embodiments can produce a flightplan that results in the optimal data collection path.

Optimizing Data Collection

FAA Regulations

Embodiments can be applied to missions to produce mosaiced images where flight planning can be important. Embodiments can meet the requirements of the FAA regulations regarding what is legally allowed for UAS flight.

The largest limiting factor in the design of the NOVA series of aircraft is what is known to the aviation community as the operators ability to "see and avoid" other aircraft [22]. In short, "see and avoid" is used by the FAA to ensure that aircraft do not run into each other. The nature of UAS makes it difficult to meet this requirement, or in the case of the NOVA which lacks any sort of real-time optical sensor, impossible. Accordingly, to fly in the National Airspace System (NAS), without a way to meet "see and avoid", such as a real-time optical sensor, special permits are needed to fly.

Recognizing the difficulty to achieve the "See and Avoid" Standard, the FAA is considering broadening the requirement to "Sense and Avoid". In the future "next gen" architecture, every aircraft is required to have a transponder broadcasting the aircraft's position. Transponder technology has been miniaturized enough to be useful on sUAS, and the NOVA 2.1 carries such a device when required.

In the interim, in order to allow UAS to fly, the FAA allows ground based "observers" to fulfill the "see" requirement of "see and avoid", and has required operators to have at least a private pilots license to fly the UAS to fulfill the "avoid" requirement [6]. This stipulation, while allowing aircraft into the airspace, limits the range of UAS to 1 mile Line of Sight (LOS) from the observer. Additionally, observers must remain stationary, limiting a single flight to a maximum coverage area of 3.14 square miles, or about 2000 acres.

This limitation can have direct implications on the design of the aircraft. Photogrammetric concerns aside, the flight speed and dynamics of the aircraft are typically limited such that the aircraft is small and agile enough capable of maneuvering within the limits of the LOS requirement. A small and agile vehicle is therefore preferred. Furthermore, strictly for coverage planning, an aircraft capable of covering more than 2000 acres of coverage can have inefficiencies.

The FAA has additional operational stipulations for UAS. Flight is restricted to "non-populated areas", as defined by areas shown on an FAA Sectional map. This restriction is safety based, and is designed to minimize collateral damage if a UAV impacts the ground with sufficient kinetic energy. Furthering this restriction, UAS are prohibited from flight over roads and highways.

Photogrammetric Parameters

Embodiments of the invention can be applied to UAS, as well as other vehicles, such as a terrestrial robot, submarines, land vehicles, and/or watercraft. The sensor can be "inputted" into an embodiment of a system in accordance with the subject invention as a set of parameters. Embodiments can utilize, and/or account for, sensors, such as optical imaging sensors, cameras, video apparatus, or other devices used for data collection or area coverage. For a UAS, the sensor can be a photogrammetric camera, a LIDAR system, and/or other sensor, where LIDAR is a remote sensing technology that measures distances by illuminating a target with a laser and analyzing the reflected (backscattered) light. Likewise, for a farm tractor the sensor can be the boom collecting crops or the nozzle array delivering a substance (e.g., fertilizer, pesticide, or water).

In specific embodiments, the sensor is described in the system in terms of the sensor's "footprint", or width and height, as projected onto the ground or other coverage area. For some embodiments, such as farm equipment, this footprint can have a height of 0, and a width based on the implement being used. For other embodiments, such as a lawnmower, the height and width can be a direct projection of the cutting area. For specific aircraft, this projection is given by Equation (2-1) where f is focal length of the camera, y is the sensor length of the imager in the camera, G is ground coverage.

$$G = \text{Altitude} \times \left(\frac{y}{f}\right) \quad (2\text{-}1)$$

This footprint is a secondary consideration, and is actually a driven dimension. The flight planning process can begin with the selection of desired resolution, such as in units of centimeters per pixel. Given the fixed optics of the imaging system, this specification gives the maximum distance away from the target to achieve this resolution. For aerial applications this distance is typically altitude, and the target is the ground. Equation (2-2) gives the resolution, with G defined as above and $y_p$ is given as the number of pixels of the sensor in the y direction.

$$\text{Resolution} = \frac{G}{y_p} \quad (2\text{-}2)$$

Another parameter is the "side overlap" of each image, and is determined based on a requirement of 2-D or 3-D image products. Typically, 3-D overlap is specified so as to result in 66% overlap laterally from image to image. This percentage then impacts the width of the flightlines. Percent Side Lap (PS) is given by Equation (2-3) with G defined as above and W as the width between flightlines.

$$PS = \left(\frac{G-W}{G}\right) \times 100 \qquad (2\text{-}3)$$

The "height" of each image is also a factor, and can depend on the frequency at which images are taken. Forward Overlap, or Percent End Lap (PE), is a similar parameter to PS and typically is also 66%. PE is calculated in Equation (2-5) using G, and the distance between picture exposures defined as the Airbase (B). For the NOVA 2.1 aircraft, the image rate is limited to one image every 2.3 seconds, setting B in Equation (2-4), with A being airspeed and $t_p$ being time between pictures.

$$B = \frac{A}{t_p} \qquad (2\text{-}4)$$

$$PE = \left(\frac{G-B}{G}\right) \times 100 \qquad (2\text{-}5)$$

Table 2-1. shows the parameters used for the NOVA 2.1 aircraft. The results from Equations (2-1) through (2-5) using Table 2-1. are combined and displayed in the CONOPS table shown in FIG. 6. FIG. 6 is read as follows: Given the mission, choose a resolution desired on the left and read off the required width for flightlines. Next, read off the altitude required for that resolution. Finally, based on wind, choose a groundspeed to give the desired coverage. For boxes to the lower right, groundspeeds are only valid for individual photos. Boxes in the middle are good for 2-D mosaics. Boxes in the upper left are valid for 3-D mosaics.

The wind can be a limiting factor, and given the performance of the aircraft, there are many scenarios where 3-D coverage may not be possible for a given wind condition.

Evers shows that a better flight envelope can be achieved with the addition of flaps, and the minimum flight speed can be decreased even further, e.g., from 15 m/s down to 13 m/s [5]. The imaging problem can be considered a bandwidth-limitation based problem, due to the bandwidth required to send 10 Megapixel (29.9 MegaByte) images uncompressed over a USB2 protocol (480 MegaBit/Second). An improved payload that incorporates a newer DSLR camera with different protocols, or an industrial camera that supports full GigE transmission standard, can reduce or eliminate this transfer problem, and increase the imaging rate as high as, for example, video standards (24-30 fps).

TABLE 2-1

Photogrammetric parameters

| Variable Name | Variable Symbol | Value | Units |
|---|---|---|---|
| Exposure Interval | $t_p$ | 2.3 | sec |
| Focal Length | f | 2.5 | mm |
| Sensor X | x | 12.85 | mm |
| Sensor Y | y | 17.15 | mm |
| Sensor X Pixels | $x_p$ | 2736 | pixels |
| Sensor Y Pixels | $y_p$ | 3648 | pixels |

Setting Flightlines

Embodiments of the invention can break up the determination of a flightplan into two parts, namely, determining the optimal flightlines and determining the best way to travel between said flightlines. In general, optimizing the flightlines will have the largest impact on the overall efficiency of the flight, as most of the time spent during the flight is traversing flightlines. Furthermore, the turns between flightlines can be determined independently of the flightline parameters once the optimal flightlines are selected. Specific embodiments can determine flight curves, which can have curvatures, turns, arcs, or other shapes. Such curves are preferably determined such that the vehicle, such as an aircraft can continue to gather sensor data of the target while traveling along such curves (e.g., the aircraft is not tilted at an angle that the sensor no longer collect data that can be used).

The Target Area

Figure 7A:
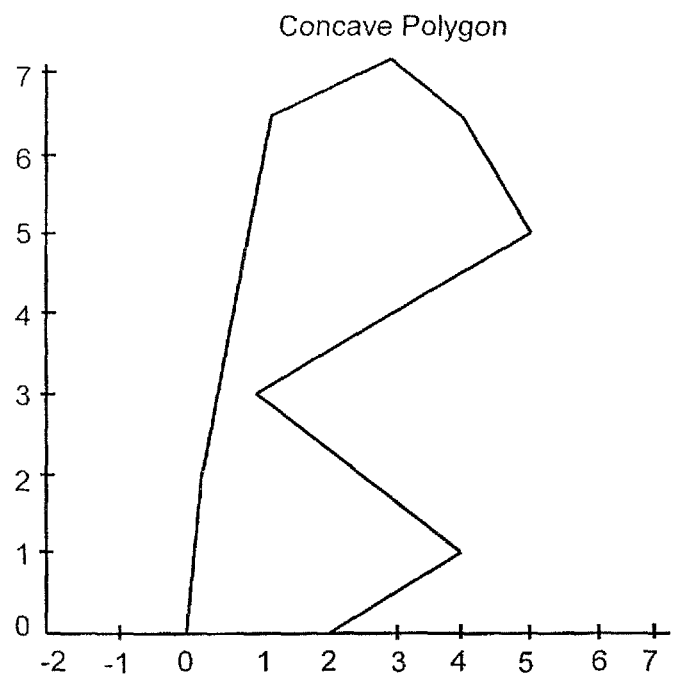
FIGS. 7A-7B show a concave polygon (FIG. 7A) vs. a convex polygon (FIG. 7B).
Figure 7B:
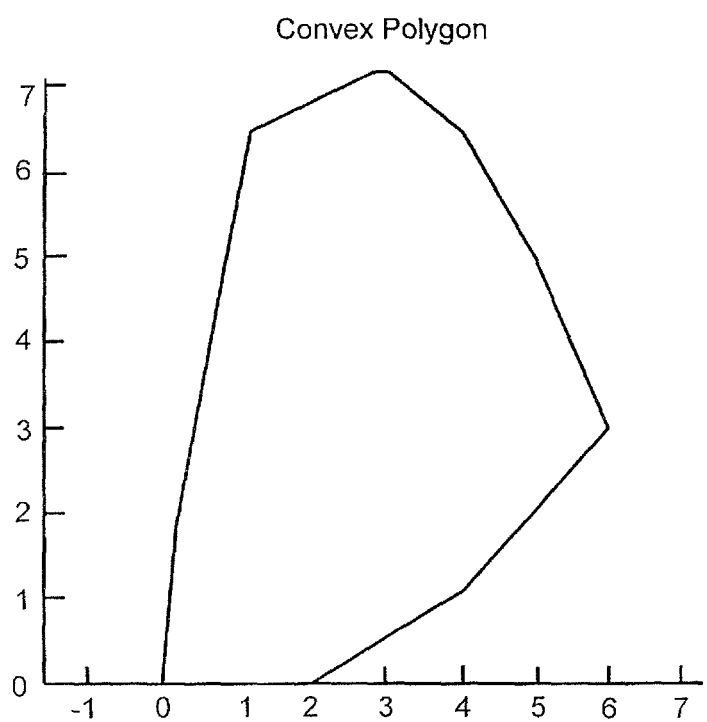

The search area, or target area, is received and taken into account by the subject algorithm, also defined as the target area. In general, the search area is defined as a closed, continuous set of lines defined by n vertices (V) in the Cartesian coordinate system. These closed lines form polygons (P) with n faces. Generally, non-intersecting polygons are divided into two categories. A polygon is classified as convex if, given any two points on any face, the line drawn between those two points lies (inclusively) in the polygon, bounded by the faces. A concave polygon is simply non-convex [12]. FIGS. 7A-7B show the difference between two arbitrary polygons.

In a specific embodiment of the subject algorithm, the search area is entered as one or more convex polygons, where concave polygons can always be decomposed into constituent convex polygons. Choset summarizes several methods to use exact cellular decomposition to decompose these concave polygons into subsets of convex polygons [3], which is incorporated herein by reference for such teaching. Li teaches a method more defined to this particular case, and solves several of the problems associated with decomposition, such as global optimization, coverage charting, and transition from one cell to another [11]. The convex polygon can be used as the base geometric unit for arbitrary search areas, in accordance with an embodiment of the subject algorithm. Embodiments of the subject algorithm can be as a "plug in" to embodiments utilizing methods of Li and Choset incorporated by reference for the optimization of each cell.

Specific embodiments can receive the target area as any shape and then determine a convex polygon that includes the target area as a modified target area for which a flight path can be determined.

Regarding convex polygons inputted to, or determined by, embodiments of the subject algorithm, a "line of support" (l) is any line that intersects the polygon P, and is such that the interior of P lies to one side of l [19]. Lines of support can occur collinear to any faces of a convex polygon, collinear to any non-intersecting face of a concave polygon, or at a vertex, such that the line does not intersect the polygon. These cases are shown for a convex polygon in FIGS. 8A-8C. The span (S) of a polygon is the distance between a pair of parallel lines of support. The width (W) of a convex polygon is the minimum span. As stated by Prizadeh, W is the smallest size opening that the polygon can "fit through".

Figure 8A:
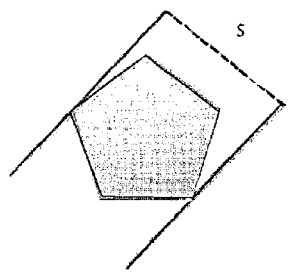
FIGS. 8A-8C show lines of support for Vertex-Vertex (FIG. 8A), Face-Vertex (FIG. 8B), and Face-Face (FIG. 8C).
Figure 8B:
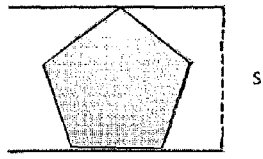
Figure 8C:
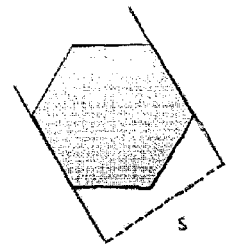

There are only three possibilities for combinations of parallel lines of support. The first case is the most general, and is when both lines are anchored by a vertex, as shown by FIG. 8A. The second case is less general, and occurs when one of the lines is collinear to a face of the polygon, and the other line of support is anchored on a vertex, as shown by FIG. 8B. The third case is a special case of the second case, and is when both lines are collinear to separate faces of the polygon, as shown in FIG. 8C. Obviously, the third case can only occur if the polygon has a set of parallel faces.

As proven by Prizadeh, and implemented by Li, the width of a polygon only occurs in the vertex-edge case of span (or by extension edge-edge). Intuitively, it makes sense that the minimum width is along one of the edges of the polygon. The challenge of the optimization problem addressed by embodiments of the invention is to optimize based on conflicting factors, such as geometry, a moving reference frame (wind), and real world parameters (arbitrarily constricting the search space). The largest factor, and, consequently, the one evaluated first, is the most efficient path based on geometry.

Specific embodiments of the subject method to determine a flight path can allow a user to enter a desired orientation to align the flightlines with respect to the target area. This can be useful if the user wishes to have the vehicle fly in a certain direction or directions. In this case, lines of support can be selected that are parallel to such orientation, even if the lines of support are not "true" lines of support.

In an embodiment, it is assumed that the photogrammetric parameters remain constant for the entire search area. Therefore, at a certain height for the vehicle (altitude), the width of the sensor footprint remains constant, and the number of flightlines required to completely cover the target area is given by Equation (3-1), where [ ] is the ceiling function, S is the aforementioned span, and G is the ground base, or ground coverage as defined in equation 2-1, which incorporates altitude.

$$\text{No. Flightlines} = \left\lceil \frac{S}{G} \right\rceil \quad (3\text{-}1)$$

The span used in Equation (3-1) is dependent on the specific lines of support used. The direction of the parallel lines of support can be defined as the Principal Direction (PD). As this is a coverage algorithm, the area covered will remain the same for any number of flightlines, and, consequently, any PD. However, the number of turns required for that coverage is linearly dependent on the span. In an embodiment, if the goal is to optimize the flight path, assuming coverage of the target area, the optimization of the flight path by minimizing the number of turns can be simplified into finding the smallest span, or width, of the polygon, thereby minimizing the number of turns. Specific embodiments can select lines of support that do not result in the smallest span, such that the "width" of the polygon based on a span that is not the smallest span can be larger than the width of the polygon, based on the lines of support that produce the smallest span. Such selection of lines of support that produce a larger width can be done, for example, to meet another desired criterion. Oksanen similarly states this assumption in a similar problem for agricultural robots [14].

Figure 9A:
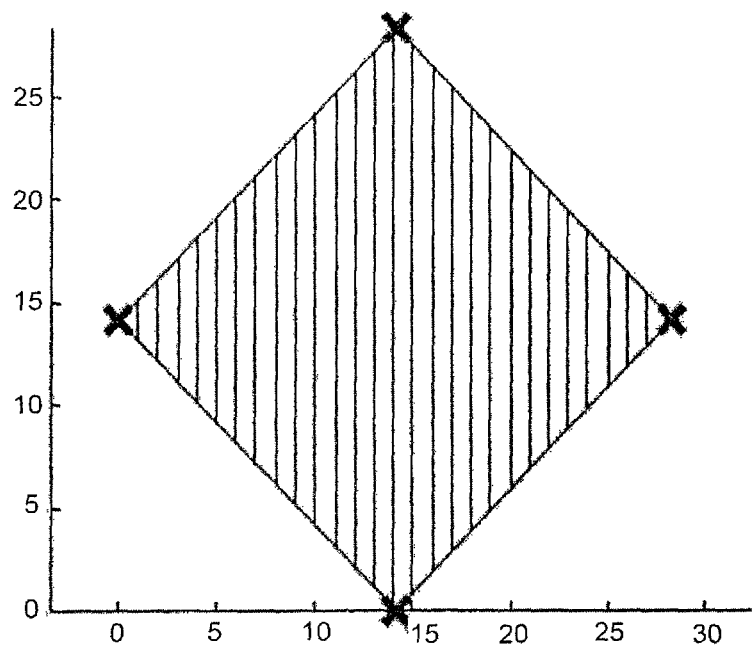
FIGS. 9A-9B show Principal Direction of $\pi/2$ with a diamond (FIG. 9A) and a rectangle (FIG. 9B).
Figure 9B:
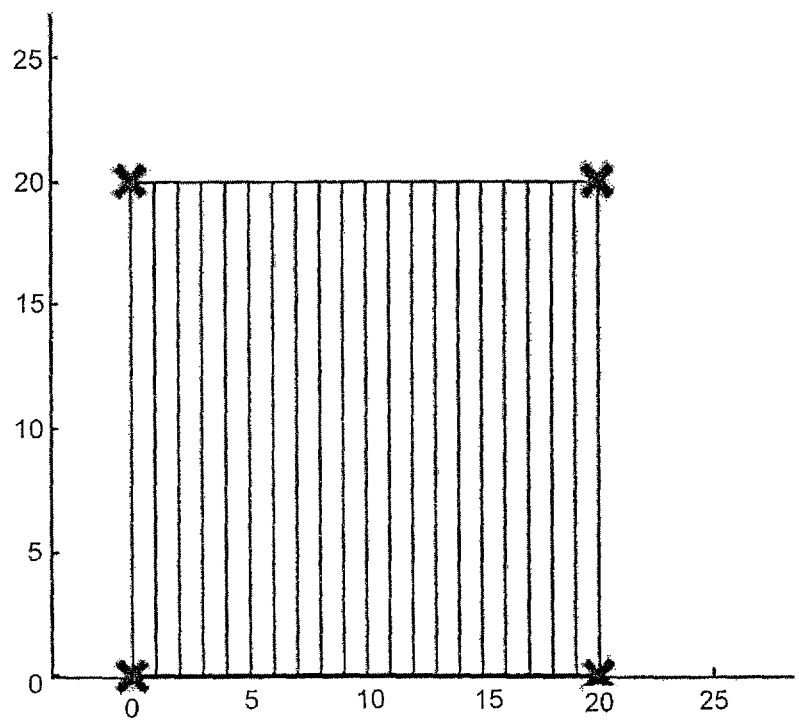

FIGS. 9A-9B show two cases where the PD is set at π/2. In FIGS. 9A-9B, the exact same target area is used with sides of length 20 m, where the target area is rotated 90 degrees around its centroid from FIG. 9A to FIG. 9B. A sensor width is arbitrarily defined at 1 m for simplicity. In FIGS. 9A-9B, the span is 28.284 m in FIG. 9A, while the span is 20 m in FIG. 9B. Referring to equation (3-1), and the target areas in FIGS. 9A-9B, there are 29 flightlines in FIG. 9A, and only 20 flightlines in FIG. 9B.

Figure 10:
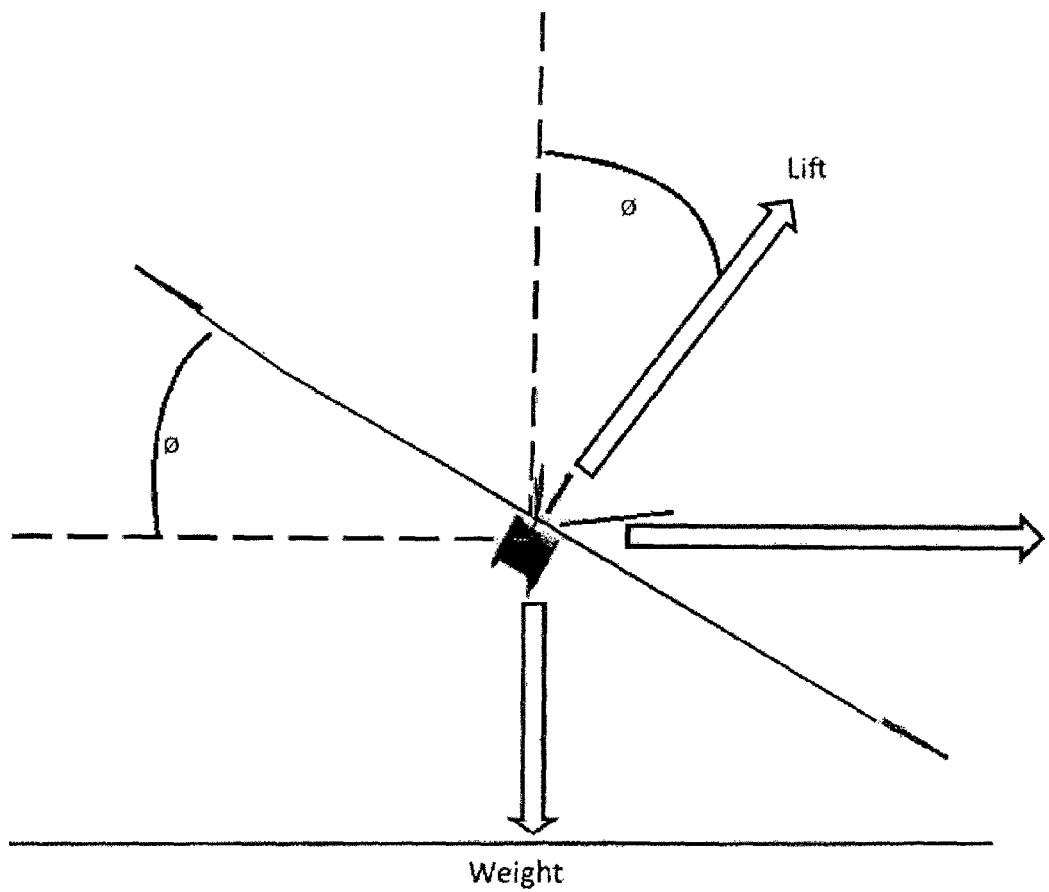
FIG. 10 shows forces on an aircraft during flight.

Kinematic optimization also favors minimizing the number of turns. Turning the aircraft is typically the largest optimization penalty to time and energy. From a flight perspective, FIG. 10 shows that, while the aircraft is banking, the lift vector needs to be increased in comparison to the lift vector when the aircraft is not banking, in order to maintain altitude and airspeed. Equation (1-6) shows that the Lift required in a turn is a function of the cosine of the angle of the turn, or roll angle.

$$\text{Lift} = \frac{\text{Weight}}{\cos\theta} \quad (1\text{-}6)$$

Since the lift vector is now a function of the roll angle θ, more energy is required to maintain the aircraft at the same altitude and airspeed. Finally, from a photogrammetric perspective, in certain embodiments, the aircraft is poised at an angle above a threshold angle, the sensor is assumed to no longer be capable of collecting sensor data that can be used. In a specific embodiment, this threshold angle is 10 degrees from nadir. For angles greater than the threshold angle, the data collected can accumulate too much error to be useful, and the data collection footprint shrinks to zero, which can cause turns to be a large, if not the largest, driving factor in optimizing a flight path. Even in cases where the flight direction is in the most inefficient orientation with respect to the wind, the vehicle is still within its target area and is still collecting data for a larger percentage of the time when the number of turns is minimized.

In an embodiment, the most optimal flight path is determined, where the most optimal flight path is a flight path that minimizes turns. Minimizing turns minimizes the time the vehicle is off target, or time the vehicle is not acquiring useful sensor data. Again, in further specific embodiments, flight paths that do not have the minimum number of turns can be determined, the principle direction can be such that the flight path does not have the minimum number of flightlines, and/or flight paths can be based on orientations of the flightlines to the polygon that do not result in the minimum number of flightlines and/or turns.

Once target parameters are received that provide a description of the location of the target area, and a geometric representation of the target area is created, such as a convex polygon, data about the polygon can be entered into the algorithm. In an embodiment, the polygon is defined by the common method where vertices are given in Cartesian coordinates, in a counter-clockwise manner starting with the lowermost, leftmost vertex. The faces (F) of an n-face polygon are then defined from the vertices, with $F_1$ being comprised of vertices (i) and (i+1), except for face (n), where the vertices are (n, $i_0$). No two consecutive edges are collinear, meaning that each edge has a finite difference in angle. In a specific embodiment, the target parameters are the vertices in Cartesian coordinates in a counter-clockwise manner starting with the lowermost, leftmost vertex. In further specific embodiments, the vertices can be entered in a clockwise manner, and/or starting with any vertex. In further specific embodiments, one or more of the following features can be implemented: (i) polygon is limited to a rectangle or other set of specific polygons; (ii) circles are accepted; (iii) circles and ellipses are accepted; (iv) longitudes and latitudes are accepted; graphical representations are accepted; and/or other data is accepted that conveys the location of the target area. The method can then create a geometric representation of the target area from the target parameters and/or data. An embodiment is described that creates a convex polygon, but other geometrical representation can also be utilized.

Once the geometric representation is received and/or created, the method can next determine the span for each face. Li teaches an algorithm that optimizes flight path strictly on the geometric parameters of the flight area. The Li algorithm has some severely restricting assumptions, such as the turn radius of the vehicle is exactly that of the flightline width [11]. The Li algorithm also assumes stereoscopic vision using video cameras looking ahead of the aircraft, where embodiments of the invention can be applied to the use of other sensors, such as the use of nadir still photography. Nevertheless, Li does introduce a method that reduces the time complexity of finding the span of a convex polygon from $(o)n^2$ to $(o)n$. Specific embodiments can incorporate the Li algorithm, which is incorporated herein by reference, to find the span of a convex polygon.

The span of a particular side is given by Equation (3-3), where i and j are indices for vertices, and $V_X$ and $V_Y$ are the X and Y components of the vertices.

$$S = \frac{\left| \begin{array}{c} (Vy_{i+1} - Vy_i)Vx_{j+1} - \\ (Vx_{i+1} - Vx_i)Vy_{j+1} + Vx_{i+1}Vy_i - Vx_iVy_{i+1} \end{array} \right|}{\sqrt{(Vy_{i+1} - Vy_i)^2 + (Vx_{i+1} - Vx_i)^2}} - \frac{\left| \begin{array}{c} (Vy_{i+1} - Vy_i)Vx_j - \\ (Vx_{i+1} - Vx_i)Vy_j + Vx_{i+1}Vy_i - Vx_iVy_{i+1} \end{array} \right|}{\sqrt{(Vy_{i+1} - Vy_i)^2 + (Vx_{i+1} - Vx_i)^2}} \quad (3-3)$$

Li [11] points out that the numerators in Equation (3-3) have the same sign. Furthermore, because of the nature of convex polygons, the span found between $F_{(i)}$ and $F_{(i+t)}$ are monotonically increasing to a global maximum, and then are monotonically decreasing. Therefore, the search area for minimum span can be decreased by looking for the change in sign in magnitude of a line drawn from a vertex $V_{j+1}$ and all other vertices not on $F_i$ (Vi+1 through $V_{j-1}$).

Figure 11:
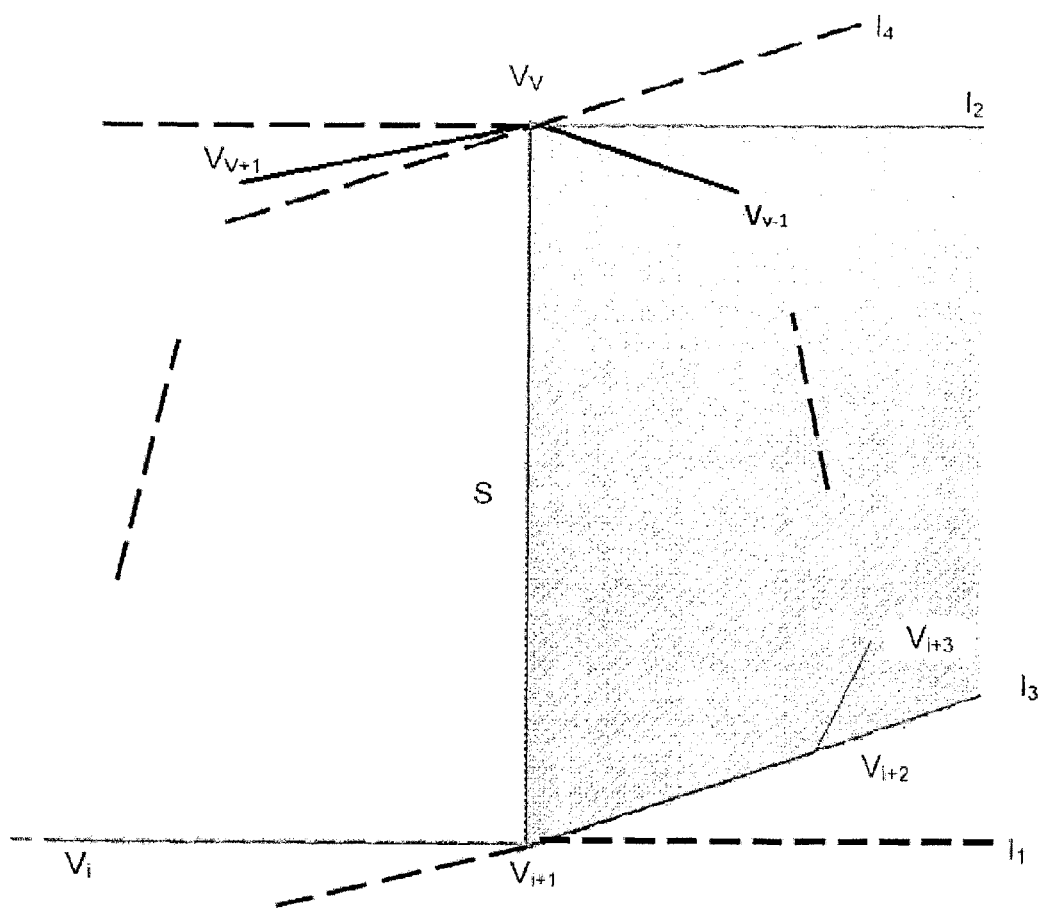
FIG. 11 shows an embodiment of a method for reducing the complexity of the search area for the span of a polygon, where for a given Vertex ($V_i$), and its Antipodal Vertex ($V_V$), the $V_V$ of $V_{(i+1)}$ through $V_{(V-1)}$ will only exist in $V_{(V+1)}$ through $V_{(i-1)}$.

Li [11] is able to further reduce the search space, as shown in FIG. 11. If the antipodal vertex ($V_V$) is defined as the vertex that is diametrically opposed to $F_{(\overline{n},\overline{n}+1)}$ that admits lines of support [21]. Li [11] invokes the following summarized theory: Given a convex polygon defined as above, the antipodal vertex of $F_{(\overline{n},\overline{n}+1)}$ is $V_V$, and the antipodal vertex of $F_{i+1}$ is $V_V$ or subsequent vertices. FIG. 11 clearly shows how the search area decreases based on the antipodal vertex condition presented here. Any span involving vertex $V_1$ through $V_{V-1}$ will not be the width, thus decreasing the search space from $(o)n^2$ to $(o)n$.

In a specific embodiment, the width found from the minimum span search space is then used in accordance with the decision tree Table 3-1. In alternative embodiments, the PD can also be the same direction as the wind, or can be selected based on any other desired criteria. Preferably, the PD is selected such that turns do not need to be made into headland where the height of a turn is greater than or equal to the headland.

Real World Considerations

There are several real-world factors that may further limit the search space a PD for the of the target area. Excluding vehicle kinematics, the first consideration that impacts the search for a PD is the geometry of the target area itself, followed by the 3-d nature of terrain, and, finally, any wind that might be present.

Figure 12:
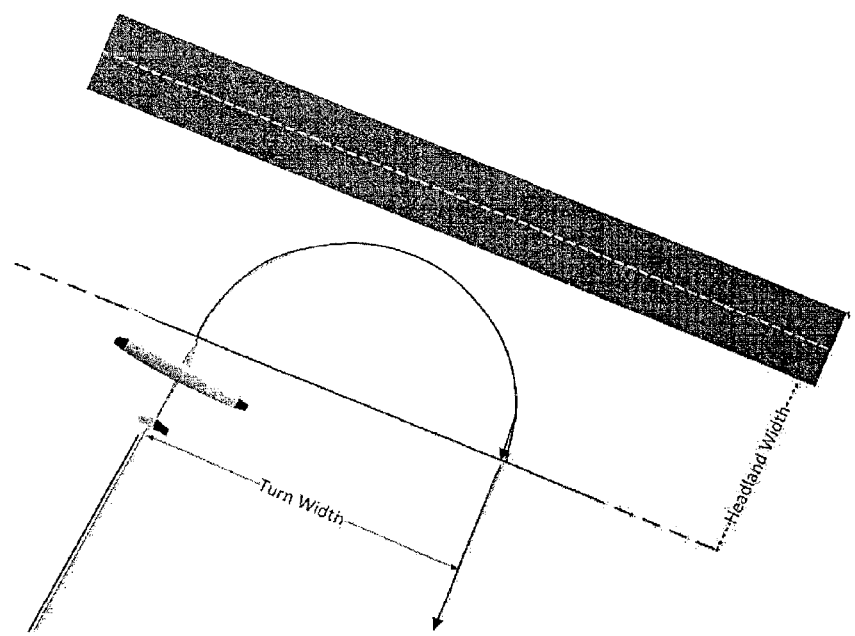
FIG. 12 shows a safety constricted headland with a road.

Analogous to agricultural applications, the area where the vehicle makes its turn between flightlines may need to be accounted for to ensure safe flight. In farming this area in which the vehicle turns is called "headland", and is present in nearly every field [14]. Headland can be separated into three categories: unlimited width, limited width, and zero width. Headland width is defined in FIG. 12. Headland with unlimited width is the case where there is no constraint on the turn radius of the vehicle, and it can stray as far out of the target area as needed to make a turn, without penalty. The second category is where there is a known and finite width to the headland. This case occurs when there is some obstruction a finite distance from the target area (such as a tower, park, or habited area), and is shown in FIG. 12. In a specific embodiment, computation of the turning "height (H)", defined as the distance in a direction parallel to the flightline and encroaching on the headland the vehicle has to travel during a turn, is calculated and taken into account during determination of PD. In a specific embodiment, if the height of the turn is less than the headland, then the direction of the PD is not limited by the headland. The third category is for zero width headlands, as in the scenario where a feature directly abuts the search area (such as a road, fence, or power line). Flight safety and legal considerations will typically override other aspects of optimization. In a specific embodiment, with a zero width headland, the search space for flightline orientation is restricted such that no orientation can be selected where the turns will encroach into the headland. Further embodiments can choose PD based on no turns toward a headland, no turns toward a headland where the turn height is at least a certain percentage of the headland width, such as at least 95%, 90%, 85%, 80%, and/or 75%.

Figure 13:
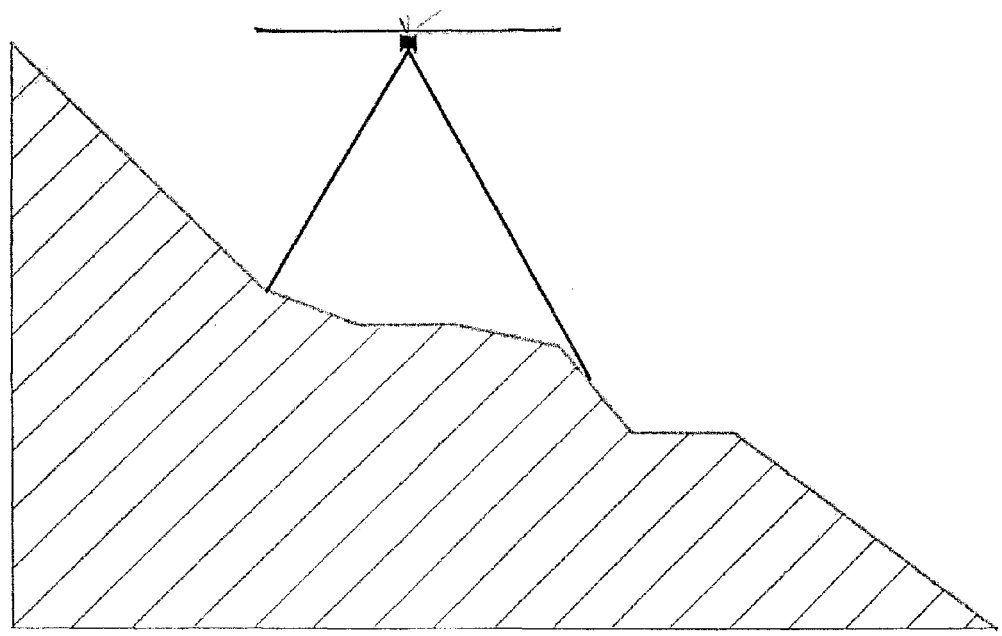
FIG. 13 shows flight with terrain.

Terrain is another "real world" scenario that can cause the flightplan to diverge from the optimal flightplan based solely on geometric consideration. As an example, the scenario of a survey of a mountainside, as shown in FIG. 13, can present this issue. If the terrain were sufficiently steep such that variations in elevation have secondary impacts on resolution through direct impact on relative altitude, the flightlines can be oriented to accommodate for this parameter, such as setting the flightlines so that they follow the contour lines of the feature being mapped. Specific embodiments can incorporate curved flightlines to accommodate such situations. Preferably, the angle of the aircraft remains less than the threshold angle where the sensor does not acquire meaningful data.

As discussed herein, wind magnitude and direction have a large impact on the turns of the vehicle, and are often a meaningful consideration in optimizing the turns. However, for search areas with aspect ratios near 1, with infinite headland, and without terrain considerations, wind direction and magnitude have the largest impact on PD. For many natural resource applications, such a scenario is common for data collection. Target areas are often away from populated areas, in flat land, and are used for sampling so an arbitrary box is selected for the target site [2]. In this case, the most optimal flightplan is typically the one that uses the aggregated least amount of energy for the flightlines themselves.

For geometric considerations, given an arbitrary target area, the most efficient case is typically where the PD is collinear to the wind vector. If this is not the case, the vehicle's heading will differ from its course to track a flightline, reducing overlap and requiring a smaller flightline width, and by Equation (3-1) increase the number of required flightlines. The same argument applies to minimizing flight energy, as with the walking in the same motion as a crab, more energy is expended per unit of flightline traversed when the heading differs from its course to track a flightline. Furthermore, work done by Evers shows that air vehicles designed to take advantage of speed-to-fly theory can optimize energy consumption when in line with the wind. By changing the camber of the wing, the drag can be minimized for any given airspeed. In short, Evers concludes that decambering the flight surface and traveling faster upwind is more efficient than a constant flight speed.

Table 3-1 shows the methodology for PD selection in accordance with a specific embodiment of the subject method to determine a flight path. If the target area is for sampling, and, therefore, is a box, then the algorithm attempts to select the PD that is collinear to the wind. If the target area is a polygon, then the PD attempts to be collinear to the lines of support. If headland constraints are present, then the algorithm adjusts accordingly.

Creating Flightlines

Setting the principal direction (PD) for flight is important. However, the flightlines themselves still need to be generated. The manner in which flightlines are generated depends on the slope of the principal direction with respect to a Cartesian coordinate system. There are four general cases for the slope of the principal direction as described in Table 3-2. The Cross Track Direction is defined as the direction orthogonal to the PD.

Figure 14:
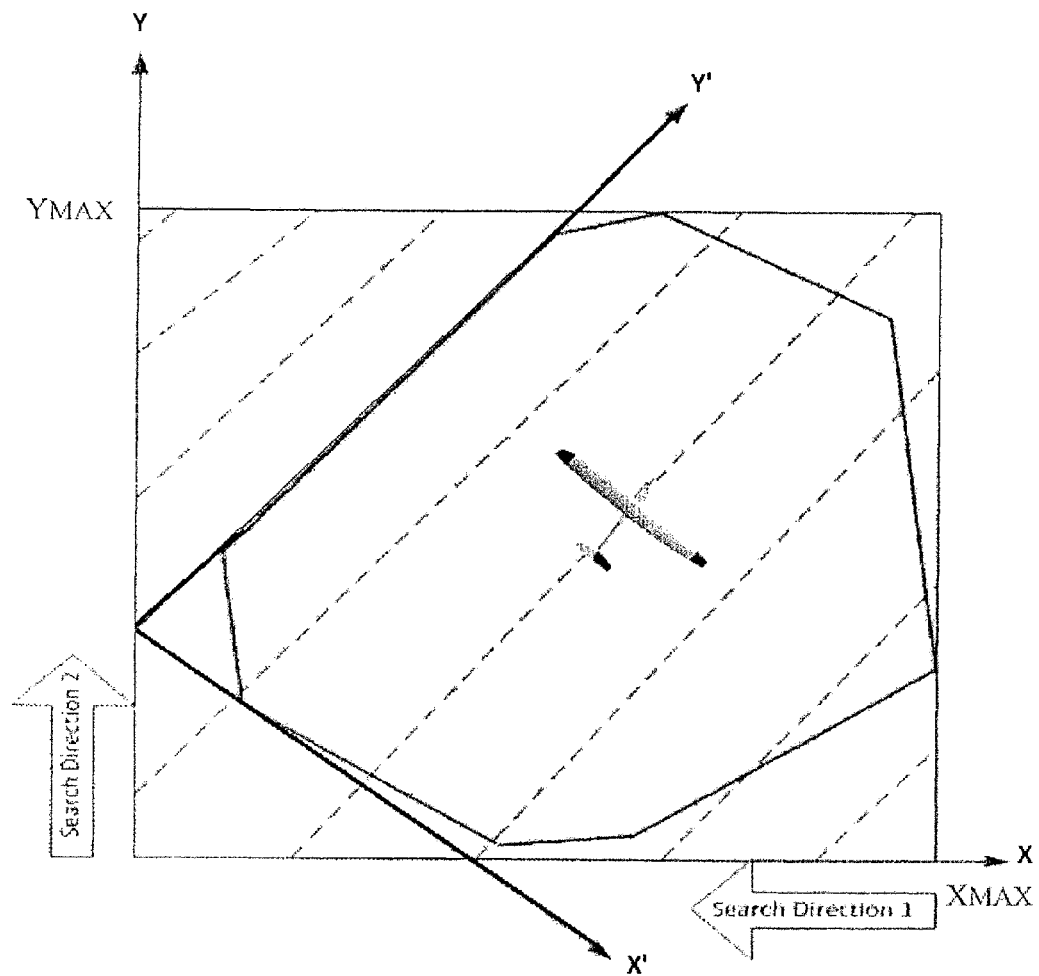
FIG. 14 shows creation of untrimmed flightlines with slope >0.

In a specific embodiment, the general search pattern is as follows: (i) the algorithm calculates the line parallel to the principal direction, and propagates flightlines in that direction, essentially creating a new coordinate frame. In this frame, the principle direction is the positive Y', and the right-hand perpendicular direction is X'; (ii) the maximum and minimum X' and Y' points are calculated, bounding the polygon. The origin of this new frame is the "minimum" and is converted back to $X_{min}$ and $Y_{min}$, while Y'max and X'max are similarly converted; and (iii) the flightlines are propagated out according to Table 3-2, and similarly shown in FIG. 14.

If the principal direction is lnf or –lnf, then X' is collinear to X and the search is along the X axis only. If the principal direction is 0, then X' is collinear to Y, and the search is along the Y axis only. In a specific implementation, regardless of the direction, the generated flightlines are larger than the portion of the flightline through the target area and pass through the polygon on both sides. This is important for the following step where the flightlines are trimmed down to be exclusively within the target area. One algorithm that accomplishes this requires that a line pass completely through the polygon. However, this is only for computation and is never physically implemented.

Inclusion of Lines in a Polygon

The next step is to determine if a particular flightline exists in the target polygon, and this inquiry can be performed by a sub-algorithm. For this sub-algorithm, a base method implemented by Foley called "parametric line-clipping" can be used [7], and is hereby incorporated herein by reference. For this sub-algorithm the conventions discussed above apply, namely, that a polygon is defined in a CCW manner by vertex. The flightline can be defined by its endpoints, $P_0$ and $P_1$, the parametric parameter (t), and the vector defined from these points as the same face vector (F). The line segment created from F can be parametrically defined by Equation (3-4)

$$P_{(t)}=P_0+t(P_1-P_0)=P_0+tF \quad (3\text{-}4)$$

where the value of t is the percentage of the line defined from $$0 \le t \le 1 \quad (3\text{-}5)$$

where $t_0$ entered into Equation (3-4) results in $P_0$ and $t_1$ entered into Equation (3-4) results in $P_1$. If $t_e$ is defined as the value of $P_{(t)}$ where the flightline enters the polygon, and $t_1$ as the value of $P_{(t)}$ where the flightline leaves the polygon. Each flightline will have its own vector. However, only one flightline is computed at a time.

Next, an outward pointing normal vector N from face $F_i$ is defined such that $$N_i = -F_i^\perp \quad (3\text{-}6)$$

Since the polygon is defined in a CCW manner, the outward pointing normal vector will always be to the face vector's right.

Figure 15:
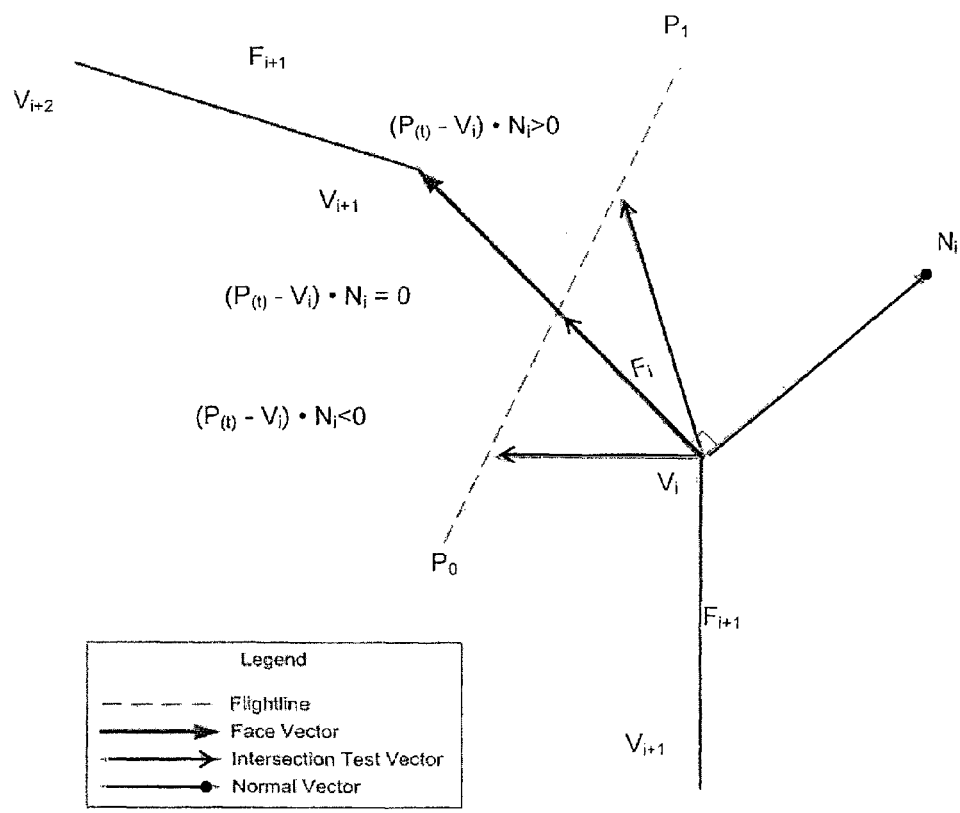
FIG. 15 shows geometry for inclusion algorithm, where the line formed from $P_0$ to $P_1$ is being tested on the Face from $V_i$ to $V_{i+i}$.

Using the dot product and the defined polygon, it can now be determined whether a point is outside or inside of the polygon, and where the transition occurs. Given the orthogonal properties of dot products (the dot product of two orthogonal vectors is equal to zero), the intersection occurs at $$(P_{(t)} - V_i) \cdot N_i = 0 \quad (3\text{-}7)$$

where, when the left hand side of Equation (3-7) is positive, the point is outside the polygon; and when the left hand side of Equation (3-7) is negative, the point is inside the polygon. FIG. 15 shows this in greater detail.

Solving Equation (3-7) for t produces $$t_i = \frac{(V_i - P_0) \cdot N_i}{(P_1 - P_0) \cdot N_i} \quad (3\text{-}8)$$

Figure 16:
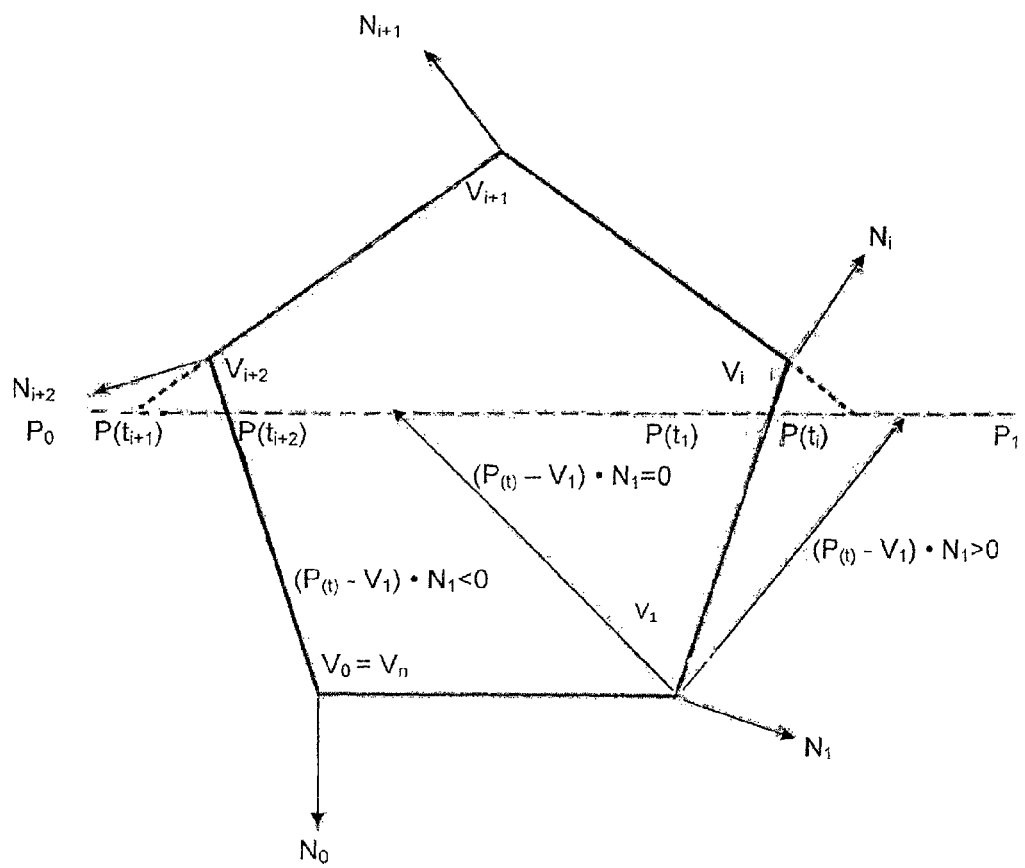
FIG. 16 shows completely labeled polygon for inclusion testing.
Figure 17:
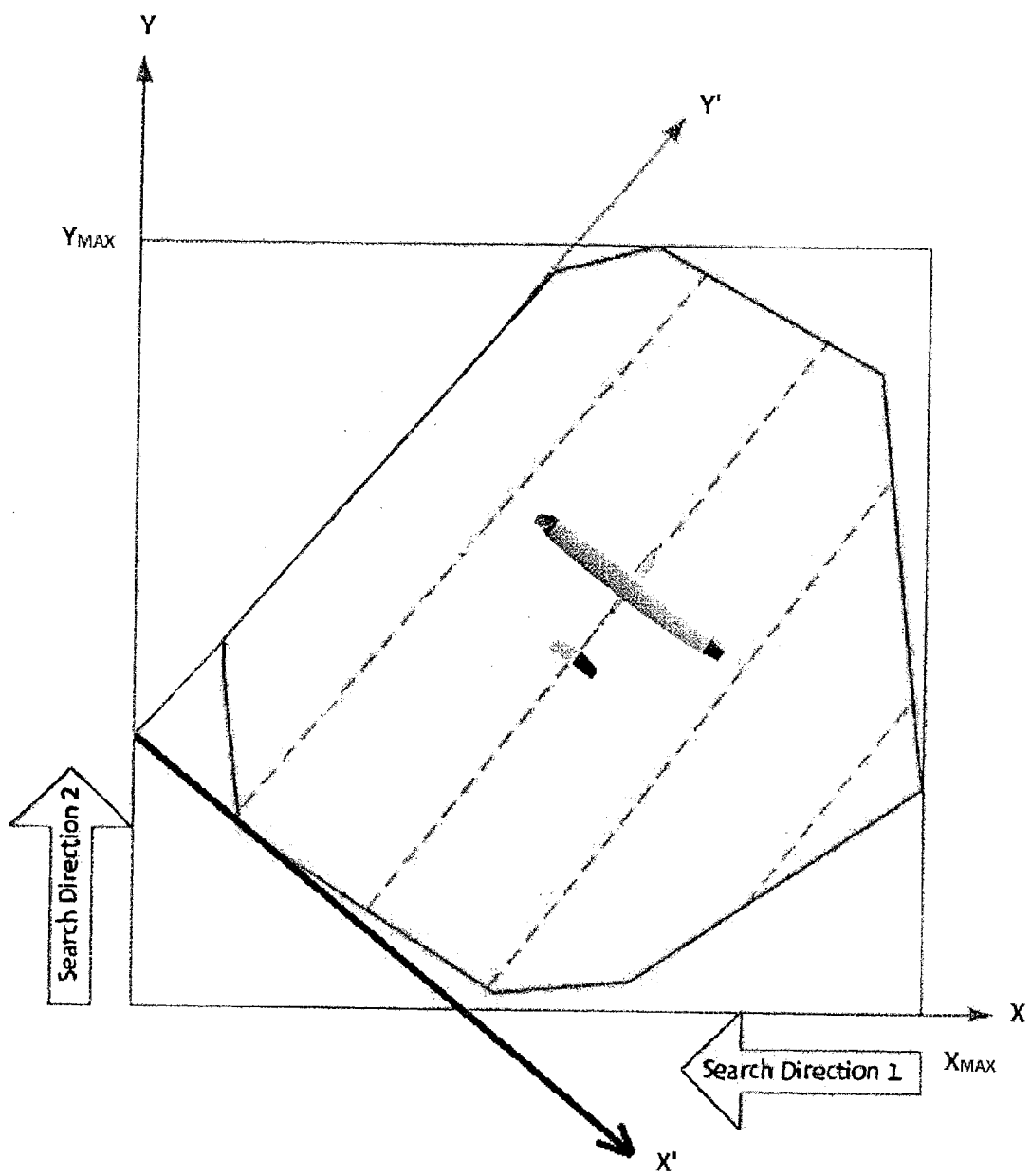
FIG. 17 shows trimmed flightlines after the applied inclusion algorithm.

This result is the basis of the logic tree to set a $t_i$ for each F such that the maximum t is the parametric value where the flightline enters the polygon, and the minimum t is the parametric value where the flightline leaves the polygon. A specific embodiment implements the following:

For each flightline, an initial $t_e$ and $t_1$ are set at 0 and 1, respectively. For each face, Equation (3-8) is evaluated resulting in a value of t. The denominator and numerator can each be evaluated, simplifying the process. The denominator and numerator can be split into logical cases [=0, <0, >0]. The goal is to find the maximum $t_l$ and minimum $t_e$ in the search space of each F of P. For each edge, the algorithm evaluates the statements in Table 3-3. FIG. 16 shows an example of a complete polygon testing for a single line of inclusion and FIG. 17 shows an example of the completed process.

Ordering Flightlines

Once the target area is defined, the principal direction is selected, and the flightlines are generated. The flightlines can then be ordered to create a flightplan. Continuing to analogize to farming, for terrestrial cases, the slope of the land often dictates the order of lines, and parallel paths are typically selected to minimize wasted space. Traveling these parallel paths in a manner so as to go down one flightline and back up the adjacent flightline is referred to as a boustrophedon path from the Greek term "as the ox turns". The principle is that adjacent flightlines are traversed in opposite directions and in sequence. Embodiments of the invention, which will be described, can restrict flightplans to having boustrophedonic flightlines. Further embodiments can implement flightplans that have other parallel-type paths, such as the dipoles used with prior NOVA systems, or a combination of dipoles and boustrophedon. FIG. 18 shows a dipole path for flightlines on the left and a boustrophedonic path for flightlines on the right. A dipole path may be selected, for example, in a situation where the turn height is greater than the headland width for a flightline width between adjacent flightlines, but the turn height is less than the headland width for a flightline width double, triple, or larger than the flightline width, such that taking a longer path to turn can allow the turn to stay within the headland and, therefore, allow the PD to be parallel to the wind direction where the PD would otherwise not be parallel to the wind.

If the flightlines are limited to boustrophedonic flightlines as shown on the right in FIG. 18, then four choices for order exist. Unless the launch and recovery point is in the direct center of the target area, the order can be such that the vehicle tracks lines "towards" the ground station, or "away" from the ground station as depicted in FIGS. 19A-19D, where FIG. 19A (top left) and FIG. 19D (bottom right) are away from the GCS and FIG. 19B (top right) and FIG. 19C (bottom left) are towards the GCS.

In an embodiment of the algorithm for generating flightpaths, an emphasis is placed on tracking towards the GCS, shown in FIGS. 19A-19D as FIG. 19B or FIG. 19C, such that, all other considerations being equal, tracking toward the GCS is selected. Tracking towards the GCS is preferred, as an error occurring in stable flight tends to occur towards the end of the flight when problems from vibration, heat, and other time dependent physical properties are more likely to occur. By preferring to track towards the GCS, the vehicle can be as close to home as possible later in the flight when problems are more likely, and not progressing up a set of lines "away" from the ground crew.

Optimal coverage paths would tend to locate the ground crew at exactly the middle of a 1 mile target area. However, operational data suggests that the crew is much more often set up closer to a side or corner of the target area. In a specific embodiment, if the crew is in the middle of the area, then the final point in the flightplan is chosen to be "upwind" of the ground crew, so the vehicle has a better chance of returning home. Further embodiments can have the final point in the flightplan "downwind," or at any other angle with respect to the wind direction, depending on the specifics of the flight.

TABLE 3-1

Principal direction selection

| | Infinite Headland | Limited Headland | | No Headland |
|---|---|---|---|---|
| Arbitrary Box (sampling) | PD = Wind | if (height of turn < height of headland) | PD = Wind | PD = collinear to limiting headland face |
| | | else | PD = limiting headland face | |
| Constricted Convex Polygon | PD = orthogonal to width | if (height of turn < height of headland) | PD = orthogonal to width | PD = collinear to limiting headland face |
| | | else | PD = limiting Headland Face | |

TABLE 3-2

Criteria for cross track direction

| Slope of Principal Direction | Cross Search Track |
|---|---|
| Inf, −Inf | Along X axis |
| 0 | Along Y axis |
| >0 | Along X axis across $Y_{min}$ from $X_{max}$ to $X_{min}$, then up Y axis along $X_{min}$ to $Y_{max}$ |
| <0 | Along X axis $Y_{min}$ from $X_{min}$ to $X_{max}$, then up Y axis along $X_{max}$ to $Y_{max}$ |

TABLE 3-3

Inclusion logic

| First Test | Second Test | Third | Result |
|---|---|---|---|
| if (D = 0) | if (N < 0) | | Outside |
| | else | | Since parallel, cannot enter or leave on $edge_i$, Iterate. |
| elseif (D < 0) | $t_e$ = max | | |
| | | if ($t_e > t_i$) | Enters edge after leaving P, cannot intersect. |
| | | else | $t_e = t_i$ Entering edge |
| elseif (D > 0) | $t_i$ = min | | |
| | | if ($t_i < t_e$) | Leaves edge entering P, cannot intersect. |
| | | else | $t_i = t_i$ Leaving edge |

Setting Turns

Determining how the vehicle will travel from one flightline to the next is typically the most time intensive part of flight planning, and, in specific embodiments of the subject method, the most computationally intensive. Simulations have shown that flight efficiencies can be improved up to 19 percent by optimizing the turns between flightlines.

Figure 20:
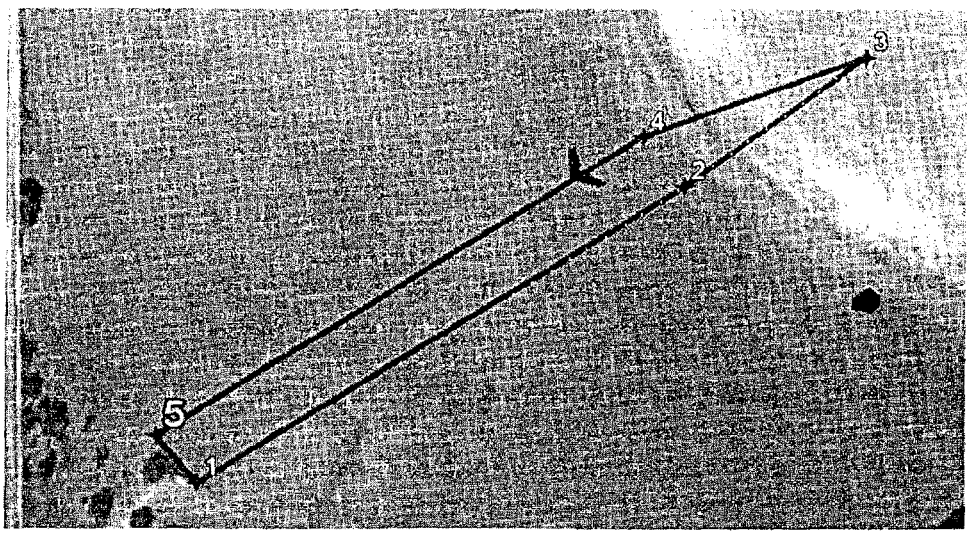
FIG. 20 shows a Virtual Cockpit™ screenshot, flightlines of waypoints 1, 2, 4, 5, and a turning point of waypoint 3.

In the field, turns between boustrophedonic lines are typically accomplished with a single "turning waypoint". In specific embodiments of the subject algorithm, this waypoint serves to position the vehicle so that, at the exit of the vehicle's maneuver, the vehicle will intercept the next flightline at the desired starting point, at an attitude and poise required for data collection. In FIG. 20, a vehicle on the flightline from 1 to 2 uses waypoint 3 is a turning waypoint and enters the next flightline from 4 to 5 at 4.

The following operational procedure is typically used to set turns:

1) Launch aircraft, let orbit one rotation and retrieve wind data;

2) Based on wind magnitude and direction, modify "turning waypoints"; and

3) Observe behavior and modify "turning waypoints" based on first turn.

This operational procedure is crude, and requires a good deal of "engineering judgment" to accomplish. In practice, the turns end up being much longer than necessary, as the operator tends to err on the side of caution so that data is collected when the vehicle reenters the target area.

Figure 21:
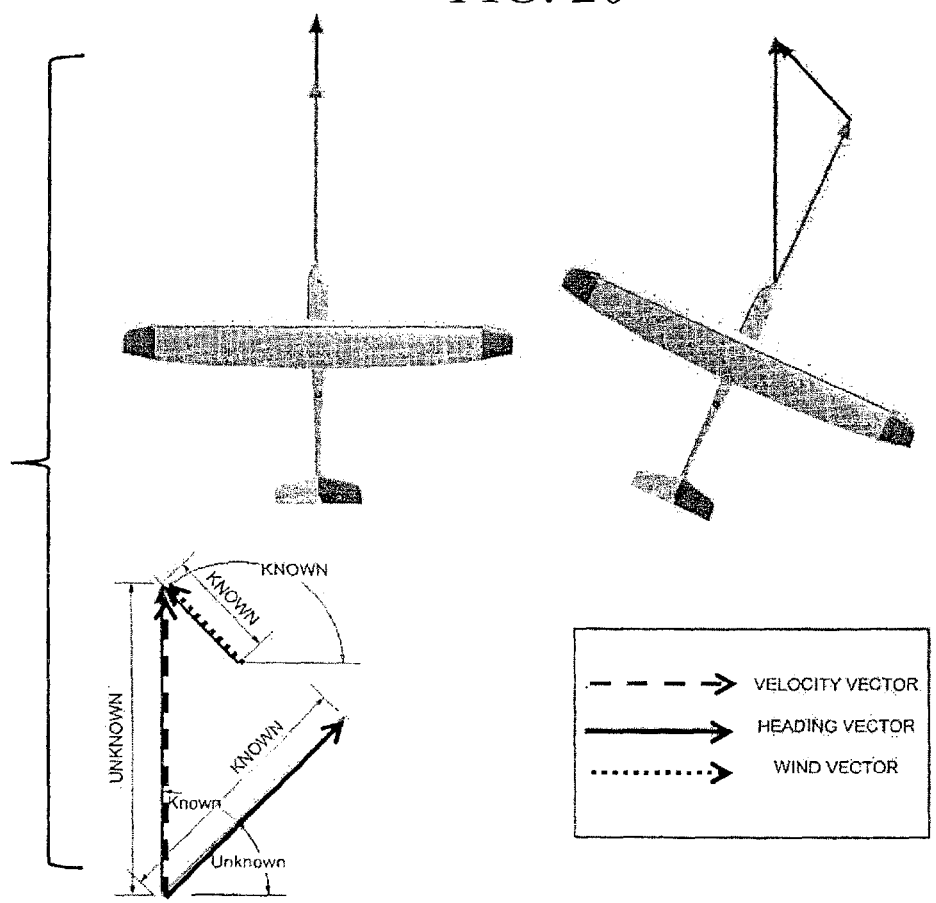
FIG. 21 shows vectors of flight.

For the simulations provided below, a discrete-time method was used to simplify the development, implementation, and visualization of this algorithm. The two basic elements involved herein are the Heading Vector (HV) and the Velocity Vector (VV). The HV is always pointed in the X direction of the vehicle (direction of travel) with a collinear heading. The direction of the HV is defined as the HEADING, and the magnitude of the HV is defined as the AIRSPEED. If there is no wind, then the HV has the same heading and magnitude as the VV. If there is any wind, then the VV will differ from the HV as described in Equation (4-5). The direction of the VV is defined as the COURSE, and the magnitude of the VV is defined as the GROUNDSPEED. FIG. 21 shows the HV and VV in detail, where HV extends from the front of the vehicle, the wind vector extends from the tip of HV and points in the direction of the wind, and VV is the vector extending from the front of the vehicle to the tip of the wind vector. This is because HV plus the wind vector is VV.

Solving for VV with a known HV is a simple vector addition problem. Begin with the HV components in the X and Y directions and sum the X and Y components of the Wind Vector to get VV. A more complicated problem is setting the HV for a desired VV in the presence of wind. Because wind changes the magnitude of the VV, it is not as simple as vector addition.

Consider the kinematic model described below, which constricts vehicle motion to linear motion on a plane. Similar to McGee's analysis, x and y are defined as vehicle motion in the longitudinal and lateral directions with respect to the vehicle, and $\psi$ as the orientation [13]. Next A is defined as the magnitude of the velocity of the vehicle (Airspeed) and $\omega$ as the wind vector.

$$X = \begin{bmatrix} x \\ y \\ \psi \end{bmatrix} \dot{X} = \begin{bmatrix} A\cos\psi + \omega_x \\ A\sin\psi + \omega_y \\ u \end{bmatrix} \quad (4\text{-}1)$$

Next $\delta$ is defined as the ratio of the magnitudes of $\omega$ and A.

$$\delta = \frac{\|\omega\|}{\|A\|} \quad (4\text{-}2)$$

To simplify further equations, $4\psi$ is defined by setting the origin to the direction of the wind vector.

$$\dot{X} = \begin{bmatrix} \cos\psi + \delta \\ \sin\psi \\ u \end{bmatrix} \quad (4\text{-}3)$$

The velocity vector direction or COURSE (v), is defined by:

$$v = a\tan2\left(\frac{\dot{y}}{\dot{x}}\right) = a\tan2\left(\frac{\sin\psi}{\cos\psi + \delta}\right) \quad (4\text{-}4)$$

Backsolving Equation (4-4) with a given desired v for the required $\psi$ yields $$\psi = \sin^{-1}(-\delta\sin v) - \frac{\pi}{2} + v \quad (4\text{-}5)$$

Figure 22:
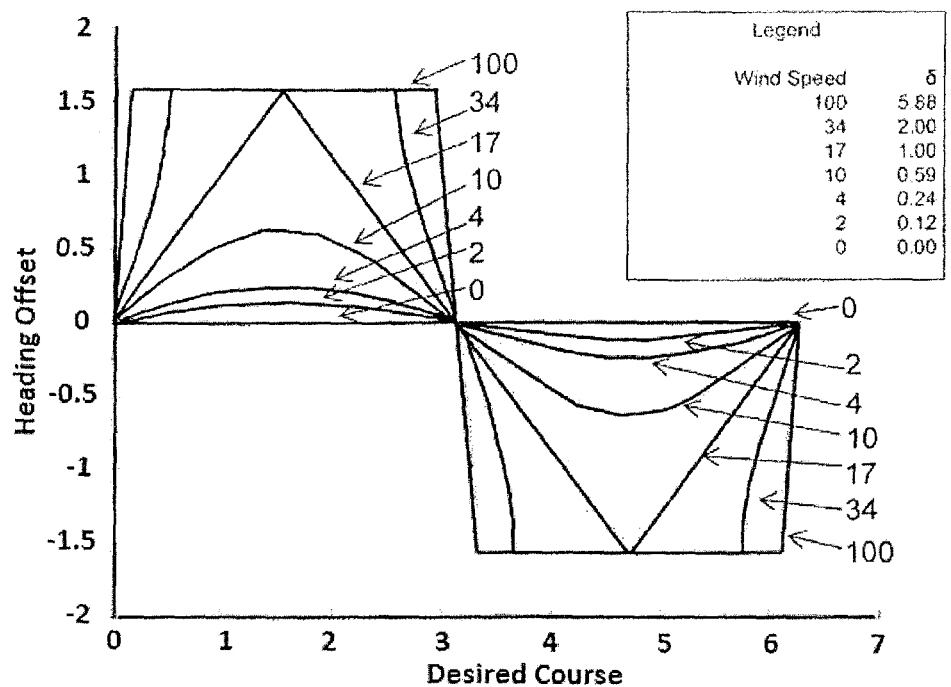
FIG. 22 shows correction heading, or heading direction offset to achieve desired course.

FIG. 22 shows Equation (4-5) given over all headings [0, $2\pi$] and for several $\delta$, such that $\delta=0$ is a flat line having a value of zero; $\delta=2$ starts at zero for a desired course of zero, as do all the curves, increases and falls back to zero at a desired course of $\pi$, and then goes negative and then back to zero as the desired course goes from $\pi$ to $2\pi$, as do all the curves; as $\delta$ increases, the amount the heading offset peaks at increases until $\delta=1$ (i.e., wind speed equals airspeed); for $\delta>1$. Additionally, FIG. 22 shows the limiting case when the ratio in $\delta$ approaches 1. For this scenario (and $\delta \geq 1$) the vehicle is not able to maneuver as desired and is limited to headings parallel to the wind.

Furthermore, the additive or deleterious effects of wind will change the magnitude of the velocity vector. This heading-specific value makes pure-geometrical calculation of an optimal turn very difficult For this reason, in specific embodiments, determining the turns can incorporate discrete simulation.

Further, determining if a turn is to the left or to the right is not trivial. Simply, the definitions of "left" and "right" are arbitrary, and can only be decisively concluded to be complementary directions. This is relevant to embodiments of the invention for determination of turns, when defining whether the i+1 turn is to the "right" or "left" of the preceding turn, and becomes a critical parameter.

Instead of left and right, clockwise and counterclockwise can be defined. A review of the literature defines "clockwise" and "counterclockwise" with self-referential definitions, such as "in the direction of the hands of a clock", and creating a mathematical definition for a computer is challenging.

Figure 23:
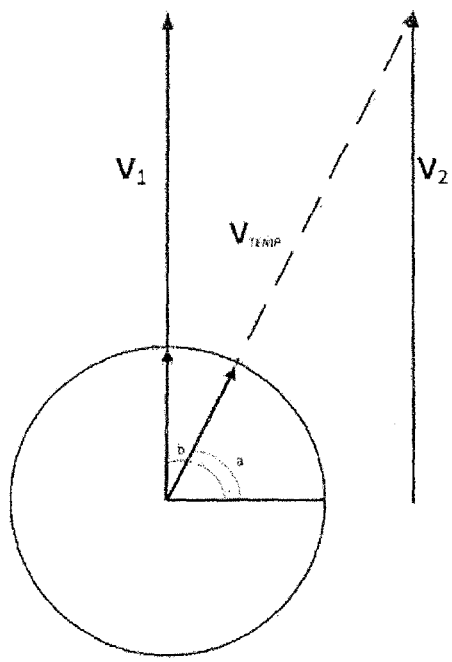
FIG. 23 shows how determination of whether (i+1) flightline is right or left Of $i^{th}$ flightline, where Vector 1 is defined with Angle (b), and Vector 2 is tested with Angle (a) (since (b) minus (a) is greater than zero, as defined by the algorithm, Vector 2 is to the right of Vector 1).

In an embodiment, rather than precisely defining right/left or cw/ccw, the standard defined Cartesian system can be implemented, with a heading of "zero" being collinear to the positive X axis. This coordinate system is pre-defined within Matlab® and many common languages in math libraries. A common function can be written and used to determine whether the direction of one vector was "clockwise" or "counterclockwise" in relation to another vector, and from there the definition of "left" and "right" can be extrapolated. As an example, left (counterclockwise) can be defined when the difference in angle between a vector being tested, and a reference vector, is positive, and right (counterclockwise) defined when the difference is negative. FIG. 23 shows an example of this. Here $V_1$ is defined with angle (b), and $V_2$ is tested with $V_{TEMP}$ defined from the origin of $V_1$ to the end of $V_2$, forming angle (a). Since (b) minus (a) is positive, $V_2$ is to the right of $V_1$.

In an embodiment, a class was written specifically for turns in Matlab®, dealing with HV, VV, and all of the associated functions required for the computation. The primary methodology of the class is an event-driven "update" that iterates HV and VV to drive a given error to zero. That error changes based on the goal, but common options are a desired COURSE, desired HEADING, and a ground distance error (GDE). Specific embodiments of the subject algorithm need at most four desired COURSEs, and they can be referenced here as: $COURSE_{INITIAL}$, $COURSE_{MID1}$, $COURSE_{MID2}$, and $COURSE_{FINAL}$. Further specific embodiments can incorporate more than four desired courses, which typically increases the amount of computations.

A tradeoff between the accuracy of the determination and the speed of calculation can be made by decreasing the step size in the updates. As step-size decreases, the finite course control between each iteration is greater, and the algorithm has greater fidelity. When small enough (found to be <8 Hz), the algorithm will converge on ground distance error to sub-centimeter accuracy. However, the simulation time was very large when using such a step size during turn determinations, and, of course, using such a step size during determination of entire flightplans greatly increases the simulation time. Furthermore, the GDE of the actual vehicle for typical applications is limited to GPS accuracy of ~5 meters. Therefore, in a specific embodiment, a step size of 3 Hz was selected, which gave a GDE of <5 meters and allowed the algorithm to perform with sufficient speed for common applications. Further embodiments can use different step sizes, depending on the specifications and outputs desired Motivation In an embodiment, in determining the turns, the search space is limited by restricting the flightlines to boustrophedonic flightlines, which means the turns are boustrophedonic turns. Further specific embodiments can limit the flightlines in other manners such as, but not limited to, flightlines turn to either the adjacent flightline or the flightline next to the adjacent flightline (second flightline over), and for flightlines exiting into headland where the turn height for a turn to the adjacent flightline is greater than headland width the turn is always a second flightline over (e.g., a possible path is up flightline, down is "flightline" 3, up is "flightline" 2, down is "flightline" 4, up is "flightline" 5, down is "flightline" 7, up is "flightline" 6, down flightline 8, etc., where exiting flightlines 1, 2, 5 and 6 is into the headland).

Figure 24:
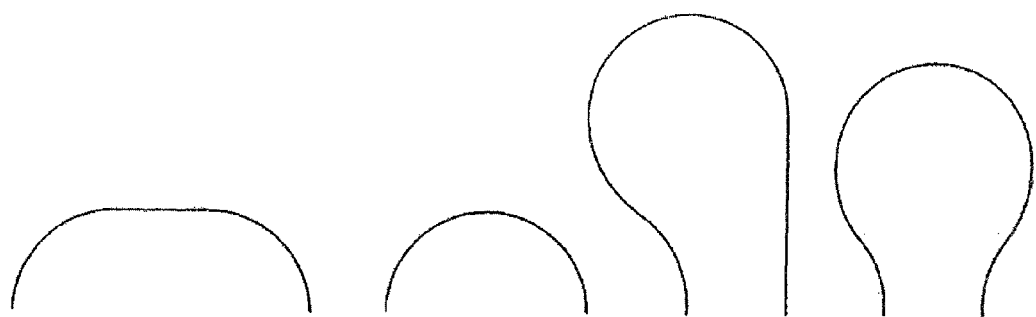
FIG. 24 shows turn types, from left to right: FLAT, U, HOOK, and BULB.

Work done by Jin divides turns into four general types [9]. The four major turn types are shown in FIG. 24 and are defined, from left to right, as FLAT, U, HOOK, and BULB. A U turn can be considered a special case of a FLAT turn, where the straight portion of the FLAT turn between the initial turn and the final turn has a zero length. A fifth type is mentioned for limited headland. However, this fifth type is just a special case of one of the four shown in FIG. 24.

Figure 25:
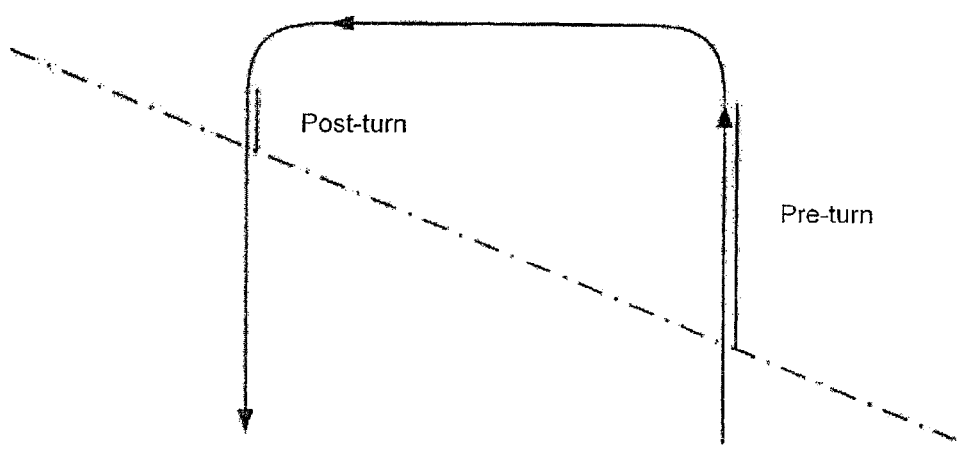
FIG. 25 shows headland, where pre-turn and/or post-turn phase is added when the edge of the field and the flightline are not orthogonal.

An embodiment of the subject method can implement an algorithm that simulates and/or selects one of these four major turn types, similar to the approach for decomposing turns, such that one or more elements remain constant to all turn types. Having one or more elements remain constant for all the turn types can reduce computation time for the simulations. In a specific embodiment, each turn has a "pre-turn" and "post-turn" phase that extends the turn collinear to the flightline to insure complete coverage when, for example, the edge of the field, or face, and the flightlines are not orthogonal, and/or the starting flightline and ending flightline of the turn are not terminating at the same face. This scenario is depicted in FIG. 25. Although FIG. 25 shows both pre-turn length and post-turn length added, typically only one of these is added and turn may add neither.

Jin teaches a method for selecting the turns based on several simple criteria, the main logic branches being reached through a comparison of turning radius to flightline width. The specific turn type was then decided by Jin based on other criteria, such as the angle of the edge in relation to the flightline, width of the sensor, etc. Jin, however, is planning for terrestrial applications, where the reference frame remains fixed. In particular, the sensor is on a vehicle traveling on the ground and the target is on the ground, such that the reference frame the sensor is moved in remains fixed with respect to the reference frame of the target.

Figures 26A, 26B, 26C:
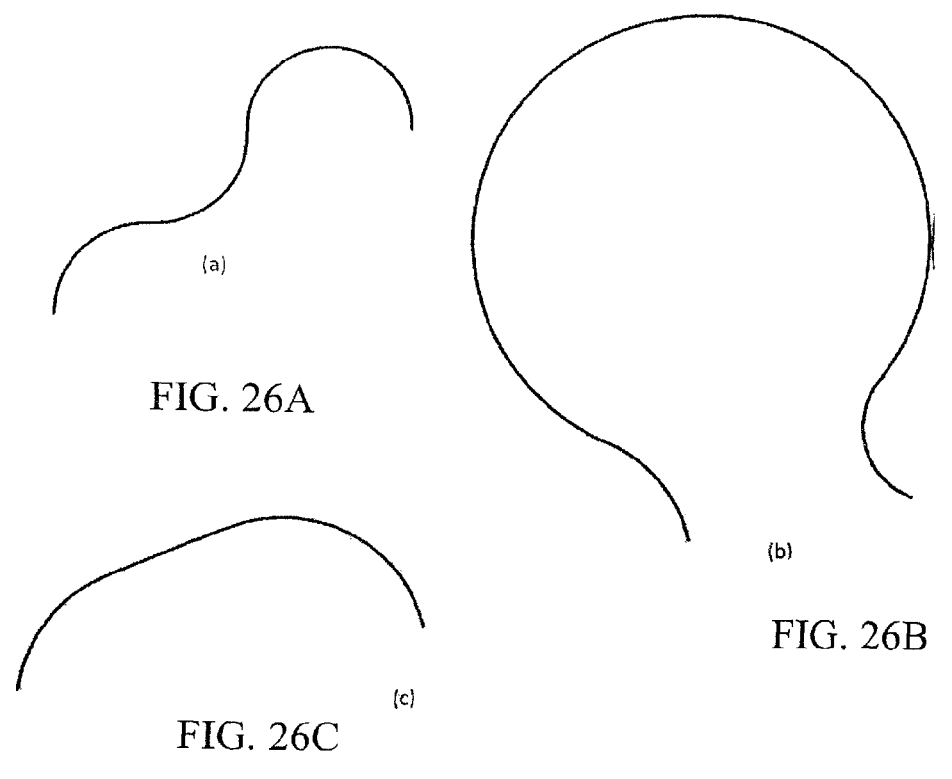

In a related algorithm, McGee comes to some of the same conclusions as Jin, while planning in a moving reference frame [13], which is incorporated herein by reference. In McGee, turns are restricted to Dubins path types, having three parts. The first and last part are always a turn to the right or left, and the middle part can be a third turn or a straight section. These path types are defined by their parts. As an example, a turn beginning to the right, then changing to the left, and finally back to the right is defined as RLR, which is shown in FIG. 26A. These turn types can be expanded to include the turn types described by Jin. A RLS can be considered a HOOK, a LRL can be considered a BULB (see FIG. 26B), and a RSR can be considered a FLAT turn (see FIG. 26C).

Both the Jin algorithm and the McGee algorithm have limitations when determining turns involving a sensor traveling in or on a medium having a reference frame moving with respect to the reference frame of the target (e.g., an aircraft flying in wind to acquire data with respect to a ground based target). Jin's algorithm is limited to a fixed reference frame, and is more tailored to an optimal result based on a time cost function, whereas McGee's algorithm can determine a turn for a moving reference frame, but often in a very non-optimal way. In some cases, McGee's algorithm is self-intersecting. Embodiments of the subject method pertain to a method using an algorithm for determining turns involving a sensor traveling in or on a medium having a reference frame moving with respect to the reference frame of the target. Specific embodiments are not limited to Dubins path types, although further embodiments can limit the path types to Dubins path types.

Common Methodology

Once a PD has been selected for the flightlines and the width of the flightlines (distance between adjacent flightlines) are determined (typically fixed due to sensor limitations), the height of each turn can be set from the line-clipping algorithm. The task is then to determine how to transition from flightline i to i+1, or, stated another way, to determine the turn path from the end of flightline i to the beginning of flightline i+1 such that a tangent to the turn path at the end of the $i^{th}$ flightline is parallel with the $i^{th}$ flightline and a tangent to the turn path at the beginning of the $(i+1)^{th}$ flightline is parallel to the $(i+1)^{th}$ flightline. To compute complete turns, several auxiliary computations can first be made to determine which type of turn to use. The distance between the adjacent flightlines is typically determined based on the sensor parameters, often in combination with other parameters. In a specific embodiment, where the sensor is an imaging device, and the vehicle is an aircraft, the distance between adjacent flightlines is based on the imaging device parameters such as focal length and overlap needed for accurate data, in combination with other parameters such as the altitude of the aircraft while imaging.

In a specific embodiment, the method can perform certain determinations that can be common to all turn types, such as:
 (i) determine whether the $(i+1)^{th}$ flightline is to the "right" or "left" of the $i^{th}$ flightline;
 (ii) determine the width and height of the turns; and
 (iii) a half turn (subtending $\pi$ radians) is executed in the correct direction as defined by Parameter 1.

A determination as to whether the $(i+1)^{th}$ flightline is to the "right" or "left" of the $i^{th}$ flightline provide information regarding the general direction of the flight. If the $(i+1)^{th}$ flightline does not exist (as in the case of the $n^{th}$ flightline), the algorithm can break and a turn does not need to be computed. A unit scalar can be added in front of turn calculations to force a clockwise (right) or counterclockwise (left) result. This unit scalar can be defined as Parameter 1. In an embodiment, Parameter 1 can be determined by comparing the difference in direction between two vectors, as shown in FIG. 23 and defined in Table 4-1. Other techniques for determining whether the next flightline is to the right or left can also be utilized.

Figure 31:
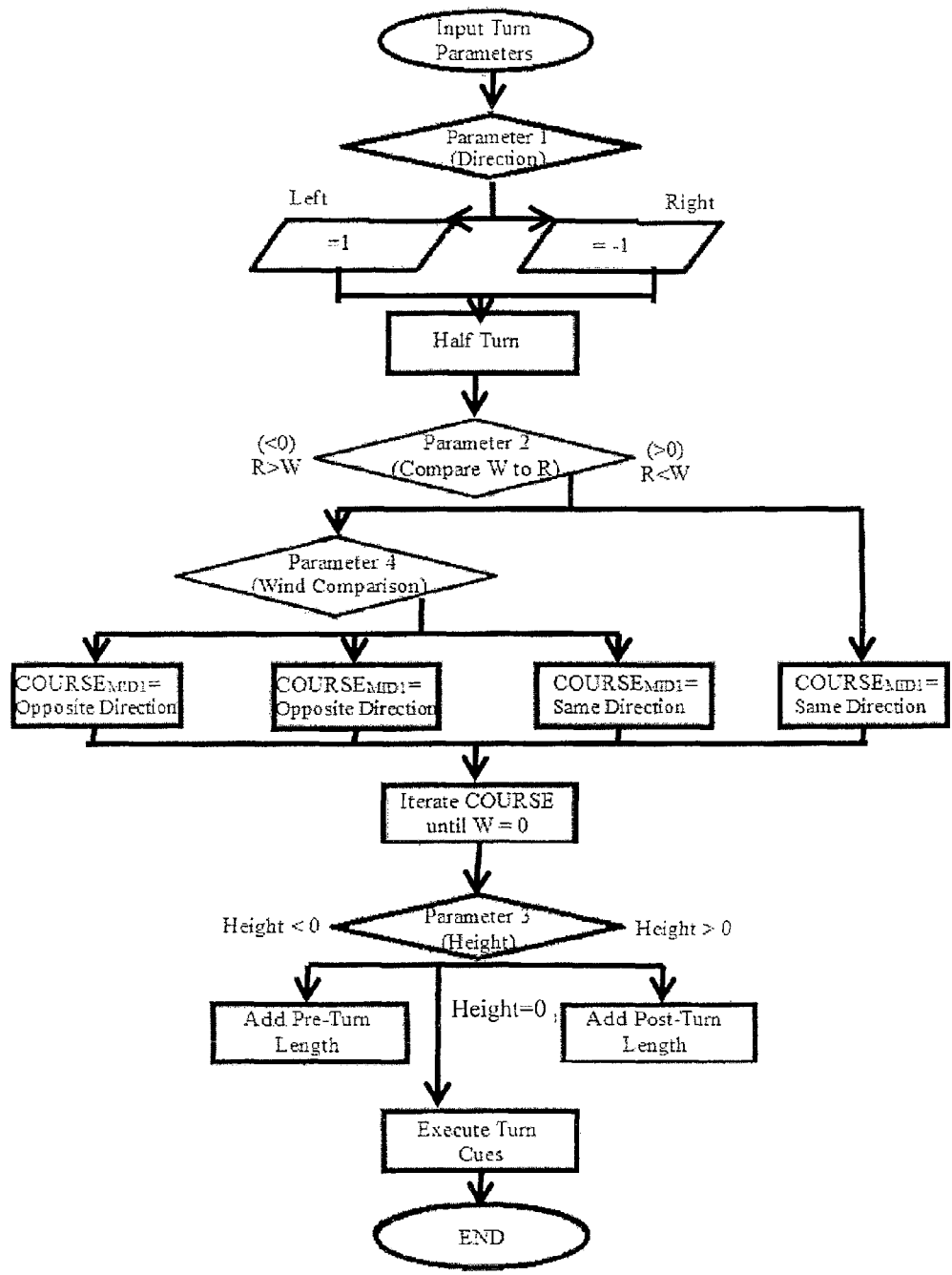
FIG. 31 shows a flow chart for determining a complete turn.

Determining the width and height of turns that are computed for simulations allows the widths of turns to be compared with the width between adjacent flightlines and/or widths of multiple turns to be summed to get a combined width of a series of turns performed in sequence, such that the combined width can be compared to the width between adjacent flightlines. In a specific embodiment, width and height are computed for each turn segment in the following manner. Define the starting point of the turn as the Initial Point (IP) and the ending point of the turn as the Ending Point (EP). A unit vector is created parallel to the flightline, collinear to the $i^{th}$ flightline, called the Initial Vector (IV). A second unit vector is created perpendicular to the $i^{th}$ flightline, in the direction of the i+1 flightline called the Cross Vector (CV). A third temporary vector (temp) is created from the IP to the EP. The turning radius for turns in variable wind condition can be defined interchangeably as the turning width (W), defined by Equation (4-6). Similarly the height of the turns is given by Equation (4-7). Equation (4-6) and Equation (4-7) are then evaluated to produce Parameters 2 and 3, where • is the vector dot product. FIG. 31 shows a comparison between R and W, where W is the width between adjacent flightlines and R is the turn width.

$$W = \frac{(CV \cdot temp)}{\|CV\|} \quad (4\text{-}6)$$

$$H = \frac{(IV \cdot temp)}{\|IV\|} \quad (4\text{-}7)$$

Figure 27:
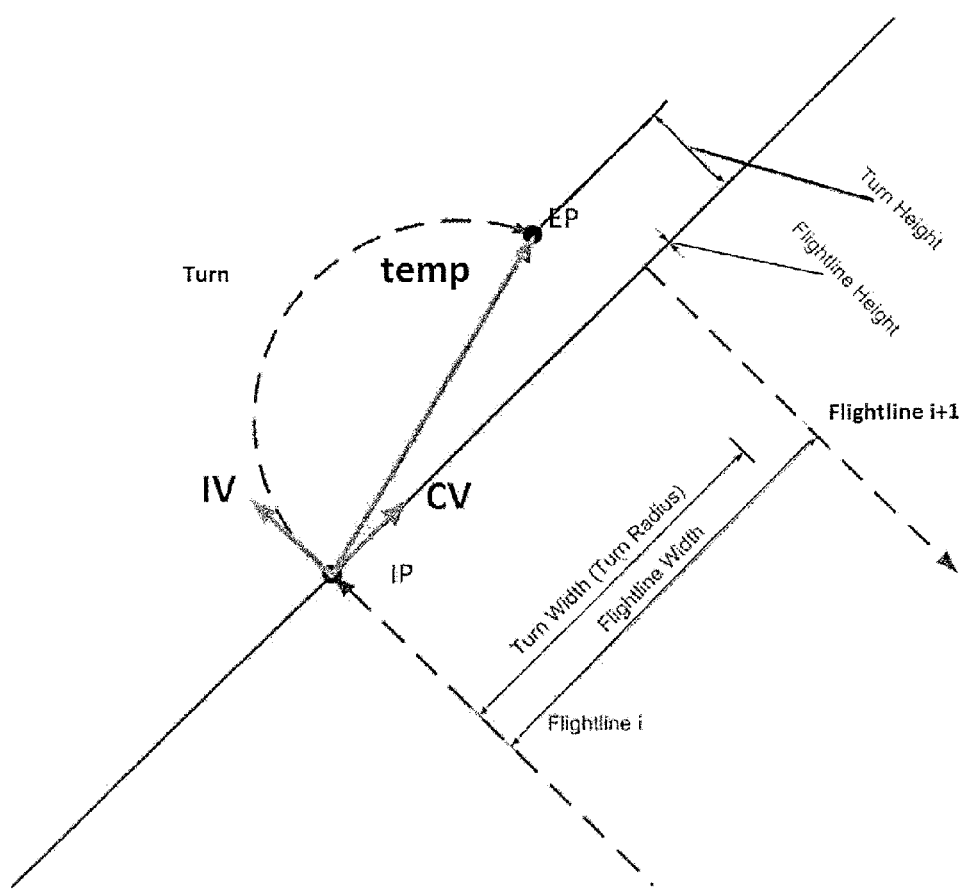
FIG. 27 shows turn vectors, turn width, flightline width, turn height, and flightline height.

The resulting conventions are that a positive height is in the direction of the IV and a positive width is the direction of the CV, just as in FIG. 27. In a specific embodiment, heuristic methods are used to drive the combined height (flightline height plus turn height) and the combined width (flightline width plus turn width) to zero.

Figure 28:
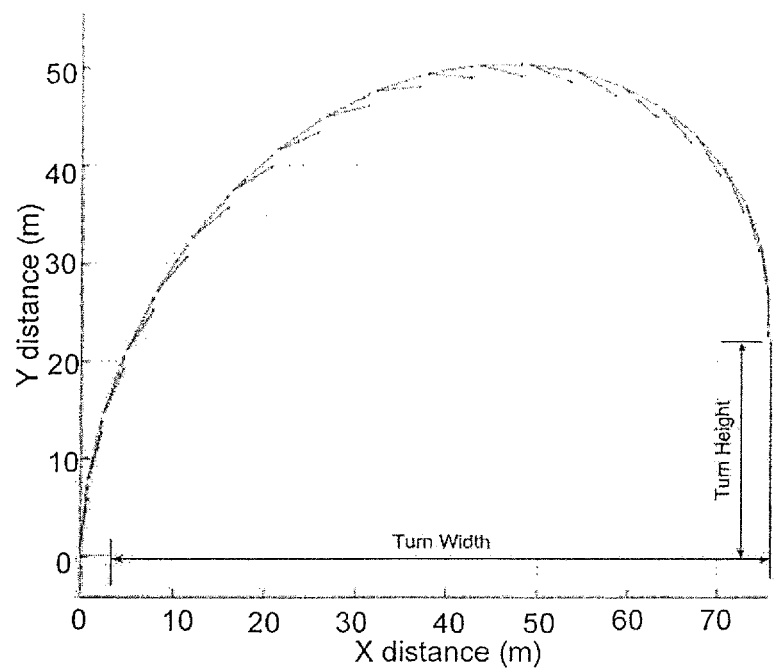
FIG. 28 shows a half turn (a turn subtending $\pi$ radians) at 17 m/s airspeed with a 4 m/s wind speed to the North.

Executing a half turn (subtending $\pi$ radicans) in the direction indicated by Parameter 1 allows a determination to be made as to whether the width of such a turn is larger or smaller than a width between adjacent flightlines so that a determination can be made as to which direction the initial turn is made. An example turn in wind is shown in FIG. 28. In FIG. 28, and for all s simulating turns, the VV (velocity vectors) are smoothly connected as the flight path of the vehicle, while the HV (heading vectors) are discontinuous, showing the direction the vehicle is pointing.

Since ground motion is not identical to air motion due to wind, turns when wind is present will not be truly circular. Because a half turn subtending $\pi$ in wind forms half an ellipse, the radius of such a half turn (or half ellipse having a semi-minor axis and a semi-major axis) would have a different interpretation than the radius of a circle (e.g., a turn with no wind, where the turn width would be twice the turn radius). Just as in Jin's algorithm, the relationship of the width of the flightlines to the width of the half turn can define the turn profile. This is the most deterministic variable in the logic tree, and is referred to as Parameter 2, given in Equation (4-8). In other words, when twice the "radius", or width of the half turn, is larger than the spacing between flightlines, Parameter 2 is negative.

Parameter 2=Flightline width−halfturn width (4-8)

Figure 29:
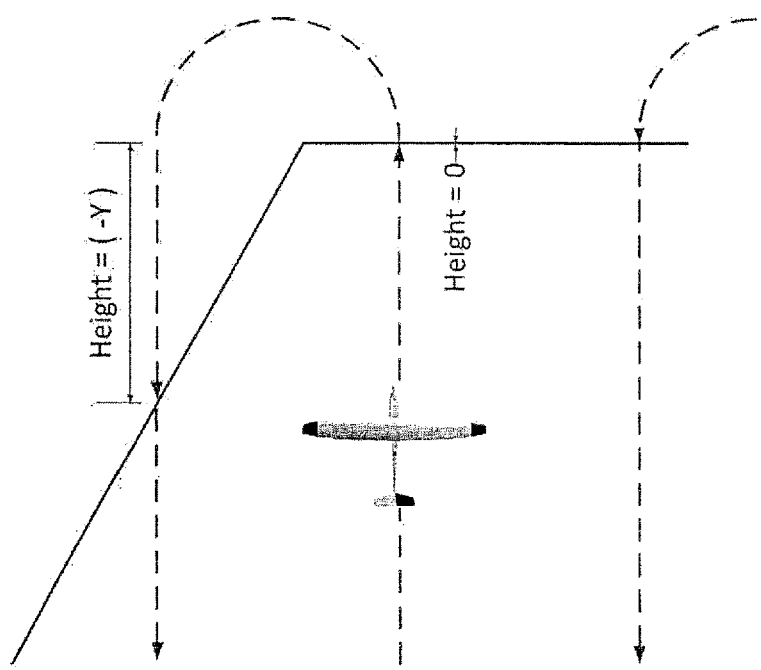
FIG. 29 shows an example of a turn with height.

Similarly, Parameter 3 is defined as the difference in height between the adjacent flightlines' heights in the direction of IV and the turn height, H. This is explicitly defined in Equation (4-9). In other words, when the $i^{th}$ and $(i+1)^{th}$ flightlines intercept the same face and the half-turn ends at a height "above" the face intercepting the $i^{th}$ and $(i+1)^{th}$ flightlines, Parameter 3 will be positive and "post-turn length" can be added. When the half turn ends at a height "below" the face intercepting the $i^{th}$ and $(i+1)^{th}$ flightlines, Parameter 3 will be negative and "pre-turn length" can be added. FIG. 29 shows a case where the $i^{th}$ and $(i+1)^{th}$ flightlines do not intercept the same face. In such a case, a half turn may end below the face intercepted by the $i^{th}$ flightline without being below the face intercepted by the $(i+1)^{th}$ flightline such that no pre-turn length is needed.

Parameter 3=halfturn height−Flightline height (4-9)

The second derivative of height differential (the difference in the difference of height in turns from one turn to the next) tends to remain small or constant with convex polygons. There is a case for significant difference when adjacent flightlines are on two different search area faces, as shown in FIG. 29.

Figure 30:
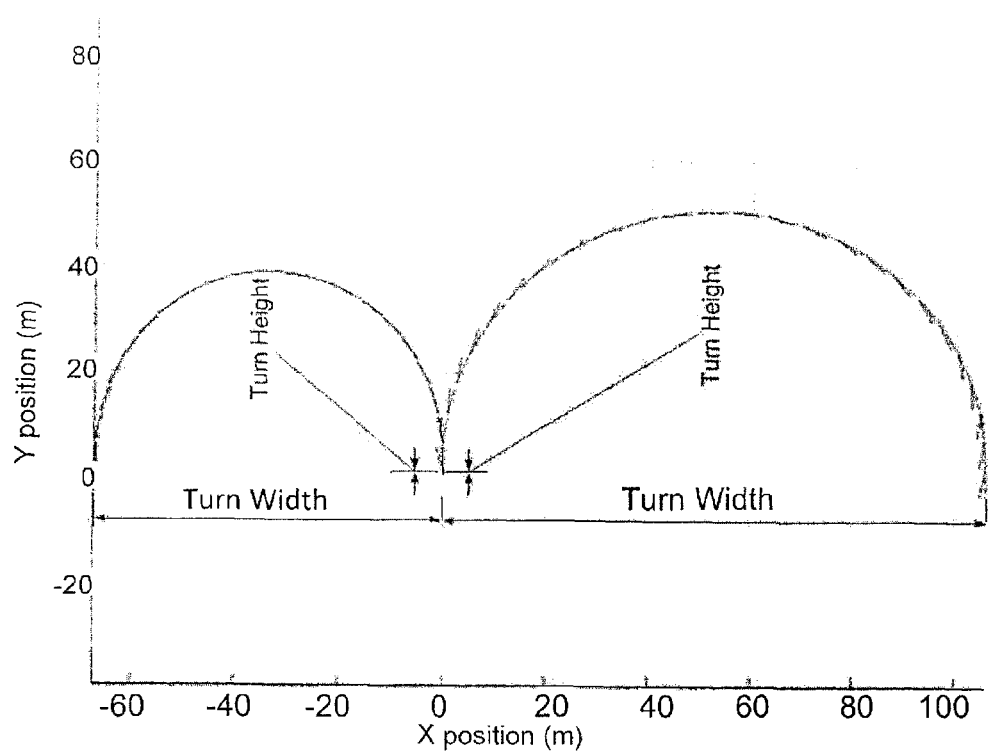
FIG. 30 shows two separate crosswind turns, both with Origin (0,0), for a 17 m/s airspeed in a 4 m/s wind to the East, where wind causes the width of the turn on the left to be less than the turn on the right.

FIG. 30 shows two turns, both with origins at (0,0), subtending $\pi$ radians with a 4 m/s wind to the East. The turn on the left is subtending more degrees into the wind than the turn on the right. Thus, the width of the turn on the right is greater than the width of the turn on the left. Even though the turn on the right traverses more in the Y direction, height and width are defined at the ending points of the turn. Therefore, the heights of both turns remain the same.

For certain wind conditions, efficiency gains can be accomplished by initially turning in the opposite direction of the general direction of the turn, or in the opposite direction of the next flightline. These gains are largely determined by considering the relative angle of wind to the flightline. Osborne highlights the problems of turning in a moving reference frame when planning a flight [15]. As pointed out in Osborne, vehicles of the NOVA size class (under 20 lbs.) are heavily influenced by the wind magnitude and direction. Osborne's algorithm, however, is not for coverage planning, and, in fact, allows for "zero or negative groundspeed", which for photogrammetric missions is not feasible and is non-optimal.

In an embodiment, wind direction relative to the direction of the IV is defined as Parameter 4. Parameter 4 is used to determine the initial turn direction when Parameter 2 is positive. Table 4-2 shows the decision logic for choosing Parameter 4, which can be upwind, downwind, or cross wind. In this way, if the vehicle is flying "with the wind" on the $i^{th}$ flightline then Parameter 4 is downwind.

An embodiment of the subject method of determining a turn and/or determining a flight path breaks into several logical cases depending on parameter 1, parameter 2, parameter 3, and parameter 4. The full decision tree for a specific embodiment is shown in FIG. 31. As with standard flowcharts, ovals are start and end points, diamonds are decisions (for this algorithm Parameters 1-4), and squares are processes. At the end, the branches merge back into a single stream common to all turns.

For simulation, a cue of headings to track, and iterations to spend tracking that heading once established, is generated and executed. Table 4-3 shows the cues for headings for each of the turn types, flat, hook, and bulb. Note that a U turn can be considered a special case of a flat turn. Using this methodology, the algorithm can generate a path in a consistent, common manner, regardless of the idiosyncrasies of the particular turn. In a specific embodiment, for the subsequent iterations, the changes in course can be set at an amount that balances speed and cost of computation. In a specific embodiment, the change in course for subsequent iterations can be set at the maximum turning radius, until, for example, the width error of the vehicle is within a threshold amount, such as 10 m. At that point, the change in course for additional iterations can be reduced (slowed). In an embodiment, once the width error of the vehicle is within the threshold amount, the change in course for additional iterations is reduced to ¼ of the maximum turn radius. The width error can then be driven to a further threshold, such as to within GPS error bounds (i.e., <5 m). Specific embodiments can use a different initial increment for changes in course, different thresholds for changing the increment, different revised increments, more or less changes in increment, and/or different error threshold(s).

In an embodiment, the computations for each of these steps begin from the same origin, which makes their individual heights and widths easier to sum. Other specific embodiments can start a turn at the endpoint of the prior turn. An example of a simple set of turns is given in FIG. 32, which are computations for a FLAT turn, with $COURSE_{INITIAL}$ set to $\pi/2$, $COURSE_{MID1}$ set to $\pi$, and $COURSE_{FINAL}$ set to $(-\pi/2)$. Both turns have an origin of (0,0). Furthermore, the CV for this FLAT turn is in the $\pi$ direction (not shown), which aligns the Y' axis with the Y axis, and the X' axis as the inverse of the X axis. Therefore, movement in the negative X direction is seen as positive width. The first turn is the upper portion, and has a width of 54 m and a height of 60 m. The second turn is the bottom portion, and has a width of 32 m and a height of −30 m.

Turning Radius is Less than Flightline Width

If the turning width is smaller than the width of the flightlines, such that the vehicle will "make the turn", and Parameter 2 is negative. For this case, $COURSE_{MID1}$ is defined from Equation (4-10).

$$COURSE_{MID1} = COURSE_{INITIAL} + \left(Parameter1 * \frac{\pi}{2}\right) \quad (4\text{-}10)$$

At this point, two turns are pre-computed: one from the $COURSE_{INITIAL}$ to $COURSE_{MID1}$ and one from $COURSE_{MID1}$ to $COURSE_{FINAL}$. The heights and widths of each of these turns are measured and summed, totaling $W_{COMBINED}$ and $H_{COMBINED}$, respectively.

As the vehicle's turn width is smaller than the flightline's width, or distance between adjacent flightlines, Parameter 2 is negative. Flattening out the turn, by the pause at $COURSE_{MID1}$ will affect the difference between $W_{COMBINED}$ and the width between adjacent flightlines slightly. The amount of time spent at midcourse is then calculated as shown in Equation (4-11).

$$\text{Iterations at } COURSE_{MID1} = \left\lceil \frac{(W - W_{COMBINED})}{GROUNDSPEED} \right\rceil \quad (4\text{-}11)$$

Since the sign on Parameter 2 is negative, no determination as to the relationship of the wind direction and IV needs to be made to determine the initial turn direction, and the initial turn is in the same direction as the next flightline when Parameter 2 is negative.

The sign of Parameter 3 can then be considered. If the height difference of the flightlines is less than the height of the turn, the sign of Parameter 3 is positive, and length can be added to the upwind portion of the turn by adding post-turn length, which decreases the turn height ($H_{COMBINED}$). If the height difference of the flightlines is less than the height of the turn, the sign of Parameter 3 is negative, and length can be added to the turn by adding pre-turn length, which increases the turn height. The amount of time spent at either $COURSE_{INITIAL}$ or $COURSE_{FINAL}$ is shown in Equation (4-12).

$$\text{Iterations to reduce } H = \left\lceil \frac{Parameter3}{GROUNDSPEED} \right\rceil \quad (4\text{-}12)$$

Figure 33:
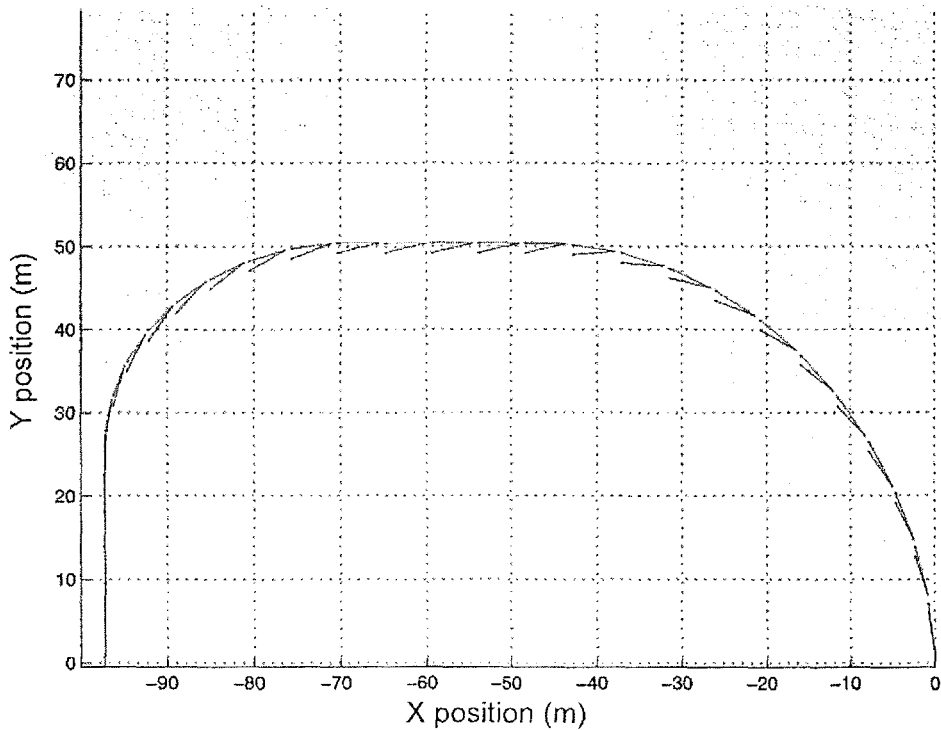
FIG. 33 shows a complete FLAT Turn, with a 17 m/s airspeed with a 4 m/s wind to the North, with IP at [0,0], EP at [−96,0], and Target is [−100,0], which is within GPS error of 5 m.

The final turn, which combines the first turn, the pause, the final turn, and the post-turn length, is shown in FIG. 33. For this simulation case, the turn took 10.66 seconds and traversed 167 meters.

Figure 34:
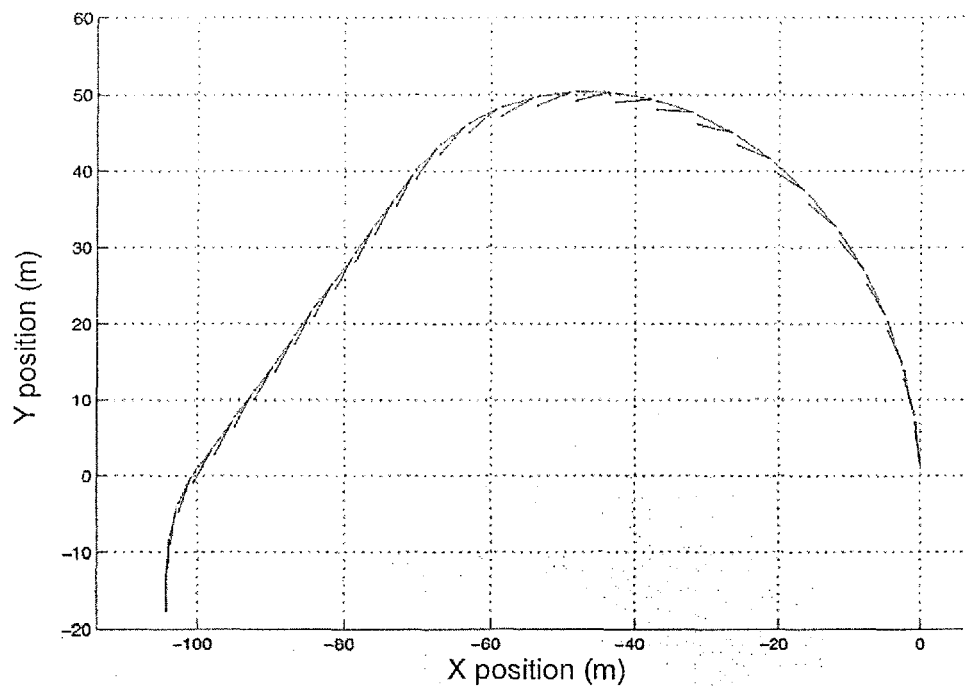
FIG. 34 shows a complete Procerus® flat turn, with a 17 m/s airspeed with a 4 m/s wind to the North, with IP at [0,0], EP at [−104,−17], and Target is [−100,0].

The results of entering this exact desired turn into the standard flight planner Procerus® (complete Procerus® flat turn, 17 m/s airspeed with a 4 m/s wind to the North. IP at [0,0], EP at [−104,−17]. Target is [−100,0]) are shown in FIG. 34. It can be seen that the autopilot will naturally attempt to intercept the waypoint, in the manner described by Osborne. For this path, the turn was executed in 11 seconds, while traveling 169.2 m, showing that the embodiment of the subject method used to determine the path shown in FIG. 33 has slight efficiency gains in both time and distance, for this particular case. Furthermore, the natural path taken by the autopilot would cause the data set to lose an image, as the aircraft does not level out until [−104,−17], in what would be the second picture once the vehicle re-enters the target area at [−100,0].

Turning Radius is Equal to Width

When twice the "radius", or width of the turn matches the width of the flightlines exactly, this can be considered as a special case of the FLAT scenario, e.g. a turn. The turn is executed at maximum bank angle, and either a pre or post turn length is added, based on Parameter 3.

Turning Radius is Greater than Width

Figure 35:
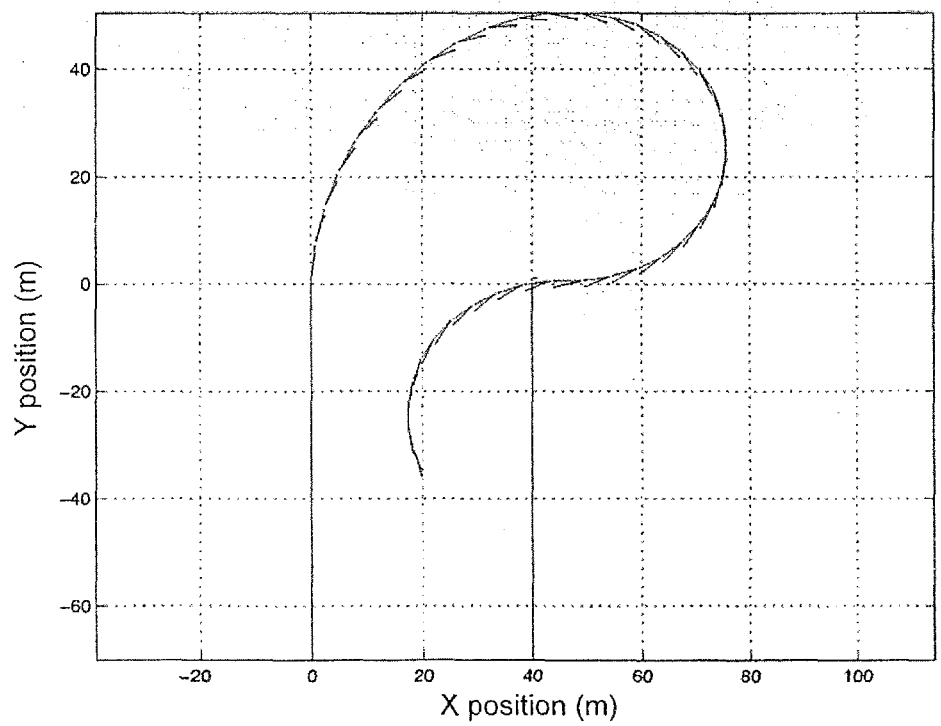
FIG. 35 shows a Procerus® general oversized turn, with a 17 m/s airspeed with a 4 m/s wind to North, with IP at [0,0], EP at [20,−38], and Target is [40,0].

If the turning width is larger than the width of the flightlines, then the vehicle will not "make the turn", and Parameter 2 is positive. That is not to say that the vehicle is not capable of intercepting the end point of the next flightline, but the vehicle is not able to turn toward the next flightline and in a single turn in one direction turn so as to intercept the endpoint of the next flightline such that the tangent of the turn when intercepting the endpoint of the next flightline is parallel to the next flightline, in the required height, and, therefore, some of the target area will be missed if such a turn is made. Using the standard navigation algorithm provided with the Procerus® autopilot, the Procerus® autopilot will attempt to intercept each waypoint directly as seen in FIG. 35, which would result in some of the target being missed.

Referring to FIG. 31, when the turning width is larger than the width of the flightlines, the next branch in the algorithm is to evaluate the direction of the wind with respect to the direction of IV to produce Parameter 4. In a specific embodiment, evaluating the direction of the wind with respect to the direction of IV results in three cases, UPWIND, DOWNWIND, and CROSSWIND. In a specific embodiment, for each specific case, the direction of the wind is exploited as much as possible for the aircraft to either travel upwind or downwind to lengthen or shorten Parameters 2 and 3, and also to subtend as much angle as possible, while turning "into the wind" to reduce ground travel.

Figure 36A:
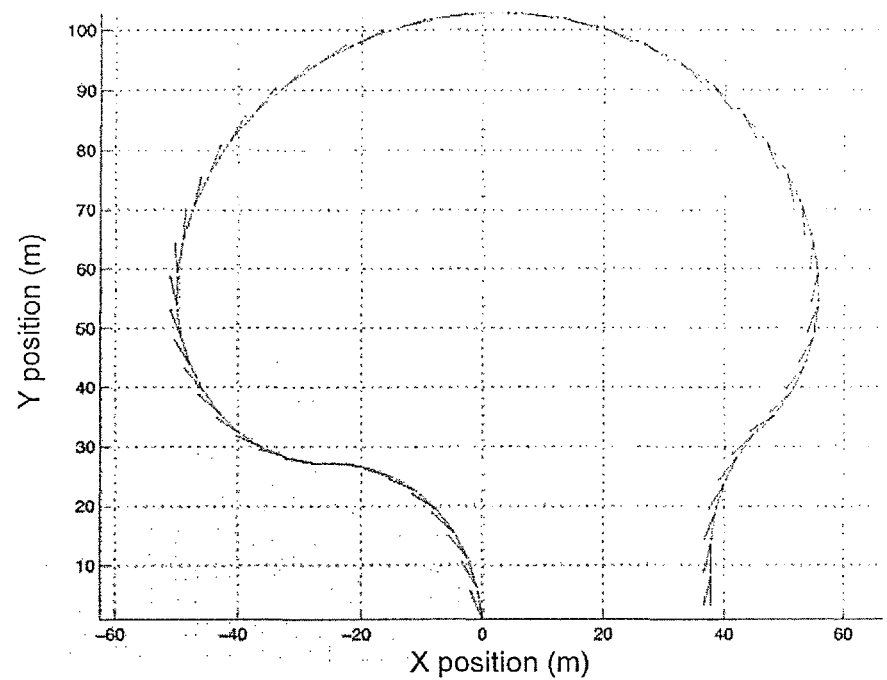
FIGS. 36A-36B show an example of turns in a crosswind, with a BULB turn on the left (FIG. 36A) and a HOOK turn on the right (FIG. 36B), where both have 17 m/s airspeed, and 4 m/s wind to East.
Figure 36B:
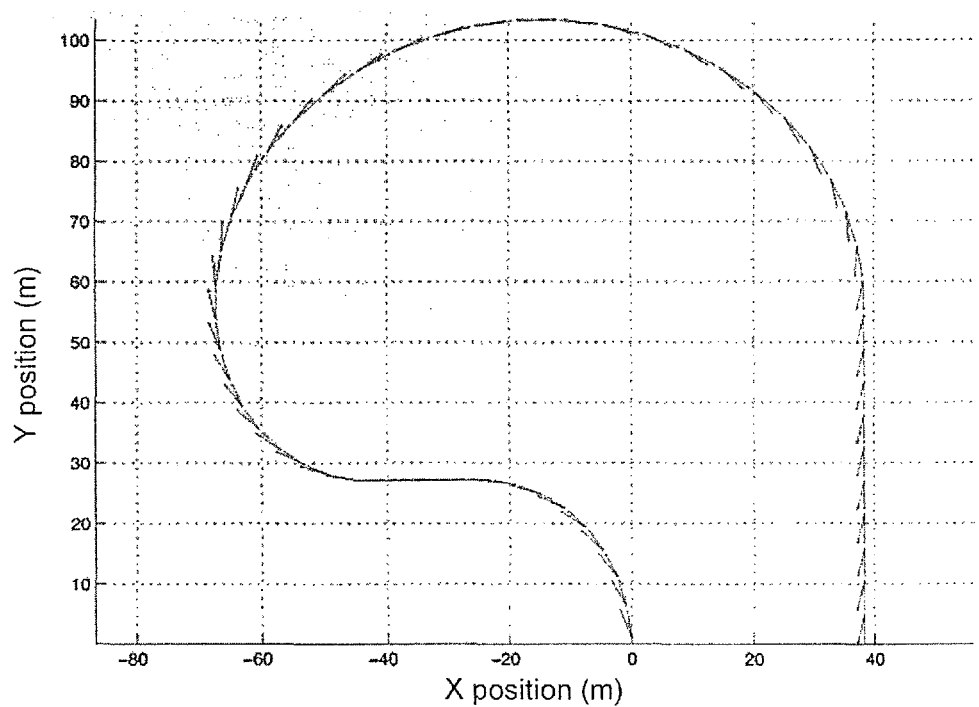

It was found through extensive trial and error that for UPWIND and DOWNWIND cases, the HOOK style of turn is more efficient, unless [Parameter 3] is larger than the diameter of the turn. The short explanation for this is that as Parameter 2 increases, the vehicle unnecessarily travels further and further away from the EP while in the HOOK scheme. In BULB, the vehicle stays closer to EP, and when properly executed finishes the turn without any Pre-Turn or Post-Turn length needed. In a specific embodiment, for upwind and downwind cases, only hook turns are simulated. It was found that for CROSSWIND cases, the BULB style of turn is more efficient. FIGS. 36A-36B show a HOOK (FIG. 36B) and BULB (FIG. 36A) turn for the same IP and EP, and a cross wind (airspeed 17 m/s and 4 m/s wind to East), and Table 4-4 summarizes the results regarding time of the turn and distance of the turn.

Common elements to both the HOOK and BULB turn can be computed. Both HOOK and BULB turns can be thought of as splines that have bounded end conditions. Both ends are required to be tangent to the flightline they are connected to, and thus their direction and position are fixed. One turn subtending π radians is required, and the other turns are thought of as the connecting pieces to drive the error in H and W to zero. These turns have courses defined through their target courses $COURSE_{MID1}$ and $COURSE_{MID2}$. HOOK has the former, while BULB has both. These combinations of headings, and if required as determined by Parameters 1 and 2, the accompanying straightaways, form "cues", which are executed once optimized. Generalized "cues" are described in Table 4-3.

If Parameter 2 is positive and the vehicle is traveling "upwind", then the first turn will be in the opposite direction of the direction from the $i^{th}$ flightline to the (i+1) flightline. The vehicle subtends more radians in this upwind configuration, and, therefore, does so without moving too far in the parallel direction. This results in minimizing the overall height difference, and, thus, a shorter time off target. Table 4-5 shows generalized upwind cues. If Parameter 2 is positive and the vehicle is traveling "downwind", then the opposite of the upwind case is true, and the first turn will be in the same direction as the (i+1) flightline, which is indicated as "downwind" in FIG. 31. Similarly, this results in more of the subtended radians to be "into the wind", minimizing the height difference. Table 4-6 shows generalized downwind cues.

Figure 37:
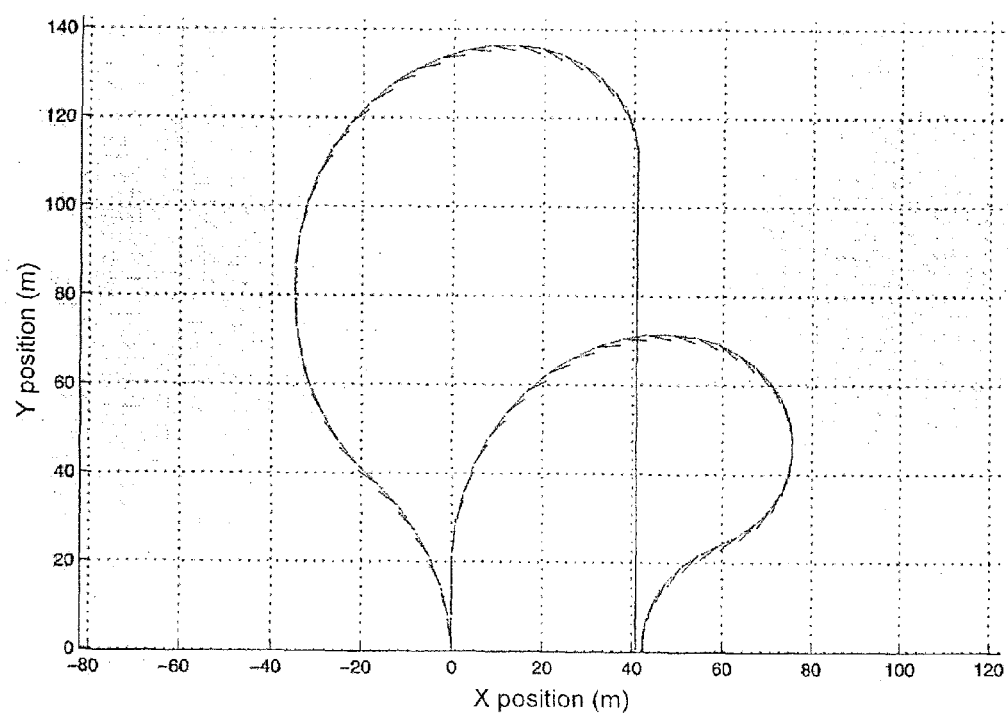
FIG. 37 shows a HOOK turn comparison, where the turn with the larger height turns away from the next flightline, while the turn with the smaller height turns toward the next flightline, and both have airspeed of 17 m/s with a 4 m/s wind to the North, with IP for both is [0,0], and Target is [40,0].

FIG. 37 shows the difference between a hook turn when flying downwind and turn away from (i+1) flightline and a hook turn when flying downwind and turn toward the $(i+1)^{th}$ flightline. FIG. 37 shows that most of the turning "cost" comes from turning "with the wind", as opposed to "into the wind". Table 4-7 summarizes the results. For case of flying downwind, the result of turning towards the i+1 flightline seems intuitive. However this is only because the wind is in the same direction of the $i^{th}$ flightline.

Figure 38:
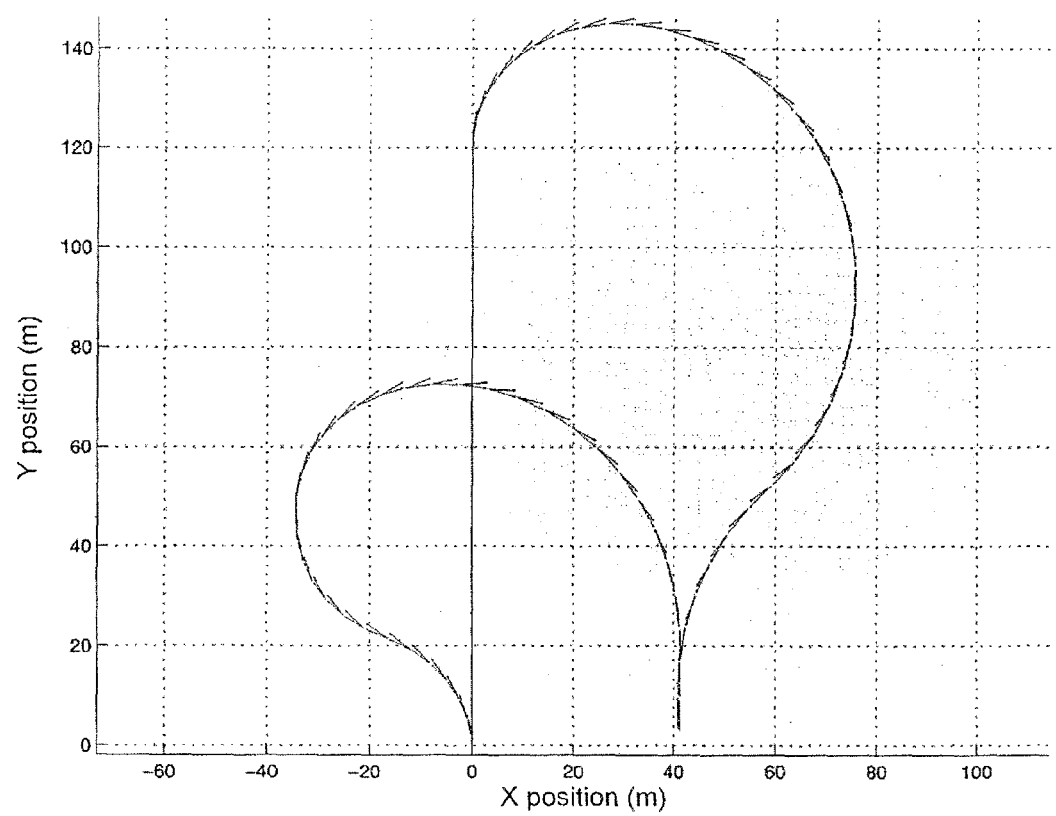
FIG. 38 shows a HOOK turn comparison, where the turn with the larger height turns toward the next flightline, while the turn with the smaller height turns away from the next flightline, where both have an airspeed of 17 m/s with a 4 m/s wind to the South, with IP for both is [0,0], and Target is [40,0].

FIG. 38 shows the opposing case, where the wind is in the opposite direction of the $i^{th}$ flightline. FIG. 38 shows a hook turn that starts by turning toward the (i+1) flightline and a hook turn that starts by turning away from the (i+1) flightline, for the case of flying upwind. Here the turn is more efficient by turning away from the i+1 flightline, which is indicated as "upwind" in FIG. 31. This non-intuitive result is summarized in Table 4-8.

When Parameter 2 is positive and the wind is crosswind, a BULB turn is implemented. The nature of a BULB turn does not allow variation in initial turn direction. The first turn is always in the opposite direction of the i+1 flightline. Since the BULB turn subtends all angles, full advantage of the airspeed/groundspeed differential can be exploited, lengthening or shortening any segment as required.

Figure 32:
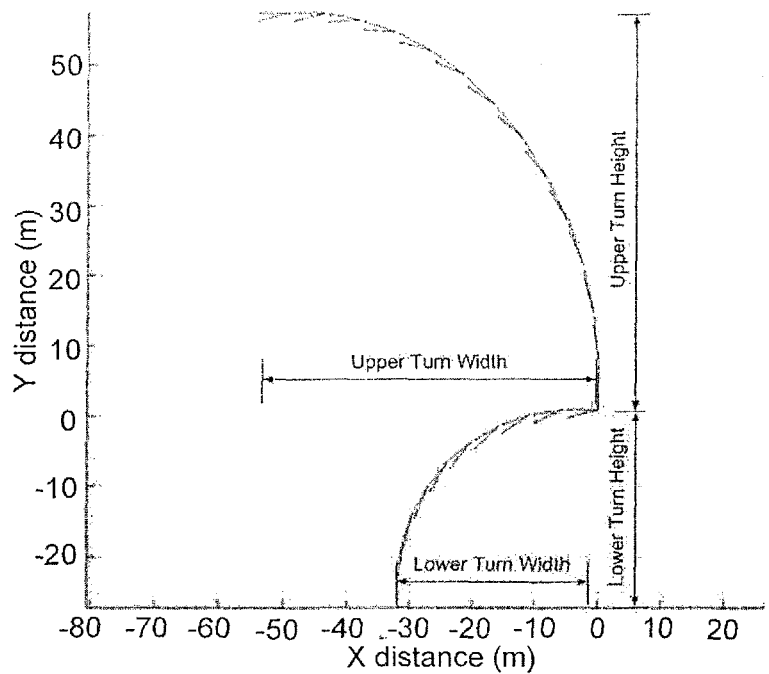
FIG. 32 shows two separate turns for pre-computation, with a 17 m/s airspeed with 4 m/s wind to the North, where the upper turn has a COURSE set to $\pi$, and the lower turn has a COURSE set to $-\pi/2$, and both have an origin of (0,0).
Figure 39:
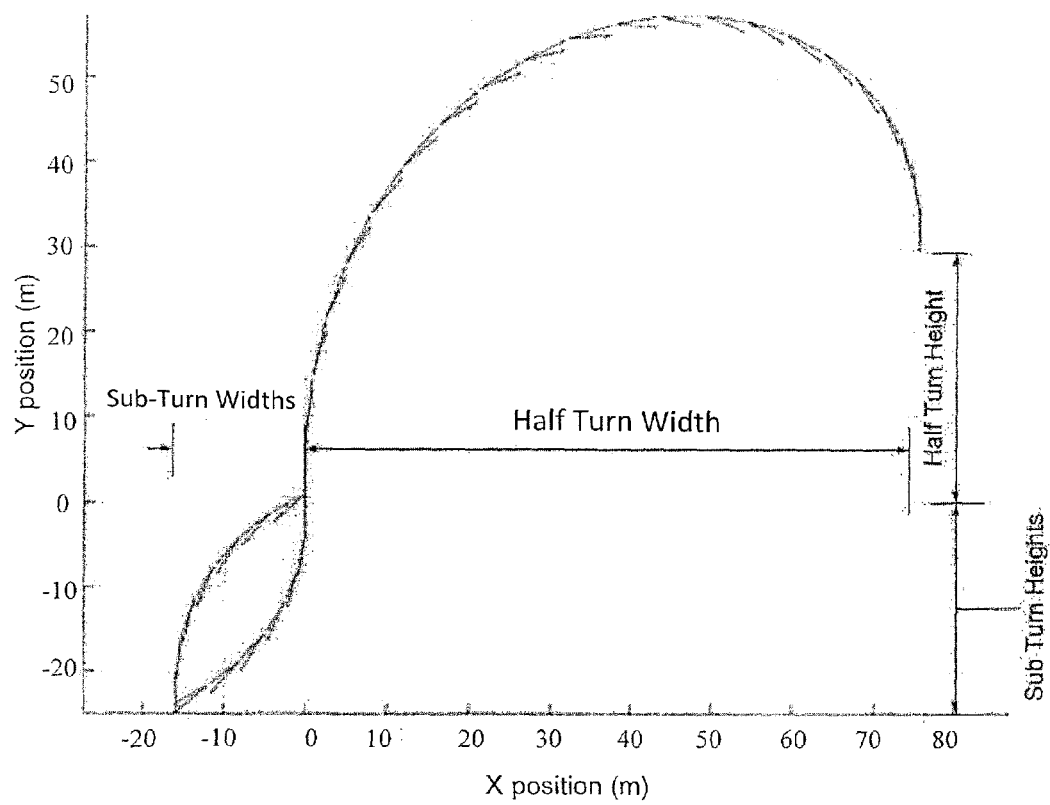
FIG. 39 shows HOOK turn computations for three turns of the HOOK turn all having origin [0,0], and each at 17 m/s airspeed with a 4 m/s wind to the North, with the largest turn subtending $\pi$ radians shown above, and the two turns shown below are what makes this a HOOK turn.

For both HOOK and BULB turns, the turns are separated into segments, with the BULB turn having two more segments than the HOOK turn. For HOOK, the turn is separated into three segments as shown in FIG. 39. As in FIG. 32, FIG. 39 shows separate turns, each with their IP at [0,0]. In other embodiments, the turns can be calculated to start at the end of the prior turn. Preferably, the previously computed turn (subtending π radians) used to determine Parameter 2 can be used for known width and height, in order to reduce computations. During simulation the two additional segments are iterated with increasing $COURSE_{MID1}$ and at each iteration, and the heights and widths of the three segments are summed. In a specific embodiment, is the iterations are continued until the width error is smaller than a threshold, such as the GPS error. Specific embodiments can use a different threshold to discontinue iterating. The composite curve's height is then compared to the turn's height in a similar manner to FLAT turns, and the same method for reducing height error is implemented, such as adding pre-turn or post-turn length as appropriate.

Figure 40:
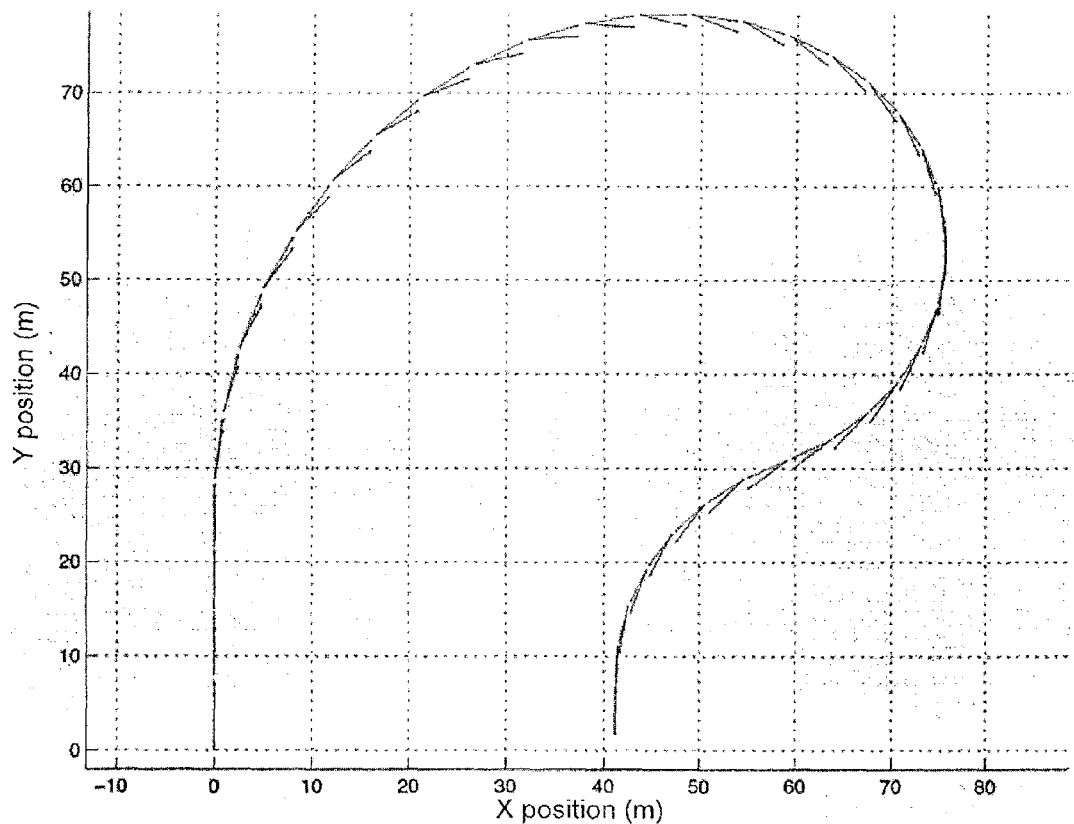
FIG. 40 shows a complete HOOK turn when the three turns of FIG. 39 are put together.

For FIG. 39, $COURSE_{INITIAL}$ is set at π/2, $COURSE_{MID1}$ is set at −3π/4, and $COURSE_{FINAL}$ is set at −π/2. FIG. 40 shows the same turns as shown in FIG. 39 connected end to end.

Figure 41:
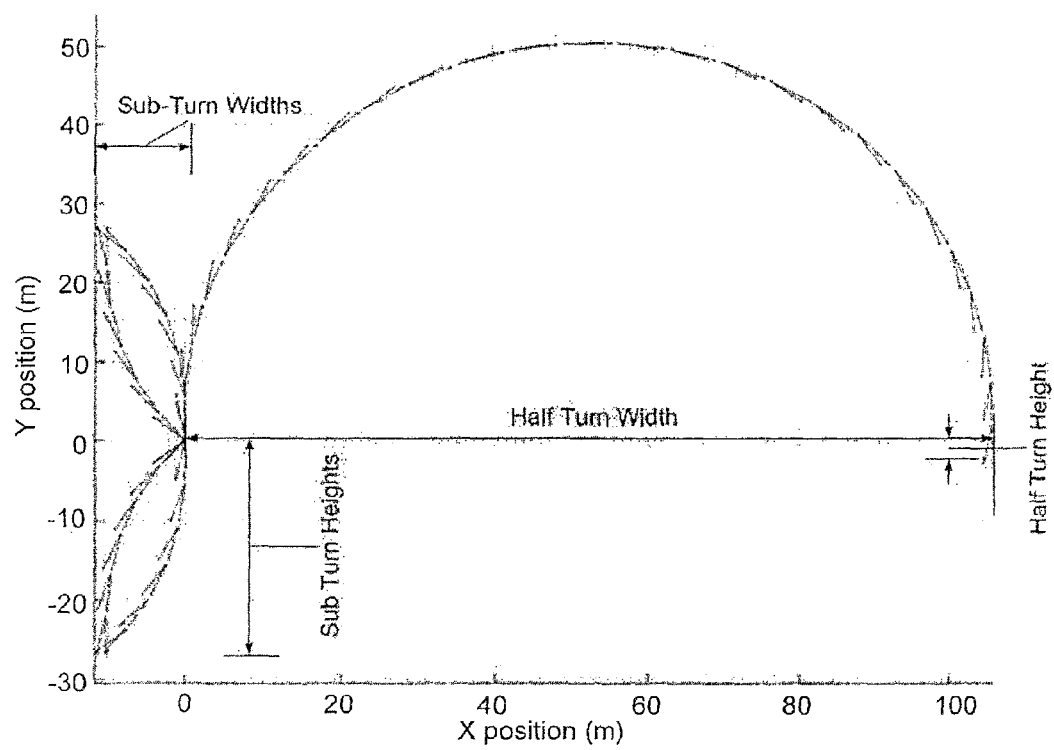
FIG. 41 shows a BULB turn precomputation of four turns, each with 17 m/s airspeed, 4 m/s wind to the East, and origin at [0,0].
Figure 42:
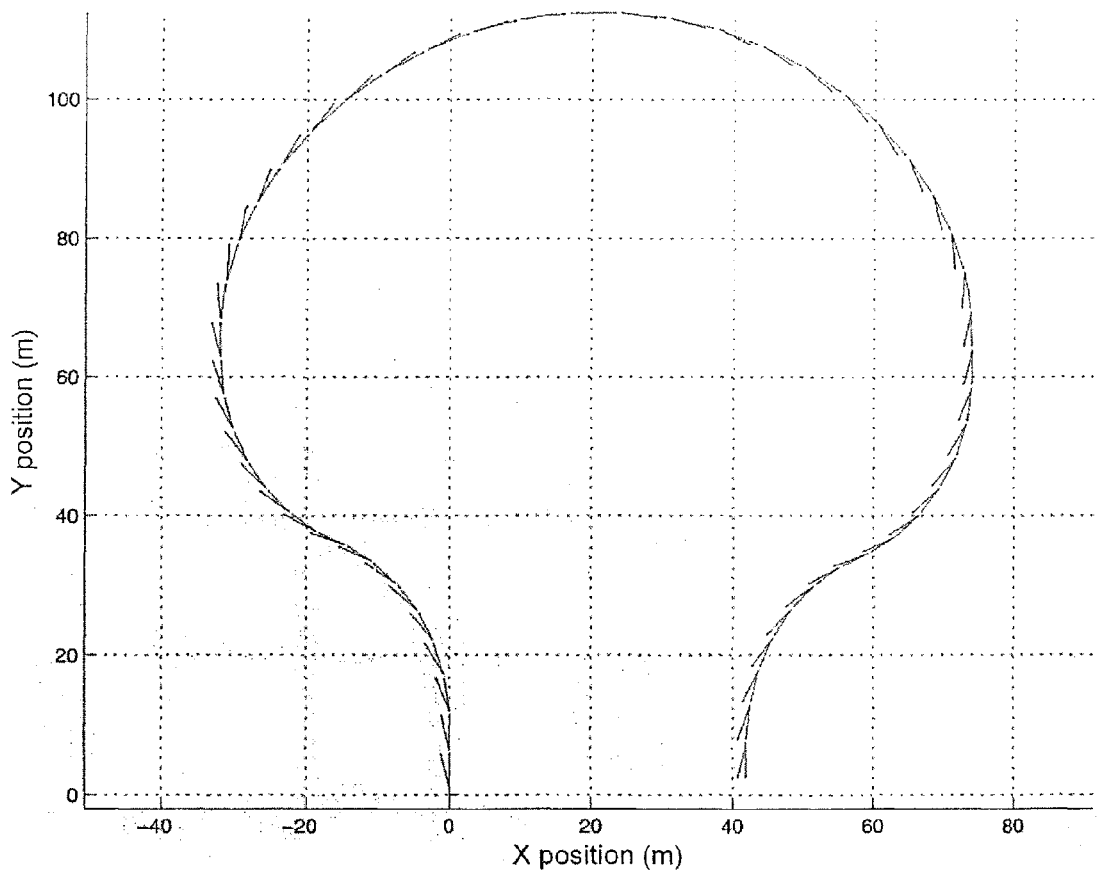
FIG. 42 shows a complete BULB turn, putting the four turns from FIG. 41 together.

BULB turns are implemented in a similar manner as HOOK turns, but with an additional 2 turn segments. $COURSE_{MID2}$ is used to drive these additional segments. In the same manner as $COURSE_{MID1}$ was iterated with HOOK turns, $COURSE_{MID1}$ and $COURSE_{MID2}$ are iterated from their initialized headings so that the sum of all 5 turn widths drives the width error to within a threshold, such as GPS limits. FIG. 41 shows an example of this. Again, all turns in FIG. 41 have an IP of [0,0]. FIG. 42 Shows the same completed turns of FIG. 41 end to end.

Embodiments of the invention relate to a method for flight planning for photogrammetric missions for sUAS in wind. Virtual Cockpit™ does have a crude area coverage method, but is really more of a process to quickly generate boustrophedonic paths North-South and East-West. There is no input for photogrammetric parameters or even a way to change the width of flightlines.

The manual process of generating flightlines before a flight takes between 30 and 45 minutes per flightplan, and even then requires extensive operator management once in flight. These paths are generally limited to the cardinal directions, and turns are managed through a single waypoint in an attempt to force behavior from the autopilot. Using this manual method, any change in the PD would require the operator to completely re-do the complete flightplan.

The process for determining a flightplan in accordance with embodiment of the subject method reduce the operator input to the selection of the target vertices. From there, the algorithm determines the most efficient direction, while taking into account alone or more external parameters (e.g., headland, wind, etc.). Once the direction is determined, the embodiments of the subject method generates the appropriate flightlines from the vehicle parameters and photogrammetric parameters of the payload. Finally, once flightlines are generated, the algorithm is able to predict the most efficient turns from flightline to flightline, thus completing the entire flightplan.

This process not only cuts down on the amount of operator input needed, but ensures the most optimal total flightpath. Often the most optimal flightpath involves a PD that would seem inefficient, or turns that would seem counter-intuitive and not normally entered by an operator. Table 6-1 shows the results from each type of turn, for randomly generated polygons.

Specific embodiments are constrained to convex polygons. Specific embodiments can incorporate the methods of Choset and Huang in the area of polygon decomposition [4,8], which are hereby incorporated by reference in their entirety, to apply the methods of the subject invention to a target area having any arbitrary shape. embodiments can determine the globally optimal path given many decomposed convex polygons, by, for example, incorporating the methods of Li [11], which is hereby incorporated by reference in its entirety.

Specific embodiments can implement the methods of the subject invention in real-time and onboard vehicle, for example with a dedicated microprocessor or using the vehicle's processor. Specific embodiments can allow the vehicle to run the code, and generate real-time flightplans as conditions change, such as wind, obstacles, etc. Embodiments of the subject algorithm can be implemented using Matlab® Class structure, using any microprocessor based real-time code using a compiled language, and/or other hardware and/or software implementation.

Figure 53:
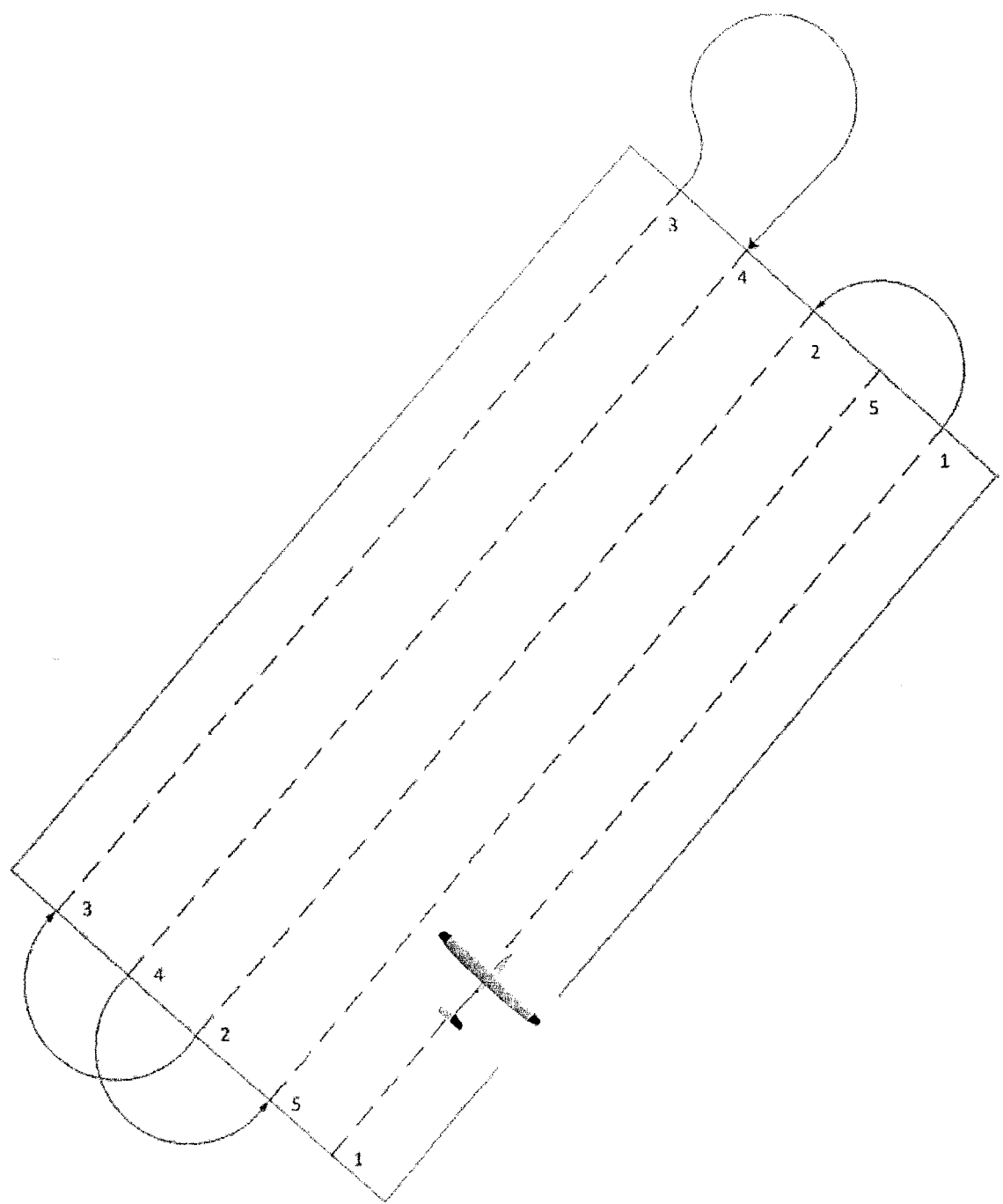
FIG. 53 shows a path utilizing non-boustrophedonic parallel paths.

Specific embodiments can use non-boustrophedonic flightlines. In specific embodiments, where the turning radius of the vehicle is larger than the width of the flightlines, a flightline order that is equal to or larger than the turning radius of the vehicle and/or incorporates turn from a flightline to a non-adjacent flightline can be utilized. An example of such a flightpath is shown in FIG. 53. Implementing a method to produce such a path can be accomplished via optimizing the order of the flightlines, based on one or more criteria, such as distance traveled, time of flight, fuel consumption, and/or other performance based criteria, since the algorithm is capable of handling the resulting turns already.

TABLE 4-1

Parameter 1 logic

| Test | Result |
|---|---|
| if (direction($V_1$) − direction($V_{TEMP}$)) > 0 | Right (clockwise) Parameter 1 = −1 |
| else | Left (counterclockwise) Parameter 1 = 1 |

TABLE 4-2

Parameter 4 logic

| Test | Result |
|---|---|
| if abs(directon(Wind) − direction(IV)) =< pi/4 | Parameter 4 = 'Upwind' |
| elseif abs(direction(Wind) − direction(IV)) => 3*pi/4 | Parameter 4 = 'Downwind' |
| else | Parameter 4 = 'Crosswind' |

TABLE 4-3

Turn cues

| | Step 1 | Step 2 | Step 3 | Step 4 | Step 5 | Step 6 |
|---|---|---|---|---|---|---|
| FLAT | $COURSE_{INITIAL}$ | $COURSE_{MID1}$ | $COURSE_{FINAL}$ | | | |
| HOOK | $COURSE_{INITIAL}$ | $COURSE_{MID1}$ | $COURSE_{INITIAL}$ | $COURSE_{FINAL}$ | | |
| BULB | $COURSE_{INITIAL}$ | $COURSE_{MID1}$ | $COURSE_{INITIAL}$ | $COURSE_{FINAL}$ | $COURSE_{MID2}$ | $COURSE_{FINAL}$ |

TABLE 4-4

BULB vs. HOOK

| Turn Type | Time | Distance |
|---|---|---|
| HOOK | 19 | 313 |
| BULB | 18 | 279 |

TABLE 4-5

Upwind course cues

| | |
|---|---|
| $COURSE_{MID1}$ = | offset from $COURSE_{INITIAL}$ |
| $COURSE_{MID2}$ = | $COURSE_{INITIAL}$ |

TABLE 4-6

Downwind course cues

| | |
|---|---|
| $COURSE_{MID1}$ = | offset from $COURSE_{FINAL}$ |
| $COURSE_{MID2}$ = | $COURSE_{FINAL}$ |

TABLE 4-7

Upwind/downwind comparison

| | Time | Distance |
|---|---|---|
| Turn away from i + 1 flightline | 20.33 s | 323.3 m |
| Turn towards i + 1 flightline | 13.33 s | 211 m |

TABLE 4-8

Non-intuitive turns

| | Time | Distance |
|---|---|---|
| Turn away from i + 1 flightline | 12.66 s | 200 m |
| Turn towards i + 1 flightline | 21.33 s | 338 m |

Complete Simulation Results

Overview of Designing a Flight Path

Figure 43:
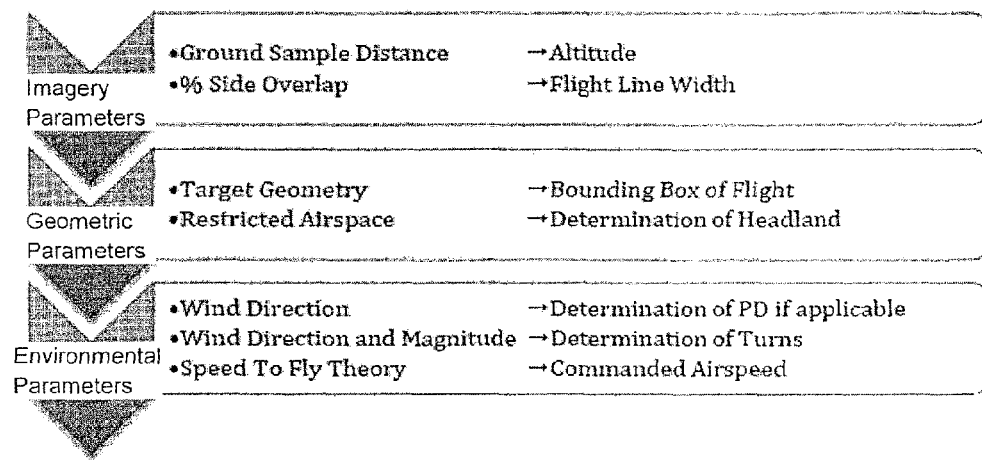
FIG. 43 shows a flightline overview.

An embodiment of the invention can combine one or more of the embodiments described for determining various parameters and/or portions of a flightplan into a method for determining a flightplan. Two major phases can be combined to produce a complete flightplan. FIG. 43 shows an example of the flight planning process, beginning with the Imagery Parameters from the target requirements, then the Geometric Parameters from the specific requirements, and then the Environmental Parameters from specific temporal considerations. The Imagery Parameters include the distance from sensor to target area (ground sample distance), which can provide the altitude for an aircraft; and percent side overlap and image device width, which can be combined to create a flightline width (distance between adjacent flightlines). The Geometric Parameters can include the target geometry (such as mountains), which create a bounding box of flight restrictions in the airspace, which provide headland. The Environmental Parameters from specific temporal considerations can include wind, direction, and magnitude, which can provide PD if applicable and determination of turns; and speed to fly theory, which can provide commanded airspeed.

Various embodiments incorporate one or more of the following:
1) Enter camera parameters;
2) Enter desired target area, such as via entry of vertices of a convex polygon;
3) Enter any real-world restrictions on the flight area, and constrict the headland accordingly;

4) Set the PD, such as based on wind direction, headland, and turn height;
5) Set the airspeed, such as based on speed to fly (STF) theory;
6) Create, trim, and order the flightlines; and
7) Compute the turn for moving from the $i^{th}$ flightline to the $(i+1)^{th}$ flightline.

Comparisons

Comparisons between flightplans created by the Procerus® flight planning software and an embodiment of the subject invention are provided below, where the comparisons are based on the use of the same camera parameters, the same target area, and same flightlines for each comparison. The principal direction will be limited to cardinal directions (N, NE, E, SE and their reciprocals), and the turns will behave in accordance with the standard Procerus® algorithm. These control turns only differ from actual deployments in that the exact turn is dependent on the operator.

Simulations can be used as described. The flight planning software provided by Procerus® is limited to a single camera setting for entering the desired target area as rectangular polygons, does not provide for constricting the headland, limited to N-S or E-W, the flightlines are always in a left-right pattern, and determining the turns is limited by vehicle dynamics.

FLAT Turns

Figure 44:
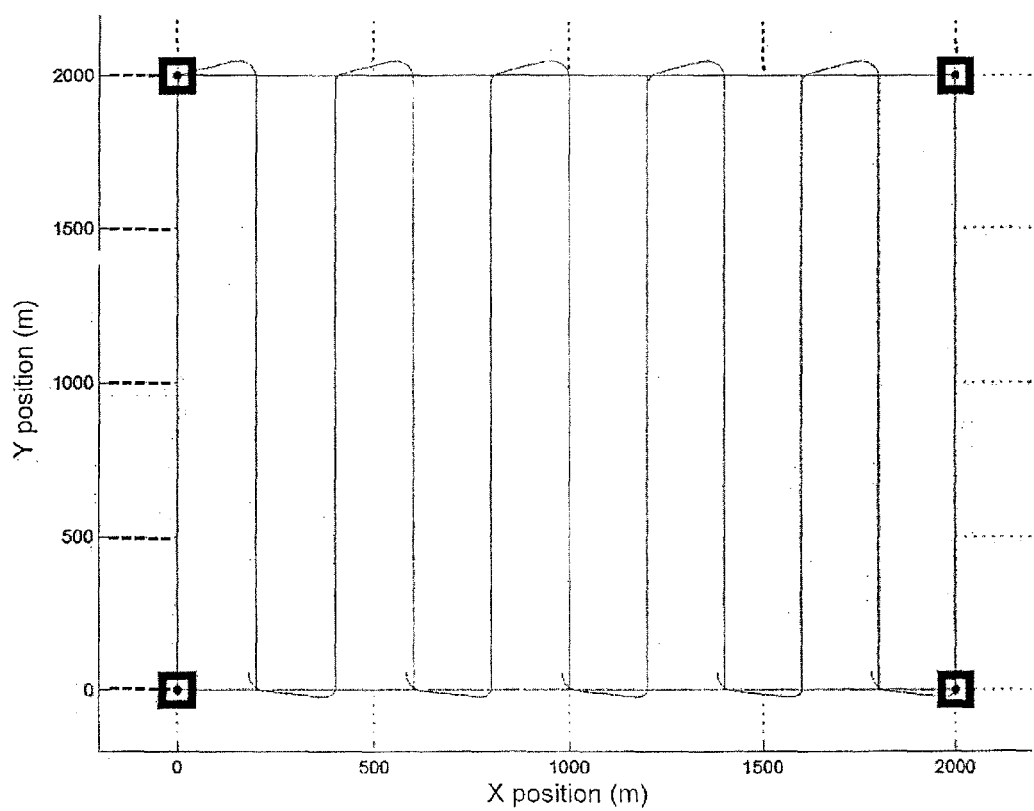
FIG. 44 shows a complete path with FLAT turns generated by the Procerus® Kestrel™.
Figure 45:
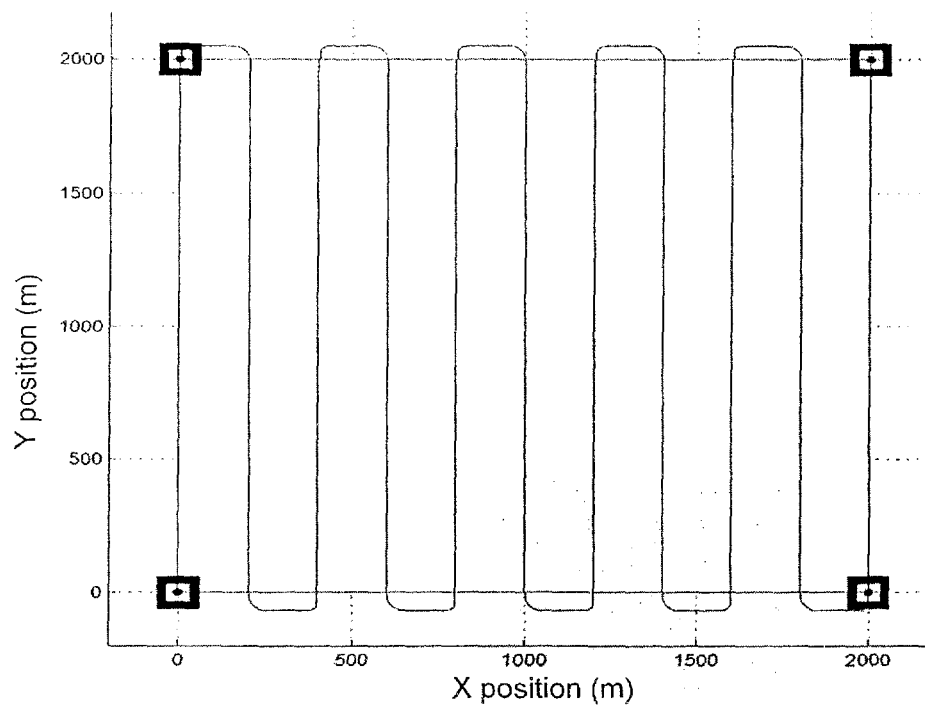
FIG. 45 shows a complete path with FLAT turns generated by an embodiment of the subject algorithm.

The first comparison is for a flat turn. This type of turn can be forced by setting the width of the flightlines to a value larger than the turning radius of the vehicle. For this particular case, the width was set to 200 m. The principal direction for FLAT turns does not matter, and was set at $\pi/2$ for convenience. FIG. 44 shows the control pattern, generated via the Procerus® flight planning software and FIG. 45 shows the path generated via a specific embodiment of the subject invention, referred to as the subject algorithm. Table 5-1 shows the results of the Procerus® and the algorithm.

The FLAT turn is the only case where the Procerus® navigation algorithm performs close to acceptably. For this particular case, the Procerus® turns executed in less time and distance than the subject algorithm by 15 seconds and 189 meters. However, as will be the case for the remaining examples, the turns generated by the Procerus® software did not intercept the next flightline before re-entering the target area. The worse of the two cases is downwind, where the width error is 20 m and horizontal error is 40 m. Because this particular target area is so large, the combined area missed is only about 2%. However, for missions requiring complete coverage this would not be acceptable.

HOOK Turns

Figure 46:
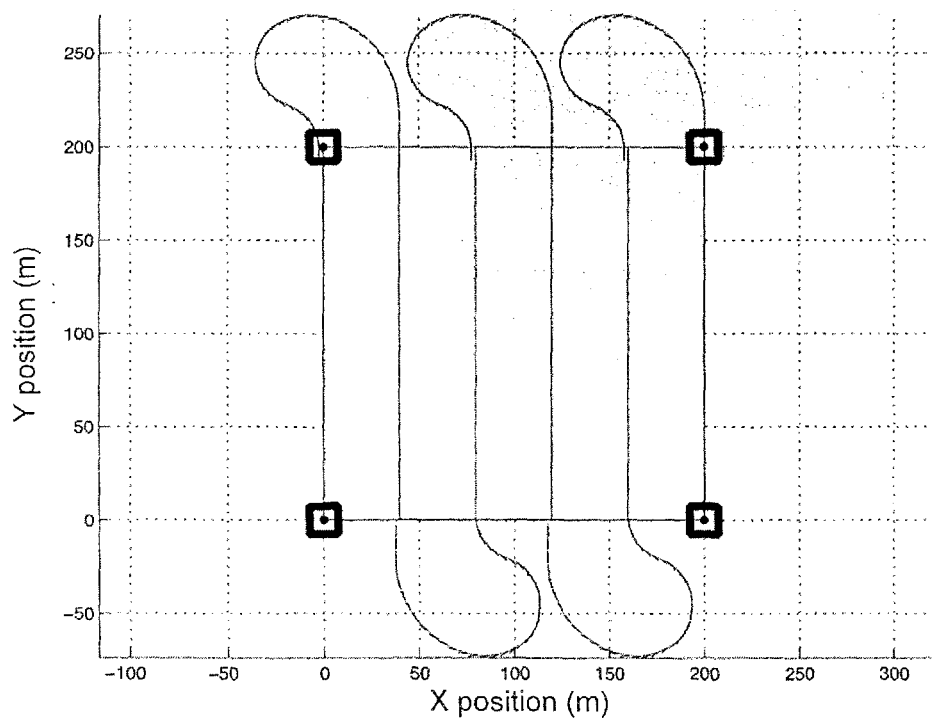
FIG. 46 shows a complete path with HOOK turns generated by an embodiment of the subject algorithm.
Figure 47:
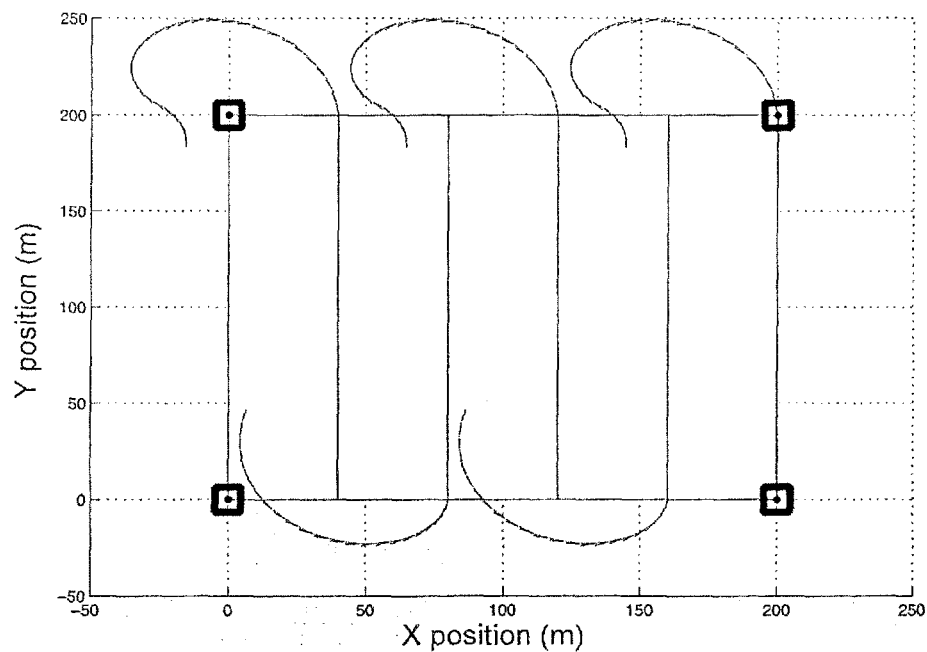
FIG. 47 shows a complete path with HOOK turns generated by the Procerus® Kestrel™.

Next, we examine the HOOK turn pattern. This can be forced by setting the flightline width smaller than the turning radius, and the principal direction in line with the wind so the flightlines are DOWNWIND and UPWIND. The target area is a square polygon of random size. FIG. 46 shows the path generated by the subject algorithm, while FIG. 47 shows the control pattern generated via the Procerus® software. The control pattern clearly does not ensure complete coverage.

Table 5-2 summarizes the results for HOOK turns. In this case, the turns generated by the subject algorithm outperformed the standard turns in time, but are nearly 250 m longer. That being said, the standard turns (generated by the Procerus® software) had gross errors (24 meters downwind and 83 meters upwind), and deeply encroached onto the target area, greatly diminishing the usefulness of the data collected useless.

BULB Turns

Figure 48:
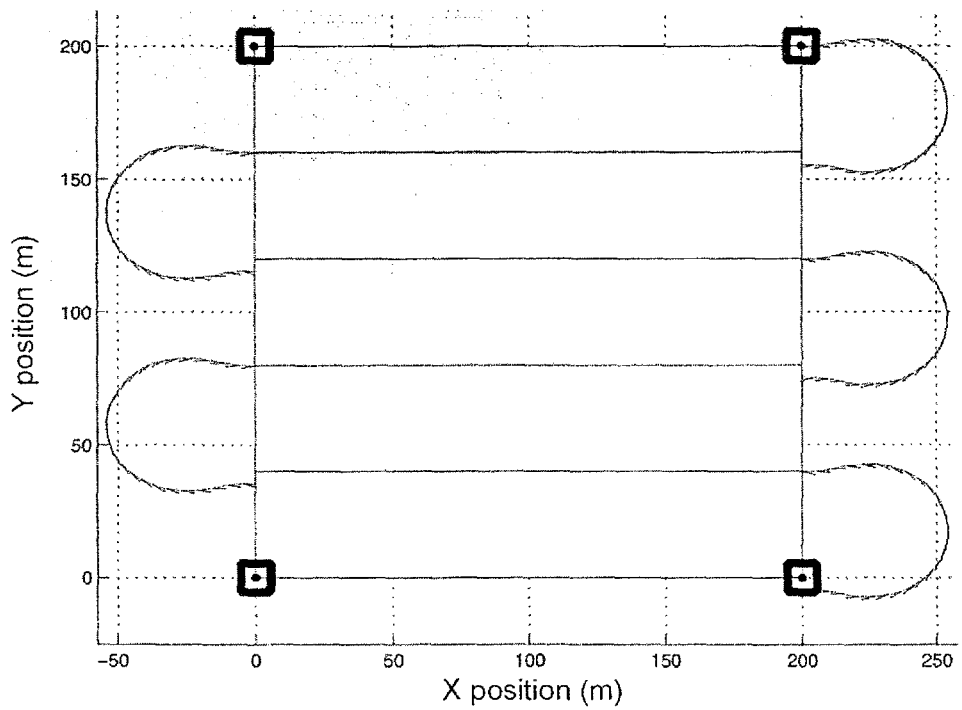
FIG. 48 shows a complete path with BULB turns generated by an embodiment of the subject algorithm.
Figure 49:
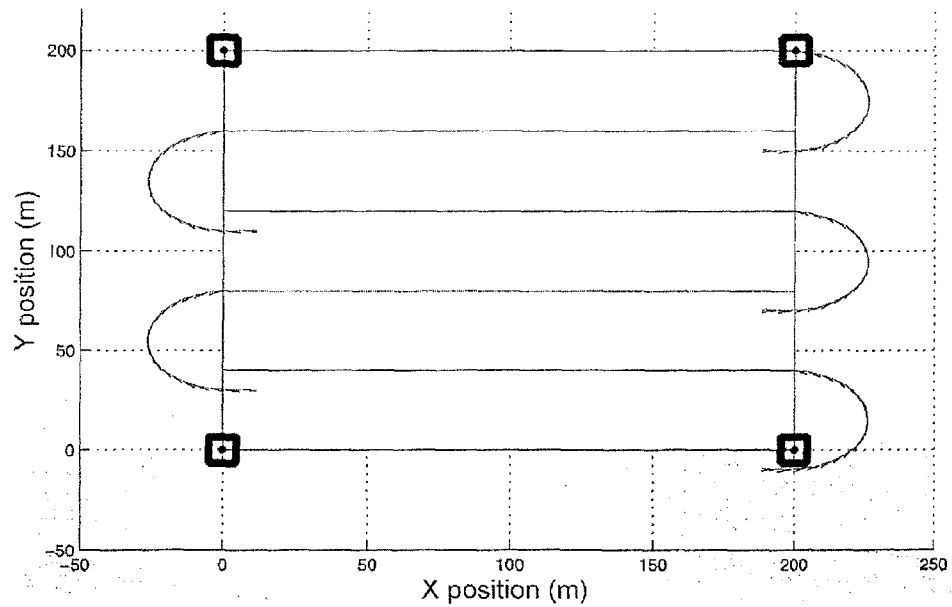
FIG. 49 shows a complete path with BULB turns generated by the Procerus® Kestrel™.

Next, we examine the BULB turn pattern. The BULB turns are forced by setting the flightline width to less than the turn radius, and setting the principal direction orthogonal to the wind, thus forcing both turns to be CROSSWIND. FIG. 48 shows the path generated by the subject algorithm, while FIG. 49 shows the control pattern (generated by the Procerus® software). Again, the control pattern does not ensure complete coverage.

The Procerus® generated turns performed much better in the CROSSWIND scenario than other scenarios. For this particular case, the turns happened to subtend more radians into the wind than the previous case, thus shortening the turning radius. Furthermore, because the turns were CROSSWIND, the vehicle was not blown upwind or downwind excessively in the turn. Even so, the Procerus® turns had height and width errors of about 10 meters, causing some of the target area to miss coverage.

The BULB turns produced by the subject algorithm took an additional 14 seconds more than the Procerus®, and an additional 226 meters of turn. This, by the statistics, seems to perform worse than the Procerus® turns. However, the subject algorithm's BULB turns reintercepted the target area with 2 meters of width error, and no height error, thus ensuring complete coverage of the target area. The height and width errors for the Procerus® turns would increase dramatically when the flightline width is reduced further. Given the goal of complete coverage, the subject algorithm's BULB turns performed better than the Procerus® turns, regardless of the amount of time required or distance covered. Table 5-3 summarizes these results.

General Results

Figure 50:
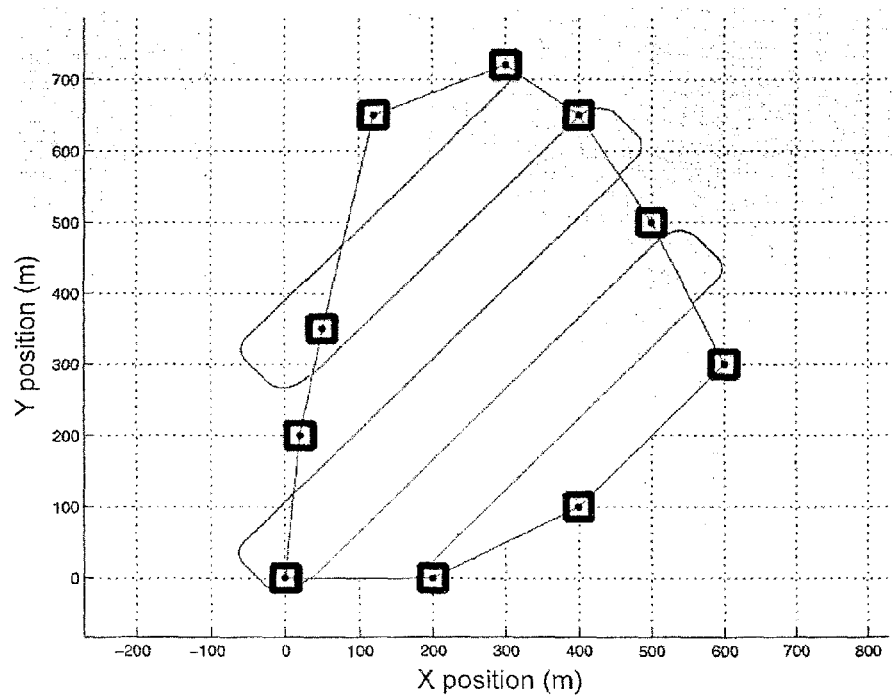
FIG. 50 shows a completely automated flight path generation from an embodiment of the subject algorithm.
Figure 51:
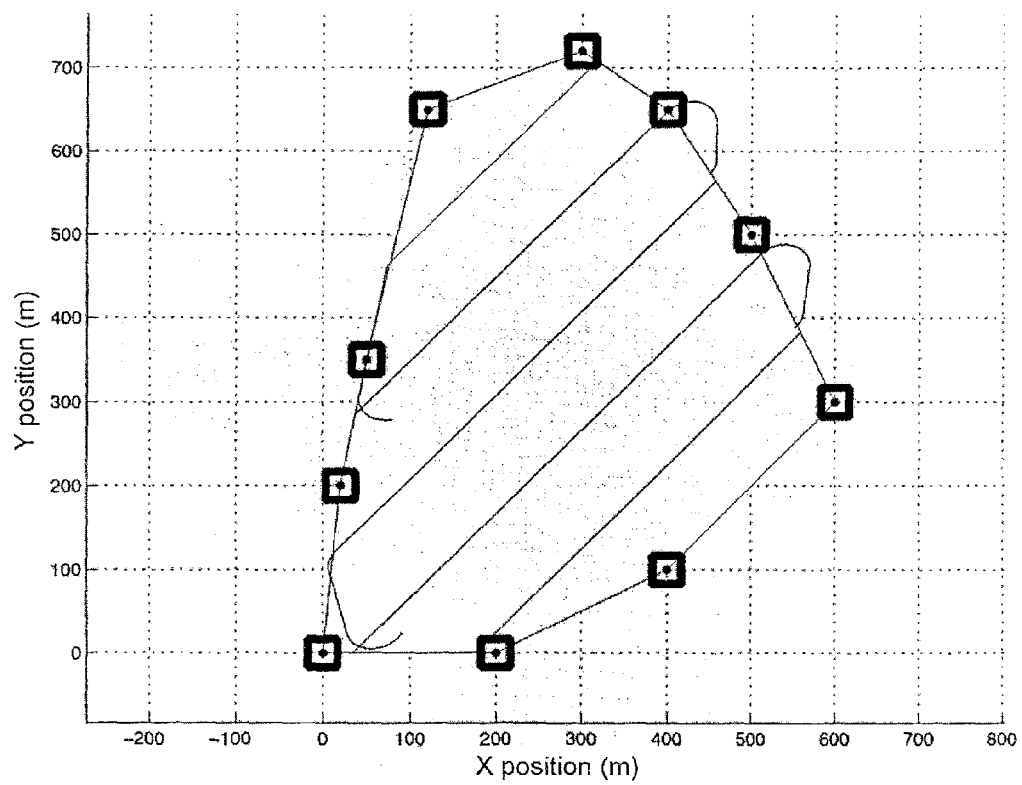
FIG. 51 shows an assisted flight path generation from Procerus® Kestrel™.

For the final comparison, a random convex polygon is generated of relevant size for a NOVA aircraft. It is assumed for this case that there is infinite headland, and a 4 m/s wind is assigned from the North. The algorithm selected Face 3 and Vertex 8 for the minimum Span, and, thus, the lines of support are parallel to Face 3. FIG. 50 shows the complete simulation. FIG. 51 similarly shows what the Procerus® turns would be without the operator actively managing turns.

Table 5-4 summarizes the results of this comparison. The flightplan produced by the subject algorithm outperforms the Procerus® plan in both time and distance. One major difference in this polygon as opposed to the FLAT turns in FIG. 44, is that this polygon has varying height associated with each turn. The Procerus® flightplan does not account for this at all, and does not intercept the next flightline until after encroaching on the target area. As before, the subject algorithm takes height into account and intercepts the next flightline at the beginning of the target area.

Figure 52:
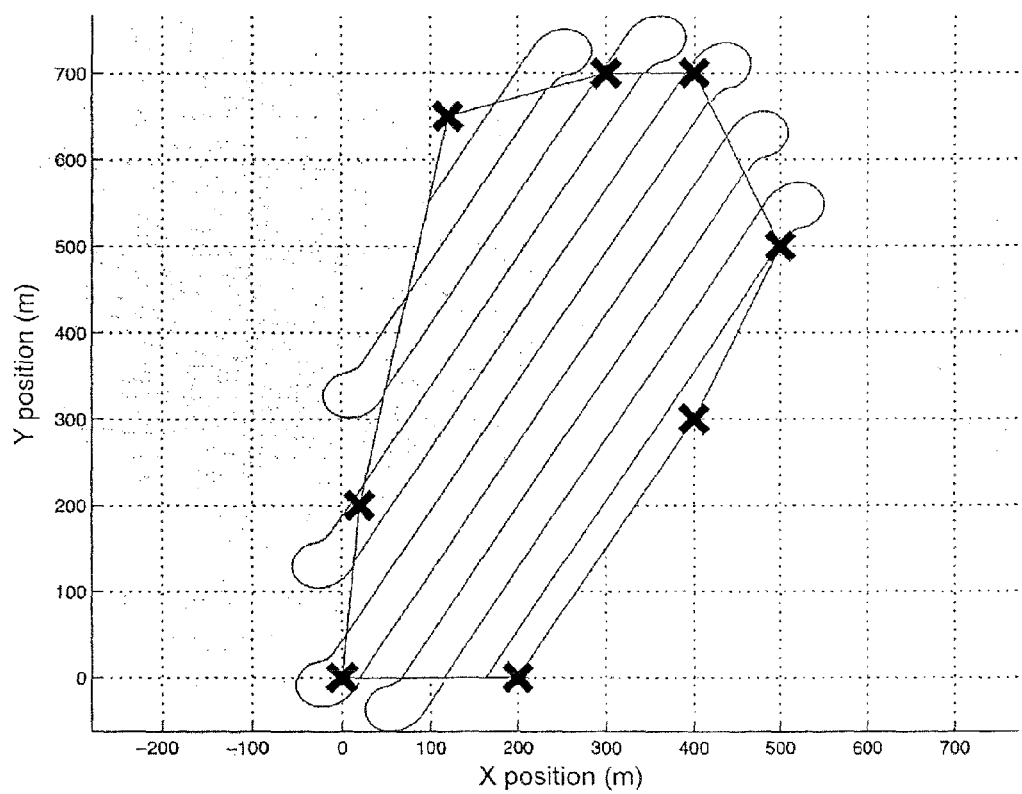
FIG. 52 shows a completely automated flight path generated by an embodiment of the subject algorithm.

A second random polygon was generated, this time with the flightline width set at 40 m forcing either HOOK or BULB turns. In this case, as FIG. 52 shows, the subject algorithm chose HOOK turns. With a wind of 4 m/s to the WNW, this follows the logic tree and is the most efficient type of turn. Table 5-5 shows the comparison between the algorithm, and the turns generated via the standard Procerus® method.

TABLE 5-1

FLAT turn comparison

| | Time | Distance |
|---|---|---|
| Procerus Turns | 25 m 55 s | 2.58 km |
| Algorithm Turns | 26 m 10 s | 2.77 km |

TABLE 5-2

HOOK turn comparison

| | Time | Distance |
|---|---|---|
| Procerus ® Turns | 720 s | 0.764 km |
| Algorithm Turns | 578 s | 1.1 km |

TABLE 5-3

BULB comparison

| | Time | Distance |
|---|---|---|
| Procerus ® Turns | 686 s | 457 m |
| Algorithm Turns | 700 s | 683 m |

TABLE 5-4

Comparison of random polygon with 100 m flightline width

| | Time | Distance |
|---|---|---|
| Procerus ® Turns | 289.3 s | 2608 m |
| Algorithm Turns | 276 s | 2398 m |

TABLE 5-5

Comparison of random polygon with 40 m flightline width

| | Time | Distance |
|---|---|---|
| Procerus ® Turns | 289 s | 2.60 km |
| Algorithm Turns | 387 s | 7.22 km |

TABLE 6-1

Summary of results

| Polygon | Turn Type | Algorithm Selection | Time | Distance |
|---|---|---|---|---|
| Forced | FLAT | Procerus ® | 1555 s | 22.58 km |
| | | Algorithm | 1570 s | 22.77 km |
| Forced | HOOK | Procerus ® | 720 s | 0.76 km |
| | | Algorithm | 578 s | 1.12 km |
| Forced | BULB | Procerus ® | 112 s | 1.75 km |
| | | Algorithm | 146 s | 2.34 km |
| Randomly Generated | FLAT | Procerus ® | 289 s | 2.61 km |
| | | Algorithm | 276 s | 2.39 km |
| Randomly Generated | BULB | Procerus ® | 289 s | 5.68 km |
| | | Algorithm | 387 s | 7.22 km |

Aspects of the invention, such as performing iterations of flight paths or portions of flight paths to reach threshold conditions (such as error), calculating PD, turns, flightlines, and other parameters of a flightplan, may be described in the general context of computer-executable instructions, such as program modules, being executed by a computer. Generally, program modules include routines, programs, objects, components, data structures, etc., that perform particular tasks or implement particular abstract data types. Moreover, those skilled in the art will appreciate that the invention may be practiced with a variety of computer-system configurations, including multiprocessor systems, microprocessor-based or programmable-consumer electronics, minicomputers, mainframe computers, and the like. Any number of computer-systems and computer networks are acceptable for use with the present invention.

Specific hardware devices, programming languages, components, processes, protocols, and numerous details including operating environments and the like are set forth to provide a thorough understanding of the present invention. In other instances, structures, devices, and processes are shown in block-diagram form, rather than in detail, to avoid obscuring the present invention. But an ordinary-skilled artisan would understand that the present invention may be practiced without these specific details. Computer systems, servers, work stations, and other machines may be connected to one another across a communication medium including, for example, a network or networks.

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In an embodiment, the present invention takes the form of a computer-program product that includes computer-useable instructions embodied on one or more computer-readable media.

Computer-readable media include both volatile and nonvolatile media, transitory and non-transitory, transient and non-transient media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to, information-delivery media, RAM, ROM, EEPROM, flash memory or other memory technology, CD-ROM, digital versatile disks (DVD), holographic media or other optical disk storage, magnetic cassettes, magnetic tape, magnetic disk storage, and other magnetic storage devices. These technologies can store data momentarily, temporarily, or permanently.

The invention may be practiced in distributed-computing environments where tasks are performed by remote-processing devices that are linked through a communications network. In a distributed-computing environment, program modules may be located in both local and remote computer-storage media including memory storage devices. The computer-useable instructions form an interface to allow a computer to react according to a source of input. The instructions cooperate with other code segments to initiate a variety of tasks in response to data received in conjunction with the source of the received data.

The present invention may be practiced in a network environment such as a communications network. Such networks are widely used to connect various types of network elements, such as routers, servers, gateways, and so forth. Further, the invention may be practiced in a multi-network environment having various, connected public and/or private networks.

Communication between network elements may be wireless or wireline (wired). As will be appreciated by those skilled in the art, communication networks may take several different forms and may use several different communication protocols. And the present invention is not limited by the forms and communication protocols described herein.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

LIST OF ABBREVIATIONS

A Airspeed
B Airbase
CCW Counterclockwise
CV Cross Vector
CW Clockwise
δ Ratio of Airspeed to Groundspeed
DSLR Digital Single Lens Reflex
EP End Point
EV End Vector
F Upward Force
F Faces of the Polygon
f Focal Length
fps frames per second
G Groundbase
GCS Ground Control Station
GDE Ground Distance Error
GigE Gigabit Ethernet
GPS Global Positioning System
HV Heading Vector
IP Initial Point
IV Initial Vector
ISR Intelligence Surveillance and Reconnaissance
l Line of Support
LOS Line Of Sight
m Meters
MAE Mechanical and Aerospace Engineering
N Outward Pointing Normal Vector
NTSC National Television System Committee
ω Wind Vector
ψ Direction of Vehicle
P Polygon
P Point
PD Principal Direction
PE Percent Endlap
PS Percent Sidelap
S Span of a Polygon
sUAS small Unmanned Aerial System
SUAV Small Unmanned Aerial Vehicle
t Parametric
$t_p$ Time Between Photo Sites
temp Temporary Vector
θ Roll Angle
UAS Unmanned Aerial System
UAV Unmanned Aerial Vehicle
USB2 Universal Serial Bus $2^{nd}$ Generation
USGS United States Geological Service
V Vertices
$V_V$ Antipodal Vertex
VV Velocity Vector
W Flightline Width
W Width of a Polygon
x Sensor Length in the x Direction
X' Orthogonal Direction in Coordinate System of Target Area
$x_p$ Number of Pixels in the x Direction
Y' Principal Direction in Coordinate System of Target Area
y Sensor Length in the y Direction
$y_p$ Number of Pixels in the y Direction

LIST OF REFERENCES

[1] Bowman, W. S. "Design and Validation of Autonomous Rapid Mapping System Using Small UAV." *Master's Thesis*. University of Florida, 2008.

[2] Burgess, M. A, P. G. Ifju, H. F. Percival, J. H. Perry, and S. E. Smith. "Development of a survey-grade sUAS for natural resource assessment and monitoring." *Florida Cooperative Fish and Wildlife Research Unit Annual Coordinating Committee Meeting*. Gainesville, Fla.: Slide presentation, May 23, 2009.

[3] Choset, H. "Coverage for robotics—A survey of recent results." *Annals of Mathematics and Artificial Intelligence*, Vol. 31, 2001, pp. 11726.

[4] Choset, H., & Pignon, P. "Coverage Path Planning: The boustrophedon cellular decomposition." *International Conference on Field and Service Robotics*, 1997.

[5] Evers, B. "Variable Camber Optimization for sUAS-Based Remote Sensing Applications". *Master's Thesis*. University of Florida, 2011.

[6] Federal Aviation Administration. *Interim Operational Approval Guidance* 08-01. Federal Aviation Administration, Unmanned Aircraft Program Office. 2008.

[7] Foley, J., Dam, A v., Feiner, S., & Hughes, J. *Computer Graphics Principles and Practice*. Addison-Westley Publishing Company, 1996.

[8] Huang, W. H. "Optimal Line-sweep-based Decompositions for Coverage Algorithms." *IEEE International Conference on Robotics and Automation*. 2001.

[9] Jin, J., & Tang, L. "Optimal Coverage Path Planning for Arable Farming on 2D Surfaces." *American Society of Agricultural and Biological Engineers*, Vol. 53, No. 1, 2001, pp. 28895.

[10] Jones, G. P. "The Feasibility of Using Small Unmanned Aerial Vehicles for Wildlife Research." *Master's Thesis*. University of Florida, 2003.

[11] Li, Y., Chen, H., Er, M. J., & Wang, X. "Coverage path planning for UAVs based on enhanced exact cellular decomposition method." *Mechatronics*, Vol. 21, 2011, pp. 876-885.

[12] McConnel, J. *Computer Graphics Theory to Practice*. Sudbury, Mass.: Jones and Barlett Publishers, Inc. 2006.

[13] McGee, T., Spry, S., & Hendrick, J. K. "Optimal path planning in a constant wind with a bounded turning rate." *AIAA Guidance, Navigation, and Control Conference and Exhibit*, San Francisco, 2005, pp. 11.

[14] Oksanen, T., & Visala, A. "Path Planning Algorithms for Agricultural Machines." *Agricultural Engineering International: the CIGR Ejournal*, Vol. 4, No. 7, 2007.

[15] Osborne, J., & Rysdyk, R. "Waypoint Guidance for Small UAVs in Wind." *Proceedings of the AIAA Infotech@Aerospace Conference*. 2005.

[16] Owen, P. "When the Ravens Met the Sandhill Cranes." *Unmanned Systems*, June 2011.

[17] Perry, J. H. "A Synthesized Directly Georeferenced Remote Sensing Technique for Small Unmanned Aerial Vehicles." *Master's Thesis*. University of Florida, 2009.

[18] Perry, J. H., Evers, B. S., Rambo, T. J., Reed, T. M., Burgess, M. "Natural Resource Management with a Small Unmanned Aircraft." *AUVSI's Unmanned Systems North America*. 2011.
[19] Piezdeh, H. *Computational Geometry with the Rotating Calipers*. McGill University, School of Computer Science. Ann Arbor: UMI. 1999.
[20] Procerus Technologies LLC. "Installation and Configuration guide." Version 2.1. 2009.
[21] Toussaint, G. "Solving Geometric Problems with the Rotating Calipers." *IEEE MELECON '83*. Athens. 1983.
[22] US Government (2012). *Title 14: Aeronautics and Space, PART 91—GENERAL OPERATING AND FLIGHT RULES*. Retrieved Jul. 14, 2012, from http://ecfr.gpoaccess.gov/cgi/t/text/textidx?c=ecfr&rgn=div5&view=text&node=14:2.0.1.3.10&idno=14.

The invention claimed is:

1. A method of producing a travel path for a vehicle, comprising: providing a processor; receiving target parameters via the processor, wherein the target parameters determine a location of a target area with respect to a first reference frame; receiving a velocity a second reference frame is moving with respect to the first reference frame via the processor; receiving one or more sensor parameters relating to a sensor to be transported by a vehicle traveling in the second reference frame so as to travel along a travel path with respect to the target via the processor; determining a travel path for the vehicle with respect to the target area via the processor, wherein the travel path includes travel curves and turns, wherein when the vehicle travels along the travel curves the sensor acquires sensor data with respect to the target area to be used to provide information regarding the target area and when the vehicle travels along the turns the sensor does not acquire sensor data with respect to the target area to be used to provide information regarding the target area, wherein the turns connect the travel curves to form the travel path; and traveling the vehicle along the travel path with respect to the target area.

2. The method according to claim 1, wherein the vehicle is an aircraft, wherein the travel path is a flight path, wherein the first reference frame is earth, wherein the sensor is an imaging device, wherein the second reference frame is airspace above the earth, wherein the flight curves are flightlines, wherein a velocity of the second reference frame is moving with respect to the first reference frame is wind.

3. The method according to claim 2, wherein determining the flight path comprises:
determining a representation of the target area based on the target parameters.

4. The method according to claim 3, wherein the representation of the target area is a convex polygon.

5. The method according to claim 2, wherein the imaging device is a still camera.

6. The method according to claim 2, wherein determining the flight path comprises determining the turns, wherein the turns are selected from a flat turn, a hook turn, and a bulb turn.

7. The method according to claim 2, wherein determining the flight path comprises determining the turns, wherein determining the turns comprises:
determining whether a width of a turn of the aircraft conducted at a desired turning radius of the vehicle is larger than a flightline width, wherein the flightline width is a distance between an $i^{th}$ flightline from which the turn starts and an $(i+1)^{th}$ flightline at which the turn ends.

8. The method according to claim 7, wherein the desired turning radius is a maximum turning radius of the vehicle.

9. The method according to claim 1, wherein the target parameters include one or more of the following:
location of target area in first reference frame;
geographic information regarding the target area; and
restrictions regarding aircraft flight above the target area.

10. The method according to claim 2, further comprising determining a flight plan, wherein the flight plan includes one or more of the following:
altitude of the aircraft, airspeed of the aircraft, location of flightlines, path of turns, and direction of travel along flightlines.

11. The method according to claim 4, wherein determining the flight path further comprises:
for a given distance between adjacent flightlines, determining an orientation of the flightlines to the convex polygon that minimizes a number of flightlines.

12. The method according to claim 4, wherein determining the flight path further comprises:
orienting the flightlines parallel to the wind.

13. The method according to claim 11, wherein determining the flight path comprises determining the turns, wherein determining the turns comprises:
determining whether a width of a turn of the aircraft conducted at a desired turning radius of the vehicle is larger than a flightline width, wherein the flightline width is a distance between an $i^{th}$ flightline from which the turn starts and an $(i+1)^{th}$ flightline at which the turn ends.

14. The method according to claim 13, wherein if the width of the turn is larger than the flightline width and the wind is a crosswind or the aircraft is traveling upwind, the turn starts away from the $(i+1)^{th}$ flightline, wherein if the width of the turn is not larger than the flightline width, or the width of the turn is larger than the flightline width and the aircraft is flying downwind, the turn starts toward the $(i+1)^{th}$ flightline.

15. The method according to claim 14, wherein if a height of the turn is greater than a flightline height, post-turn length is added to the turn, wherein if the height of the turn is less than the flightline height, pre-turn length is added to the turn.

16. The method according to claim 14, wherein if the width of the turn is larger than the flightline width and the wind is a crosswind or the aircraft is traveling upwind, the turn is a bulb turn, wherein if the width of the turn is larger than the flightline width and the aircraft is traveling upwind, the turn is a hook turn, wherein if the width of the turn is larger than the flightline width and the aircraft is flying downwind, the turn is a hook turn, wherein if the width of the turn is not larger than the flightline width the turn is a flat turn.

17. A method of acquiring sensor data with respect to a target area, comprising:
traveling a vehicle along a travel path with respect to a target area, wherein a sensor is transported by the vehicle and acquires sensor data with respect to the target area while the vehicle travels along the travel path, wherein the travel path is produced via:
receiving target parameters, wherein the target parameters determine a location of a target area with respect to a first reference frame;
receiving a velocity a second reference frame is moving with respect to the first reference frame;
receiving one or more sensor parameters relating to a sensor to be transported by a vehicle traveling in the second reference frame so as to travel along a travel path with respect to the target, and
determining a travel path for the vehicle with respect to the target area, wherein the travel path includes travel curves and turns, wherein when the vehicle travels along the travel curves the sensor acquires sensor data with respect to the target area to be used to provide information regarding the target area and when the vehicle travels along the turns the sensor does not acquire sensor data with respect to the target area to be used to provide information regarding the target area, wherein the turns connect the travel curves to form the travel path.

18. The method according to claim 17, wherein the vehicle is an aircraft, wherein the travel path is a flight path, wherein the first reference frame is earth, wherein the sensor is an imaging device, wherein the second reference frame is airspace above the earth, wherein the flight curves are flightlines, wherein a velocity of the second reference frame is moving with respect to the first reference frame is wind.

19. A non-transitory computer-readable medium containing a set of instructions that when executed cause a computer to perform a method, the method comprising:
receiving target parameters, wherein the target parameters determine a location of a target area with respect to a first reference frame;
receiving a velocity a second reference frame is moving with respect to the first reference frame;
receiving one or more sensor parameters relating to a sensor to be transported by a vehicle traveling in the second reference frame so as to travel along a travel path with respect to the target, and
determining a travel path for the vehicle with respect to the target area, wherein the travel path includes travel curves and turns, wherein when the vehicle travels along the travel curves the sensor acquires sensor data with respect to the target area to be used to provide information regarding the target area and when the vehicle travels along the turns the sensor does not acquire sensor data with respect to the target area to be used to provide information regarding the target area, wherein the turns connect the travel curves to form the travel path.

20. The medium according to claim 19, wherein the vehicle is an aircraft, wherein the travel path is a flight path, wherein the first reference frame is earth, wherein the sensor is an imaging device, wherein the second reference frame is airspace above the earth, wherein the flight curves are flightlines, wherein a velocity of the second reference frame is moving with respect to the first reference frame is wind.

21. The method according to claim 18, wherein determining the flight path comprises: determining a representation of the target area based on the target parameters.

22. The method according to claim 21, wherein the representation of the target area is a convex polygon.

23. The method according to claim 18, wherein the imaging device is a still camera.

24. The method according to claim 18, wherein determining the flight path comprises determining the turns, wherein the turns are selected from a flat turn, a hook turn, and a bulb turn.

25. The method according to claim 18, wherein determining the flight path comprises determining the turns, wherein determining the turns comprises: determining whether a width of a turn of the aircraft conducted at a desired turning radius of the vehicle is larger than a flightline width, wherein the flightline width is a distance between an ith flightline from which the turn starts and an (i+1)th flightline at which the turn ends.

26. The method according to claim 25, wherein the desired turning radius is a maximum turning radius of the vehicle.

27. The method according to claim 17, wherein the target parameters include one or more of the following: location of target area in first reference frame; geographic information regarding the target area; and restrictions regarding aircraft flight above the target area.

28. The method according to claim 18, further comprising determining a flight plan, wherein the flight plan includes one or more of the following: altitude of the aircraft, airspeed of the aircraft, location of flightlines, path of turns, and direction of travel along flightlines.

29. The method according to claim 22, wherein determining the flight path further comprises: for a given distance between adjacent flightlines, determining an orientation of the flightlines to the convex polygon that minimizes a number of flightlines.

30. The method according to claim 22, wherein determining the flight path further comprises: orienting the flightlines parallel to the wind.

31. The method according to claim 29, wherein determining the flight path comprises determining the turns, wherein determining the turns comprises: determining whether a width of a turn of the aircraft conducted at a desired turning radius of the vehicle is larger than a flightline width, wherein the flightline width is a distance between an ith flightline from which the turn starts and an (i+1)th flightline at which the turn ends.

32. The method according to claim 31, wherein if the width of the turn is larger than the flightline width and the wind is a crosswind or the aircraft is traveling upwind, the turn starts away from the (i+1)th flightline, wherein if the width of the turn is not larger than the flightline width, or the width of the turn is larger than the flightline width and the aircraft is flying downwind, the turn starts toward the (i+1)th flightline.

33. The method according to claim 32, wherein if a height of the turn is greater than a flightline height, post-turn length is added to the turn, wherein if the height of the turn is less than the flightline height, pre-turn length is added to the turn.

34. The method according to claim 32, wherein if the width of the turn is larger than the flightline width and the wind is a crosswind or the aircraft is traveling upwind, the turn is a bulb turn, wherein if the width of the turn is larger than the flightline width and the aircraft is traveling upwind, the turn is a hook turn, wherein if the width of the turn is larger than the flightline width and the aircraft is flying downwind, the turn is a hook turn, wherein if the width of the turn is not larger than the flightline width the turn is a flat turn.

35. The method according to claim 20, wherein determining the flight path comprises: determining a representation of the target area based on the target parameters.

36. The method according to claim 35, wherein the representation of the target area is a convex polygon.

37. The method according to claim 20, wherein the imaging device is a still camera.

38. The method according to claim 20, wherein determining the flight path comprises determining the turns, wherein the turns are selected from a flat turn, a hook turn, and a bulb turn.

39. The method according to claim 20, wherein determining the flight path comprises determining the turns, wherein determining the turns comprises: determining whether a width of a turn of the aircraft conducted at a desired turning radius of the vehicle is larger than a flightline width, wherein the flightline width is a distance between an ith flightline from which the turn starts and an (i+1)th flightline at which the turn ends.

40. The method according to claim 39, wherein the desired turning radius is a maximum turning radius of the vehicle.

41. The method according to claim 19, wherein the target parameters include one or more of the following: location of target area in first reference frame; geographic information regarding the target area; and restrictions regarding aircraft flight above the target area.

42. The method according to claim 20, further comprising determining a flight plan, wherein the flight plan includes one or more of the following: altitude of the aircraft, airspeed of the aircraft, location of flightlines, path of turns, and direction of travel along flightlines.

43. The method according to claim 36, wherein determining the flight path further comprises: for a given distance between adjacent flightlines, determining an orientation of the flightlines to the convex polygon that minimizes a number of flightlines.

44. The method according to claim 36, wherein determining the flight path further comprises: orienting the flightlines parallel to the wind.

45. The method according to claim 43, wherein determining the flight path comprises determining the turns, wherein determining the turns comprises: determining whether a width of a turn of the aircraft conducted at a desired turning radius of the vehicle is larger than a flightline width, wherein the flightline width is a distance between an ith flightline from which the turn starts and an (i+1)th flightline at which the turn ends.

46. The method according to claim 45, wherein if the width of the turn is larger than the flightline width and the wind is a crosswind or the aircraft is traveling upwind, the turn starts away from the (i+1)th flightline, wherein if the width of the turn is not larger than the flightline width, or the width of the turn is larger than the flightline width and the aircraft is flying downwind, the turn starts toward the (i+1)th flightline.

47. The method according to claim 46, wherein if a height of the turn is greater than a flightline height, post-turn length is added to the turn, wherein if the height of the turn is less than the flightline height, pre-turn length is added to the turn.

48. The method according to claim 46, wherein if the width of the turn is larger than the flightline width and the wind is a crosswind or the aircraft is traveling upwind, the turn is a bulb turn, wherein if the width of the turn is larger than the flightline width and the aircraft is traveling upwind, the turn is a hook turn, wherein if the width of the turn is larger than the flightline width and the aircraft is flying downwind, the turn is a hook turn, wherein if the width of the turn is not larger than the flightline width the turn is a flat turn.

* * * * *